United States Patent
Thornton

(10) Patent No.: US 7,325,033 B2
(45) Date of Patent: *Jan. 29, 2008

(54) VIDEO CONFERENCING SYSTEM USING VIDEO MANAGER TO PROVIDE PICTURE-IN-PICTURE IMAGE TO DISPLAY DEVICES LOCATED REMOTELY FROM CO-LOCATED COMPUTING SYSTEMS

(75) Inventor: Barry W. Thornton, Austin, TX (US)

(73) Assignee: ClearCube Technology, Inc., Austin, TX (US)

(*) Notice: Subject to any disclaimer, the term of this patent is extended or adjusted under 35 U.S.C. 154(b) by 893 days.

This patent is subject to a terminal disclaimer.

(21) Appl. No.: 10/411,908

(22) Filed: Apr. 11, 2003

(65) Prior Publication Data

US 2004/0015597 A1    Jan. 22, 2004

Related U.S. Application Data

(60) Provisional application No. 60/396,793, filed on Jul. 18, 2002.

(51) Int. Cl.
*G06F 15/16* (2006.01)
(52) U.S. Cl. .................. 709/204; 348/565; 348/584
(58) Field of Classification Search .......... 709/204, 709/246, 224; 463/42; 370/260; 345/716; 382/284; 434/276; 348/468, 584, 565
See application file for complete search history.

(56) References Cited

U.S. PATENT DOCUMENTS

2001/0000539 A1    4/2001    Heller et al.

(Continued)

FOREIGN PATENT DOCUMENTS

WO        WO 01/13637        2/2001

(Continued)

OTHER PUBLICATIONS

International Search Report, Application No. PCT/US03/22563, mailed Dec. 29, 2003.

(Continued)

*Primary Examiner*—Le Hien Luu
(74) *Attorney, Agent, or Firm*—Meyertons Hood Kivlin Kowert & Goetzel, P.C.; Jeffrey C. Hood; Mark S. Williams

(57) ABSTRACT

System and method for operating a system including one or more co-located computers, e.g., rack-mounted blades, coupled to one or more remote human interfaces (RHIs), and where content or communication is received from sources, e.g., external content sources, internal or external communications sources, etc., and distributed to the RHIs. A first computing system generates first video signals corresponding to a first image for transmission to a display device in a first RHI. The video manager receives a second image from a source, and inserts second video signals corresponding to the second image with the first video signals to form third video signals. The display device of the first RHI displays a third image based on the third video signals, e.g., a picture-in-picture presentation of the second and first images. The first, second, and third video signals may include video streams and/or audio signals, and may be analog, digital, or both.

32 Claims, 29 Drawing Sheets

U.S. PATENT DOCUMENTS

| | | | |
|---|---|---|---|
| 2002/0080280 A1* | 6/2002 | Champion et al. | 348/584 |
| 2002/0143996 A1* | 10/2002 | Odryna et al. | 709/246 |
| 2002/0186320 A1* | 12/2002 | Carlsgaard et al. | 348/468 |
| 2002/0188718 A1* | 12/2002 | McGraw et al. | 709/224 |
| 2002/0197593 A1* | 12/2002 | Sutton | 434/276 |
| 2003/0095720 A1* | 5/2003 | Chiu et al. | 382/284 |
| 2003/0100372 A1* | 5/2003 | Gatto et al. | 463/42 |
| 2003/0112260 A1* | 6/2003 | Gouzu | 345/716 |
| 2004/0008635 A1* | 1/2004 | Nelson et al. | 370/260 |

FOREIGN PATENT DOCUMENTS

| | | |
|---|---|---|
| WO | WO 2004/010281 | 1/2004 |

OTHER PUBLICATIONS

International Search Report, Application No. PCT/US03/22563, mailed Mar. 25, 2004.

* cited by examiner

Averaged Pixel De-Res

Single Pixel De-Res

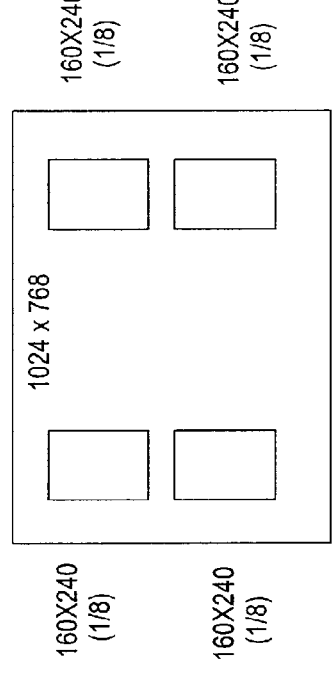
Figure 16C
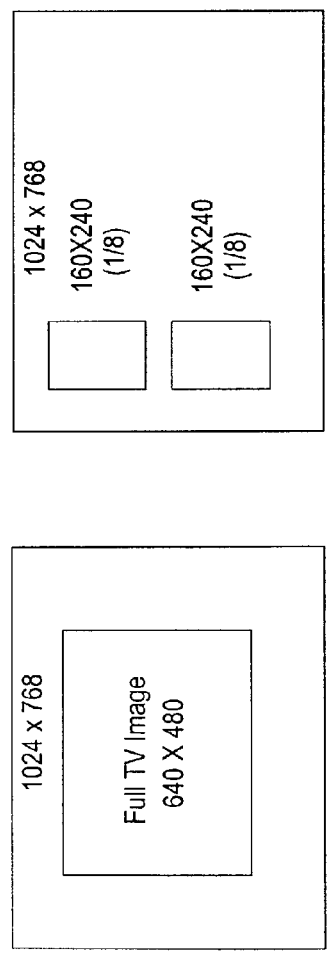
Figure 16B
Figure 16A
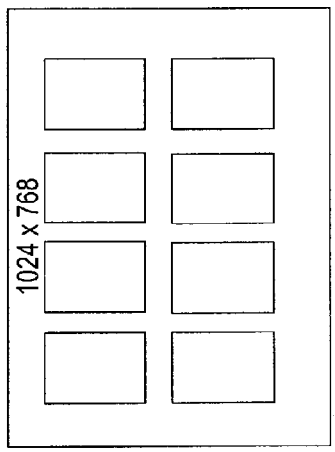
Figure 16E
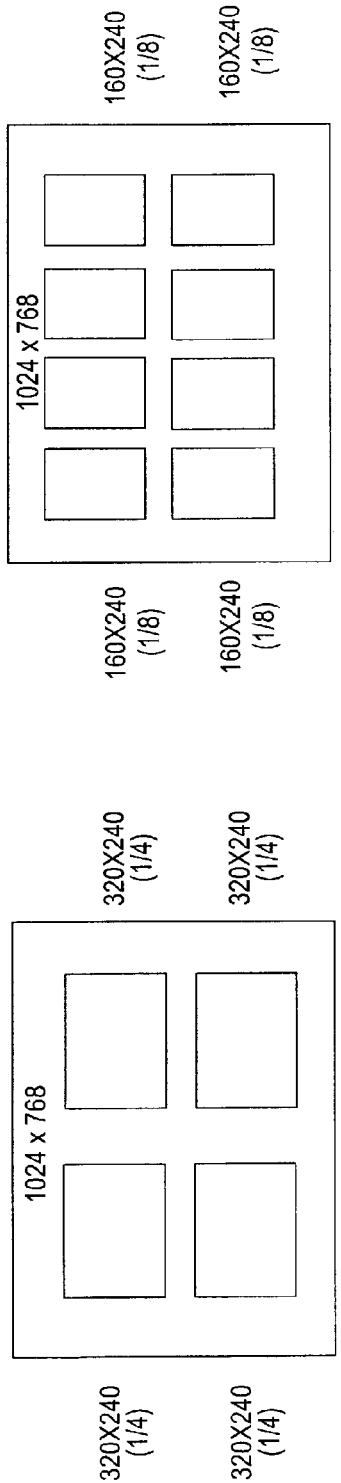
Figure 16D

VIDEO CONFERENCING SYSTEM USING VIDEO MANAGER TO PROVIDE PICTURE-IN-PICTURE IMAGE TO DISPLAY DEVICES LOCATED REMOTELY FROM CO-LOCATED COMPUTING SYSTEMS

PRIORITY CLAIM

This application claims benefit of priority of U.S. provisional application Ser. No. 60/396,793 titled "DISTRIBUTING CONTENT IN A SYSTEM COMPRISING CO-LOCATED COMPUTERS AND REMOTE HUMAN INTERFACES" filed Jul. 18, 2002, whose inventor is Barry Thornton which is hereby incorporated by reference in its entirety.

BACKGROUND OF THE INVENTION

1. Field of the Invention

The present invention relates generally to computer systems and specifically to transmitting video and/or audio signals between a human interface and a computer in a system of co-located computer systems over a transmission medium, for example, in a videoconferencing system.

2. Description of the Related Art

The components of a computer system (such as PCs, minicomputers and mainframes) may be divided into two functional units—the computing system 102 and the human interface (or "HI") to the computing system. For a PC (Person Computer), the computing system may be the CPU, memory, hard drive, power supply and similar components. The computing system may be comprised in a chassis which holds the motherboard, power supply, hard drive and the like. The human interface, on the other hand, may comprise those devices that humans use to transfer information to and/or receive information from the computing system. The most commonly recognized devices which form part of the human interface with the computing system include the monitor, keyboard, mouse and printer. The human interface may comprise a variety of other devices, such as a joystick, trackball, touchpad, microphone, speakers, and telephone, as well as other devices too numerous to specifically mention.

In current computer systems, e.g., current PC architectures, the human interface (e.g., the display monitor, mouse, and keyboard, etc.) is closely located to the computer system, by a distance typically less than about 10 feet. The computing system 102 generates and/or receives human interface signals, e.g., display monitor, mouse and keyboard formatted data, that are provided directly to/from the human interface 130 or desktop via individual specialized cables as illustrated in prior art FIG. 1A. For example, for most PCs installed at workstations, the computer monitor 116, keyboard 112 and mouse 114 rest on the desktop while the computer chassis which holds the computing system 102 rests on the floor underneath the desktop. Prior art FIG. 1B is a block diagram of the computer system illustrated in FIG. 1A. As indicated in FIG. 1B, the computing system 102 typically includes a processor 106, i.e., a CPU, a memory 104, and I/O interface logic, such as a video card 136 and an I/O interface card 137 which are coupled to the processor 106 through an I/O bus 124. The computing system 102 also typically includes chip set logic 108 for interfacing the processor 106 and memory 104 with the I/O bus 124. As is well known, two or more computing systems 102 may be connected together in a network configuration.

Many commercial businesses and enterprises make extensive use of personal computers (PCs) in their daily operations. Typically, each user of a personal computer in the enterprise has a networked PC at their desk or work area. As the number of networked computer systems utilized in an enterprise increases, the management of such resources becomes increasingly complex and expensive. Some of the manageability issues involved in maintaining a large number of networked computer systems include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop. In addition, there are security issues regarding physical assets, data protection, and software control. In many business establishments, such as call centers, there is no need for the user to install software on his/her unit, and in fact, management may specifically forbid employees from doing so. However, the standard personal computer configuration inherently provides the user this ability because the system is typically located with the user, and includes a floppy drive, CDROM, and one or more hard drives. Ensuring that unauthorized software is not installed on any of the machines in the network involves periodically personally auditing the software contents of each machine, at substantial cost in time and effort.

In order to fully resolve the aforementioned issues, in some current systems the entire computing system is physically separated from the human interface, specifically, by keeping the human interface (monitor, keyboard, mouse and printer) at the desktop or workstation while relocating the associated computing system (motherboard, power supply, memory, disk drives, etc.) to a secured computer room where plural computing systems are maintained. By securing the computing systems in one room, the employer's control over the computer systems is greatly enhanced. For example, since employees no longer have personal access, through the floppy or CD drive, to the memory subsystem, employees can not surreptitiously remove information from their computing system. Nor can the employee independently load software or other data files onto their computing system. Similarly, the employee can no longer physically change settings or otherwise modify the hardware portion of the computer. Maintenance is also greatly facilitated by placement of all of the computing systems in a common room. For example, the repair technicians and their equipment can be stationed in the same room with all of the computing systems. Thus, a technician could replace failed components or even swap out the entire unit without making repeated trips to the location of the malfunctioning machine. Such a room can be provided with special HVAC and power systems to ensure that the room is kept clean, cool and fully powered.

U.S. Pat. No. 6,012,101 titled "Computer Network Having Commonly Located Computer Systems"; U.S. Pat. No. 6,119,146 titled "Computer Network Having Multiple Remotely Located Human Interfaces Sharing a Common Computing System"; U.S. Pat. No. 6,038,616 titled "Computer System With Remotely Located Interface Where Signals are Encoded at the Computer System, Transferred Through a 4-wire Cable, and Decoded at the Interface" disclose systems where a plurality of computing systems are located at one location, and the human interfaces associated with these computing systems are remotely located at respective desktops.

FIG. 2 illustrates an exemplary prior art system where the human interface is remotely located from the computing system. The system of FIG. 2 includes a computing system, an upstream encoder, a communication medium, a downstream decoder, and the human interface devices. The downstream decoder and the human interface devices are located remotely from the upstream encoder and the computing system. This system employs a protocol wherein human interface signals generated by the computing system are encoded by the upstream encoder into a format which allows transmission over a lengthy distance to the remote location where the human interface devices are located. The encoded signals are then transmitted over the communication medium. The encoded human interface signals are received and decoded by the downstream decoder at the remote location, being converted back into the originally generated human interface signals for propagation to the human interface devices. Human interface signals generated by the human interface devices are similarly encoded by the downstream decoder, transmitted over the communication medium, decoded by the upstream encoder, and provided to the computing system. Thus, to date the separation of the computing system from the human interface has involved extension of the human interface signals, (monitor, mouse, keyboard, USB (Universal Serial Bus) and other I/O signals), i.e., extensions of already existing I/O signals, that is, the human interface signals are generated by the computer (or human interface device), are changed or reformatted as needed for transmission to a distant or remote location, and then converted back to their original format.

In some enterprises, multiple channels or sources of information may be monitored by a user, such as, for example, telephone, television, video conferencing, audio, and/or web browser, among others. However, prior art systems which attempt to integrate such disparate forms of information for presentation to the user, e.g., over an Ethernet network, are unable to satisfactorily do so because of a number of issues. These issues include one or more of bandwidth, protocol and hardware incompatibilities, and limited computation resources, among others.

For example, one approach for delivering video content to the desktop, e.g., television content, includes installing a cable television (CTVA) system at the desktop, including either putting a television set at the desktop or installing a TV card in the computer. However, CTVA systems generally require a complete independent wiring network to each desktop which includes power splitters, line amplifiers, heavy cabling, and a master translator/re-modulator as a head end source. This network can be quite expensive, unsightly, heavy, and limited in the kinds of sources that can be fed over the system. In addition a TV set may be required which takes up valuable space and power and may generate substantial heat. In the case of a TV card being added to the desktop personal computer, the associated hardware places an additional load on the computer's performance, degrading its ability to function as a computer for the purposes of the business.

Another approach for delivering video content to the desktop involves conversion of streaming video information into packet based network data (e.g., Ethernet packets), and displaying the video using the computer system as a television set. However, using the Ethernet network as a conduit for the content video has the dual degrading effects of loading the network with non-computer data and, as above, tying up the computer's computation resources with non-computer-related tasks.

Furthermore, in returning information from the user's desktop (human interface or HI), prior art methods have typically either used a second cable or USB to carry all the return information. A primary disadvantage of deployment of the second cable is that standard enterprise desktop installations today typically already have a Category 5, 6, or 7 communications cable connecting the desktop (the HI) to a 'back room' where the return signals are destined. This second cable adds considerable cost in labor to the deployment of the computer system, and effectively doubles the amount of space needed for the cabling. A primary disadvantage of the use of USB to carry the return information is that USB signaling for video and audio generally introduces considerable, and quite objectionable, delay or latency into the signals. Typically such video and audio signals lack synchronization between lip movements and the corresponding spoken words, resulting in low and usually unacceptable quality. In addition, at USB frame-rates, the image stream takes on a 'sequence of photos' perception rather than a smooth and continuously flowing character.

Therefore, improved systems and methods are desired for adding content and/or communication distribution functionality to co-located computer systems, such as in a video-conferencing system.

SUMMARY OF THE INVENTION

The present invention comprises various embodiments of a system comprising one or more centrally located, e.g., co-located, computers and respective remote human interfaces, wherein the system supports enhanced communications and/or content delivery and distribution.

In one embodiment the system may include a cabinet or chassis, referred to as a cage, which has a plurality of slots. The computers may include computer cards (also referred to as "computer-on-a-card" or "blade") which may be adapted to be inserted into respective slots of the cage. The cage may include a cage connector which is adapted to couple to an edge connector on each inserted computer card. Each computer card, referred to as a blade, may be operable to slide into a slot the computer cage, thereby engaging the computer card edge connector with the cage connector. Other forms of computers may also be used in the invention, the blade/cage form being but one exemplary embodiment. Thus, in various embodiment, the co-located computers may be included in a common support structure, e.g., in one or more rack-mount structures.

A "blade switch" may be operable to couple to each of the blades in the cage. A "video switch" may be operable to couple to the blade switch, and may be operable to route video content to and/or from any of the blades. The system preferably includes a plurality of human interfaces located remotely from the co-located computers. The components of each human interface may include a keyboard, a pointing device such as a mouse, a display device such as a computer monitor, and/or any other human interface components. In one embodiment, each of the human interfaces corresponds to one of the computing systems. Each computer may communicate with the human interface by sending and receiving encoded human interface signals transmitted over one or more connecting cables.

Each computer may include all the elements that make up a standard personal computer, such as a PC motherboard with a microprocessor CPU, memory, and network and interface logic, configured on a single card, and may be referred to as a computer card. In one embodiment, the network logic may include a LAN interface, Ethernet, or other network interface. In one embodiment, the interface logic may include keyboard, mouse, video, audio, USB, and/or any other interface circuitry associated with a PC motherboard, as well as human interface logic. The computer card may also include one or more hard disk drives or optical drives and a power supply which may be operable to convert the local main power to the appropriate voltages for the computer. The computer card may also include an interfacing edge connector, which may be operable to transmit video, mouse, keyboard, USB, and Ethernet signals, as well as any other peripheral or network signals to the user interface or a network, respectively.

Thus, in a preferred embodiment, the system includes a plurality of computing systems, where the plurality of computing systems are located at a common location, and a plurality of human interfaces, where each of the human interfaces is located remotely from the common location, and where each of the human interfaces includes a display device for displaying images. In one embodiment, at least one of the plurality of human interfaces includes a plurality of display devices, e.g., a plurality of computer monitors. In some embodiments, each of at least a subset of the human interfaces includes a camera for acquiring an image, e.g., for use in a video conferencing system.

A plurality of communication mediums may couple each of the plurality of computing systems to at least one of the plurality of human interfaces. A video manager may couple to each of the plurality of computing systems. The video manager may operate to selectively insert video data (analog or digital) from an external source into the video data (analog or digital) output from the computing system for display. Thus, the display device may operate to display the first image including the second image. In one embodiment, the first display device may be operable to display a PIP (Picture-In-Picture) image including at least a portion of the first image and at least a portion of the second image, e.g., may display the video data using a PIP mechanism.

In a first embodiment, a first computing system may be operable to generate first video data for display on a display device in a first human interface, where the first video data corresponds to a first image, and where the first video data is arranged in a scan line format. The video manager may be operable to receive second video data corresponding to a second image from a source, e.g., a content or communications source, and insert the second video data into a location in the first video data. In one embodiment, the first video data and second video data comprise digital data. As one example, the video manager may operate to selectively access portions of the first video data and second video data from different portions of memory, e.g., on a scan line basis, and provide the combined digital data for display. For example, the combined digital data may be transmitted for display. Alternatively, the combined digital data may be provided to D/A converters for conversion to analog video signals for display.

In a second embodiment, where the second video data comprises analog video signals, the second analog video signals are inserted "on the fly" into the first analog video signals corresponding to the first video data as the first analog video signals are output from the computing system. The combined first and second analog video signals (referred to as third analog video signals) are transmitted across the communication medium to the remote human interface. The display device of the first human interface may then operate to display a third image based on the third analog video signals, where the third image includes at least a portion of the first image and at least a portion of the second image, e.g., in PIP format.

In one embodiment, the video manager may be further operable to: modify format, protocol, size, and/or resolution of the second image for display on the display device of the first human interface, optionally in response to command signals specifying the display attributes of the display device.

In one embodiment, the second image may be received from a content source. For example, in one embodiment, the second image may be received from an external image source over a network, or from other image sources such as, for example, television sources (cable, satellite, broadcast, etc.), digital or analog video sources, etc.

As described above, in one embodiment, the first image may include first analog video signals, where the second image received from the content source comprises second analog video signals in a scan line format. In this embodiment, the video manager may be operable to: store the second image in the memory medium, receive the first analog video signals from the first computing system, retrieve the stored second image from the memory medium in digital form, convert the second image from digital form to the second analog video signals, and insert the second analog video signals into the first analog video signals on a scan line basis, thereby generating the third video signals.

In another embodiment, each of at least a subset of the plurality of human interfaces may include an audio device. In this case the video manager may be further operable to: receive audio signals corresponding to the first analog video signals, and transmit the audio signals with the third analog video signals to the first human interface for presentation to a user of the first human interface.

In other embodiments, the second image may be received from a communication source. For example, each of at least a subset of the human interfaces may include a camera for acquiring an image. The second image may be received from a camera comprised in a second human interface of the plurality of human interfaces. In one embodiment, the second image may include a video-conferencing image of a user of another one of the computing systems. In yet another embodiment, the video manager may be operable to selectively insert a plurality of second images into the first image generated by the first computing system for display on the first display device, where, for example, the plurality of second images include video-conferencing images of users of other ones of the computing systems. In one embodiment, the second image may be received from an external camera over a network, for example, from a videoconference participant at an external station.

In one embodiment, the memory medium in which the second image (or plurality of second images) is stored comprises a frame buffer (also referred to as a frame grabber), where the frame buffer represents or corresponds to the screen of a target display device. For example, there may be multiple second images stored in the frame buffer at locations corresponding to their intended display locations on a target display device. The images (e.g., on a scan line basis) may be read from the frame buffer when the corresponding portions of the first image are being transmitted, and inserted such that they replace the corresponding portions of the first image.

In one embodiment, the first computing system may be operable to generate a sequence of first images to be displayed on the first display device in the respective first human interface, where the video manager may be operable to selectively insert a sequence of second images into the sequence of first images generated by the first computing system for display on the first display device, where each second image of the sequence of second images may be inserted into a respective one of the sequence of first images.

It should be noted that in a preferred embodiment, the video manager may be operable to selectively insert the second image(s) into the first image without using any CPU cycles of the computing systems. In other words, in preferred embodiments of the present invention, the insertion process may incur no extra load on the computer systems.

In one embodiment, the video manager may include a video switch comprising a memory medium, and a processor coupled to the memory medium. The video manager may also include a content processor coupled to the video switch through one or more video buses, where the video switch may be operable to couple to a plurality of co-located computing systems, and to further couple to a plurality of human interfaces, where each of the human interfaces may be located remotely from the co-located computing systems, where each of the human interfaces includes a display device for displaying images.

As described above, the video switch may be further operable to: receive a first image generated by a first computing system to be displayed on a first display device in a respective first human interface, where the first image comprises first analog video signals in a scan line format, receive a second image from the content processor, where the second image comprises second analog video signals in the scan line format, and selectively insert the second image into the first image generated by the first computing system for display on the first display device by inserting the second analog video signals into the first analog video signals.

In one embodiment, the video manager may be further operable to: select a first video bus from the one or more video buses, receive the second image from the content processor over the first video bus, and store the second image in the memory medium, where, in selectively inserting a second image into the first image generated by the first computing system for display on the first display device, the video manager may be operable to retrieve the second image from the memory medium and insert the second image into the first image.

In one embodiment, (either in addition to, or instead of, the content processor) the video switch may include a communications processor coupled to the video switch through one or more video buses. In this embodiment, the communications processor may be operable to receive a first image from a camera comprised in a respective first human interface.

The video switch may be further operable to: receive a second image generated by a first computing system to be displayed on a first display device in a respective second human interface, receive the first image from the communications processor, and selectively insert the first image into the second image generated by the first computing system for display on the first display device, as described above. Similarly, the video manager may be further operable to: select a first video bus from the one or more video buses, receive the first image from the communications processor over the first video bus, and store the first image in the memory medium, wherein, in selectively inserting a first image into the second image generated by the first computing system for display on the first display device, the video manager is operable to retrieve the first image from the memory medium and insert the first image into the second image.

In one embodiment, the system may comprise a videoconferencing system, where, in addition to a display device, each of the human interfaces includes a camera for acquiring an image, and where each computing system is operable to generate a respective first image to be displayed on a display device in a respective human interface. The video manager may be operable to: receive the respective first image from a respective one of the plurality of computer systems, receive one or more respective second images from a respective one or more cameras of a respective one or more human interfaces of the plurality of human interfaces, selectively insert the respective second images into the first image, thereby generating a third image comprising at least a portion of the respective first image and at least a portion of each of the respective second images, and transmit the third image to the human interface for display on the display device.

In one embodiment, the video manager may be further coupled to one or more external cameras over a network, where each of the one or more external cameras may be operable to acquire a respective fourth image. The video manager may be further operable to: receive one or more respective fourth images respectively from the one or more external cameras, selectively insert the one or more respective fourth images into the first image, thereby generating the third image comprising at least a portion of the respective first image and at least a portion of each of the respective second images, and at least a portion of each of the respective fourth images, and transmit the third image to the human interface for display on the display device. Of course, as is well known, the images described above are preferably comprised in video data that may also include audio signals or data that correspond to the video images.

Thus, the system may implement a videoconferencing system that may facilitate video/audio communications between a plurality of videoconference participants, including participants using human interfaces both internal and external to the system.

Thus, various embodiments of the present invention may provide means for delivering content and/or communications to and/or from a plurality of remote human interfaces.

BRIEF DESCRIPTION OF THE DRAWINGS

Other advantages and details of the invention will become apparent upon reading the following detailed description and upon reference to the accompanying drawings in which:

FIGS. 16A-16E illustrate scaled inserted images in a computer display;

Figure 1A:
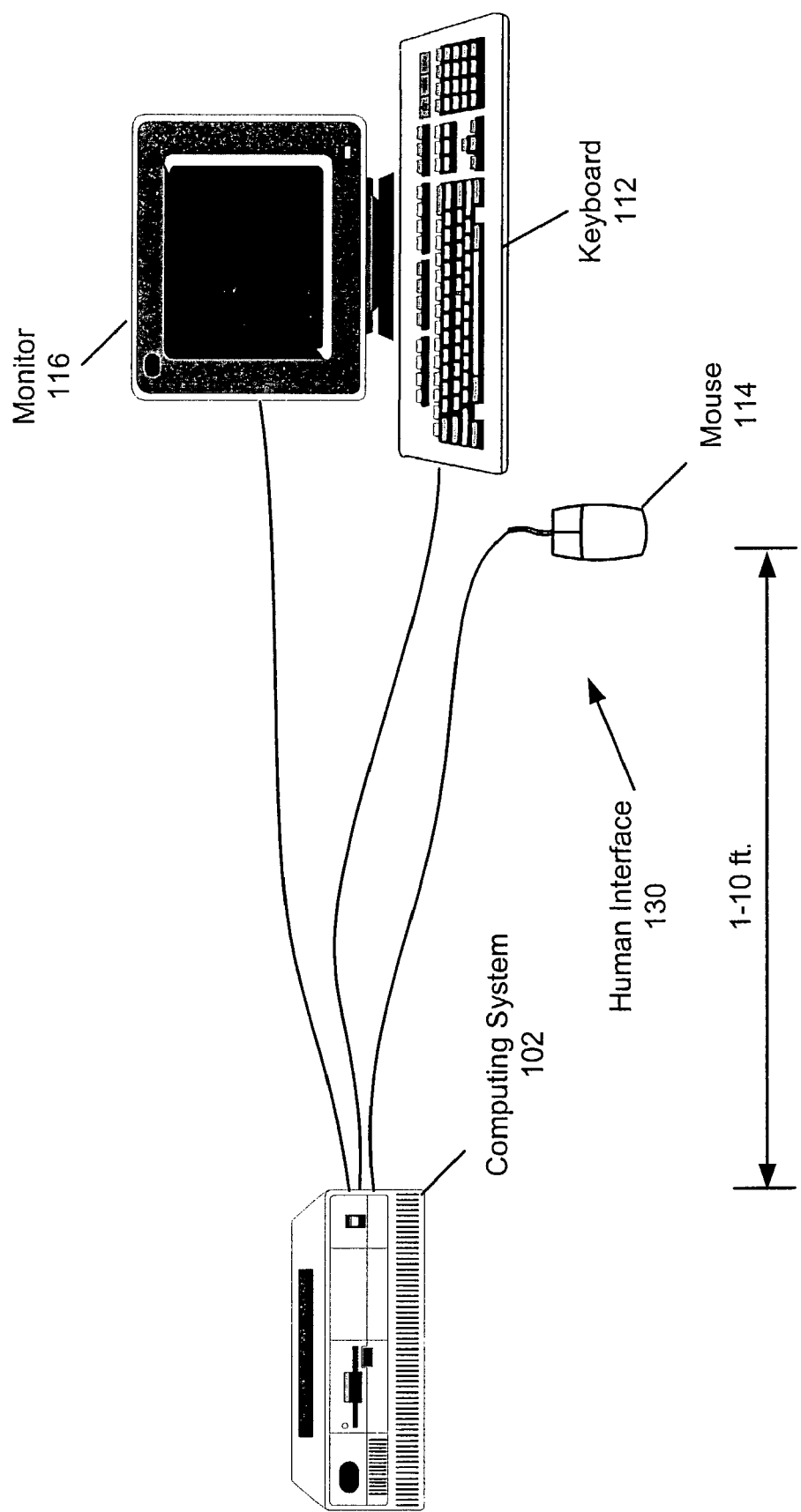
FIG. 1A illustrates a prior art computer system having a computing system and human interface devices directly coupled to the computing system through standard human interface cables.
Figure 1B:
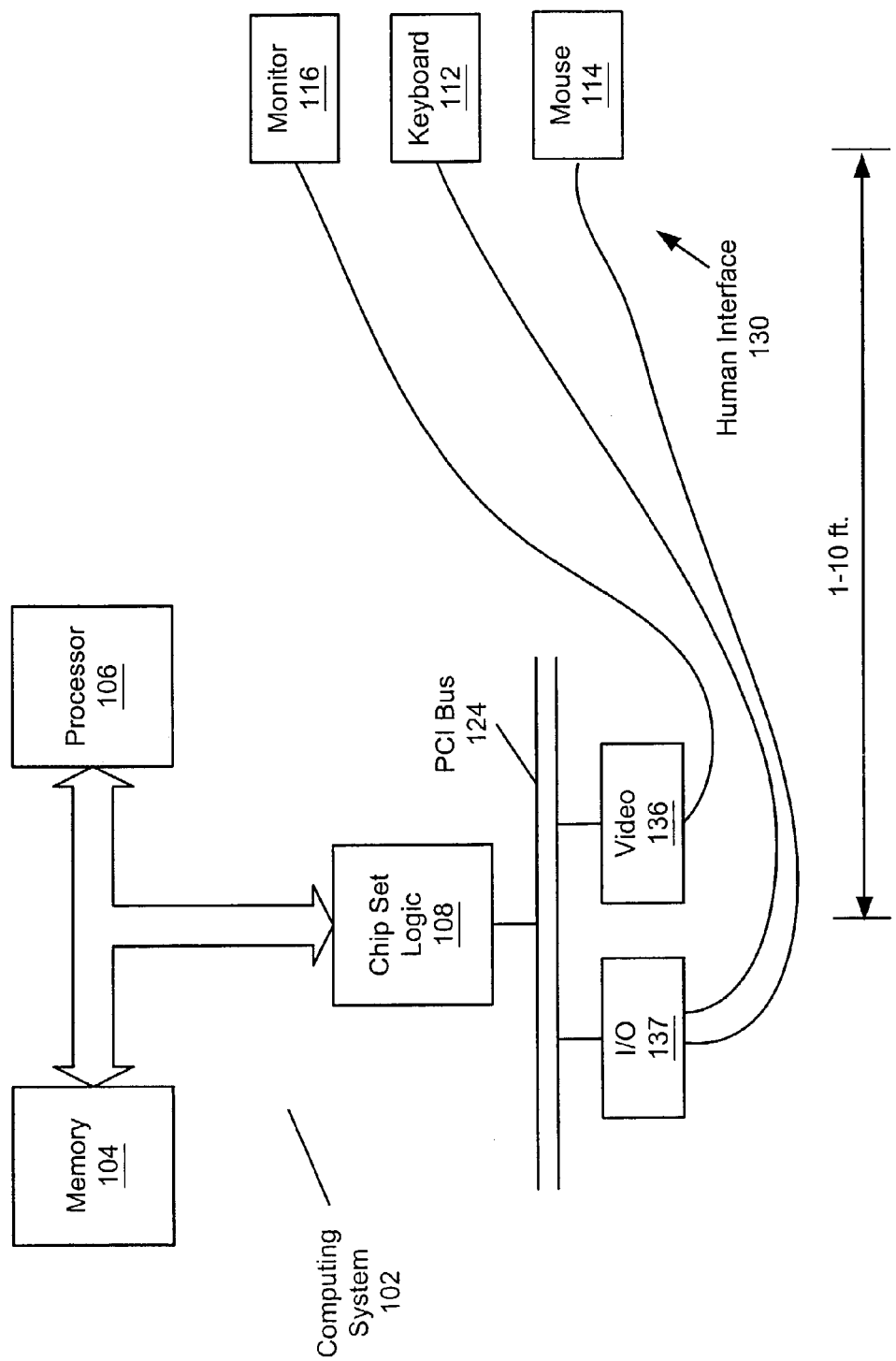
FIG. 1B is a block diagram of the prior art computer system of FIG. 1A.
Figure 2:
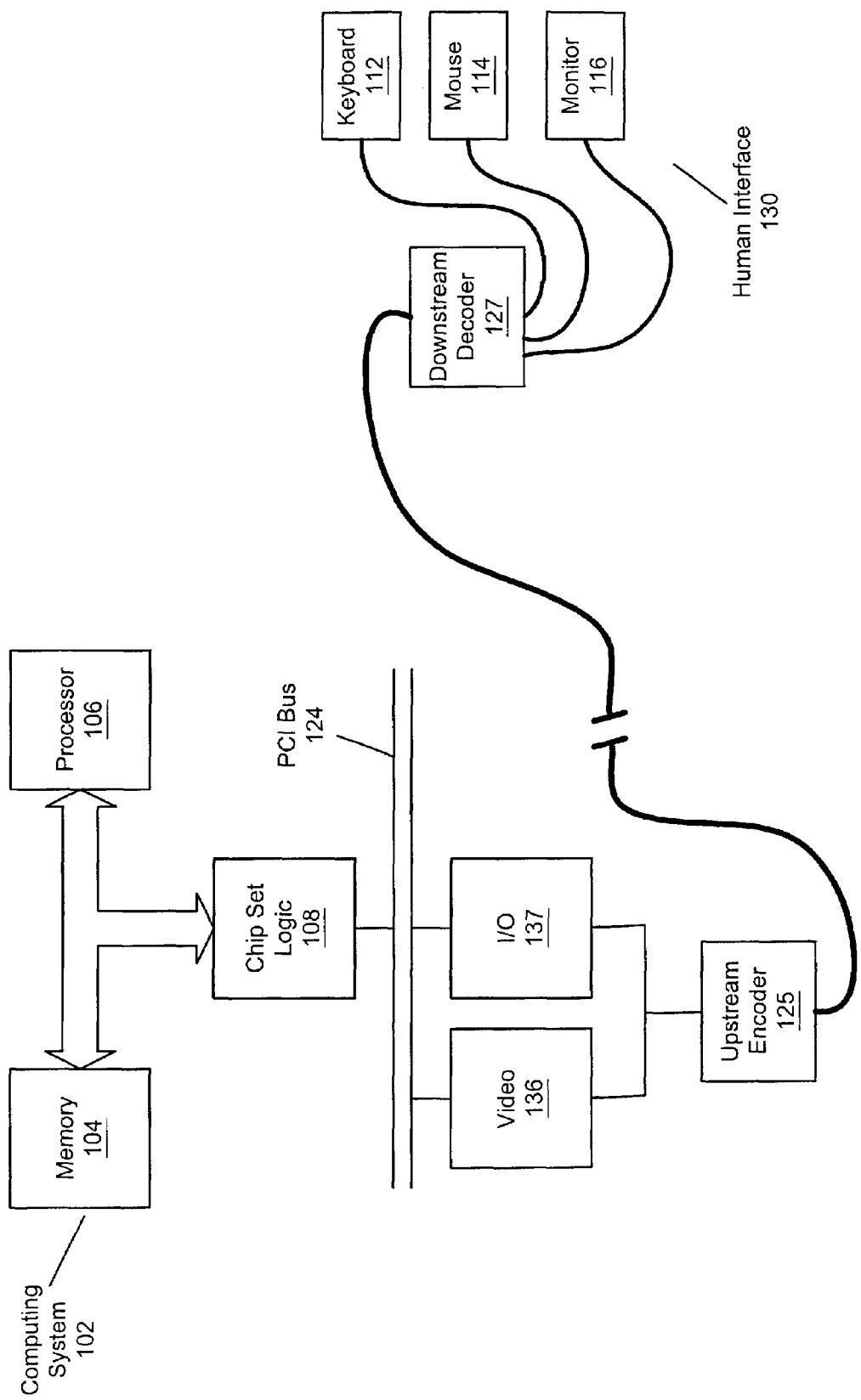
FIG. 2 is a block diagram of a prior art computer system having a computing system and one or more human interface devices remotely located from the computing system, where the computing system generates human interface signals that are encoded for transmission to the remote location and then converted back to human interface signals for provision to the one or more human interface devices.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Provisional Patent No. 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely, is hereby incorporated by reference in its entirety as though fully and completely set forth herein.

U.S. Pat. No. 6,037,884 titled "Technique To Encode Multiple Digital Data Streams In Limited Bandwidth For Transmission In A Single Medium", which was filed Oct. 27, 1997, whose inventor is Barry Thornton, is hereby incorporated by reference in its entirety as though fully and completely set forth herein.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely, is hereby incorporated by reference in its entirety as though fully and completely set forth herein.

U.S. Pat. No. 5,926,172, titled "Video Data Transmission And Display System And Associated Methods For Encoding/Decoding Synchronization Information And Video Data", which was filed Sep. 23, 1997, whose inventor is Williams Hanley, is hereby incorporated by reference in its entirety as though fully and completely set forth herein.

U.S. patent application Ser. No. 09/179,809 titled "A Technique To Transfer Multiple Data Streams Over A Wire Or Wireless Medium" is hereby incorporated by reference in its entirety as though fully and completely set forth herein.

U.S. patent application Ser. No. 09/619,989 titled "System And Method For Providing A Remote Universal Serial Bus", which was filed Jul. 20, 2000, whose inventors are Dan Barrett, Mike Barron, and Andrew Heller, is hereby incorporated by reference in its entirety as though fully and completely set forth herein.

U.S. patent application Ser. No. 09/680,760 titled "System And Method For Combining Computer Video And Remote Universal Serial Bus In An Extended Cable", which was filed Oct. 6, 2000, whose inventor is Barry Thornton, is hereby incorporated by reference in its entirety as though fully and completely set forth herein.

U.S. patent application Ser. No. 09/892,324 titled "Computer System Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. patent application Ser. No. 09/892,331 titled "System Comprising Multiple Co-Located Computer Systems Each Having a Remotely Located Human Interface Using Computer I/O Bus Extension", which was filed Jun. 25, 2001, whose inventors are Ray DuPont, Mike Tullis, and Barry Thornton, is hereby incorporated by reference in its entirety as though fully and completely set forth herein.

U.S. Pat. No. 6,067,098 titled "Video/Graphics Controller Which Performs Pointer-Based Display List Video Refresh Operation", which was filed Apr. 6, 1998, whose inventor is Thomas A. Dye, is hereby incorporated by reference in its entirety as though fully and completely set forth herein.

Figure 3A:
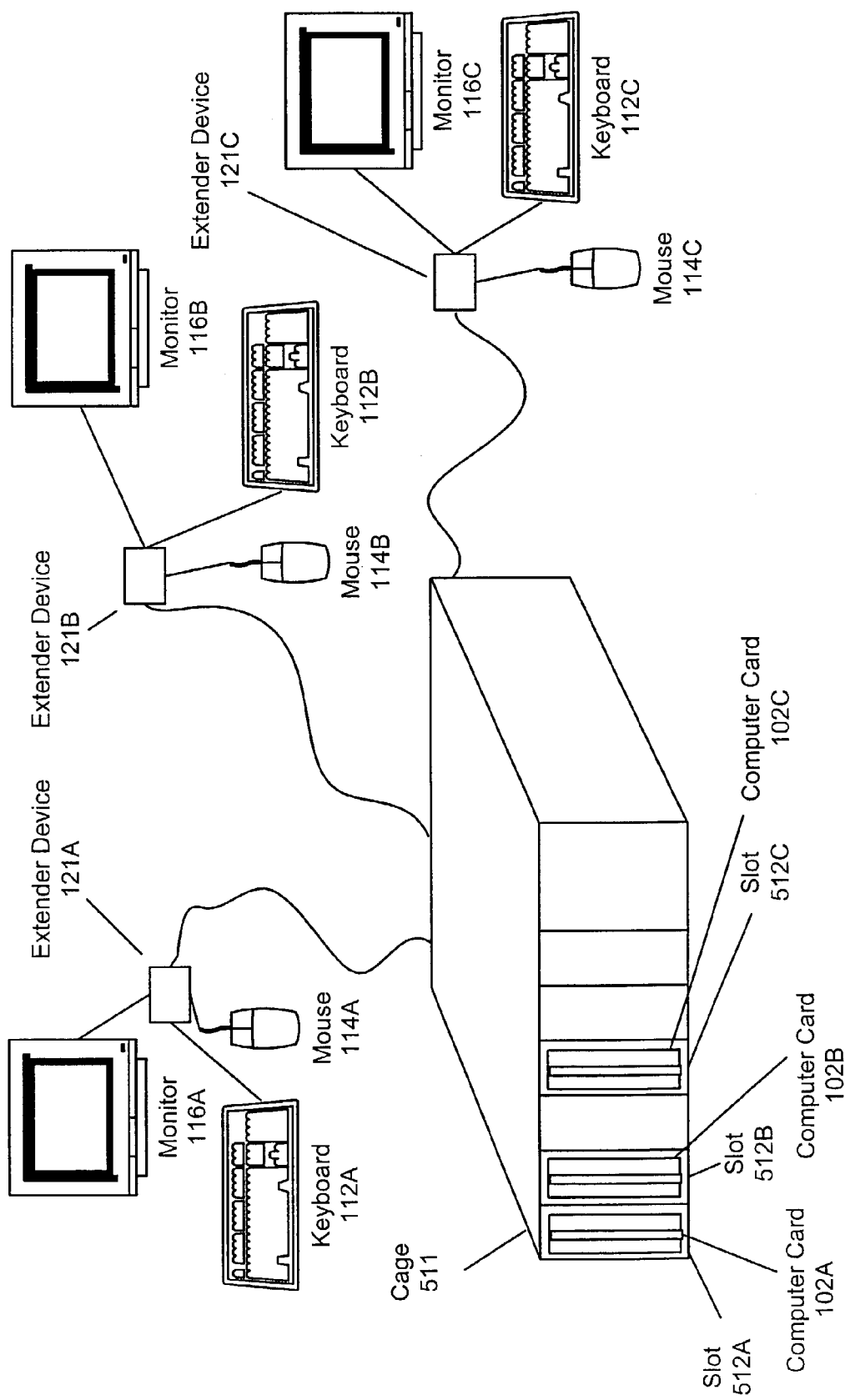
FIG. 3A illustrates a plurality of co-located computing systems coupled to corresponding remote human interfaces through extender devices, according to one embodiment.
Figure 3B:
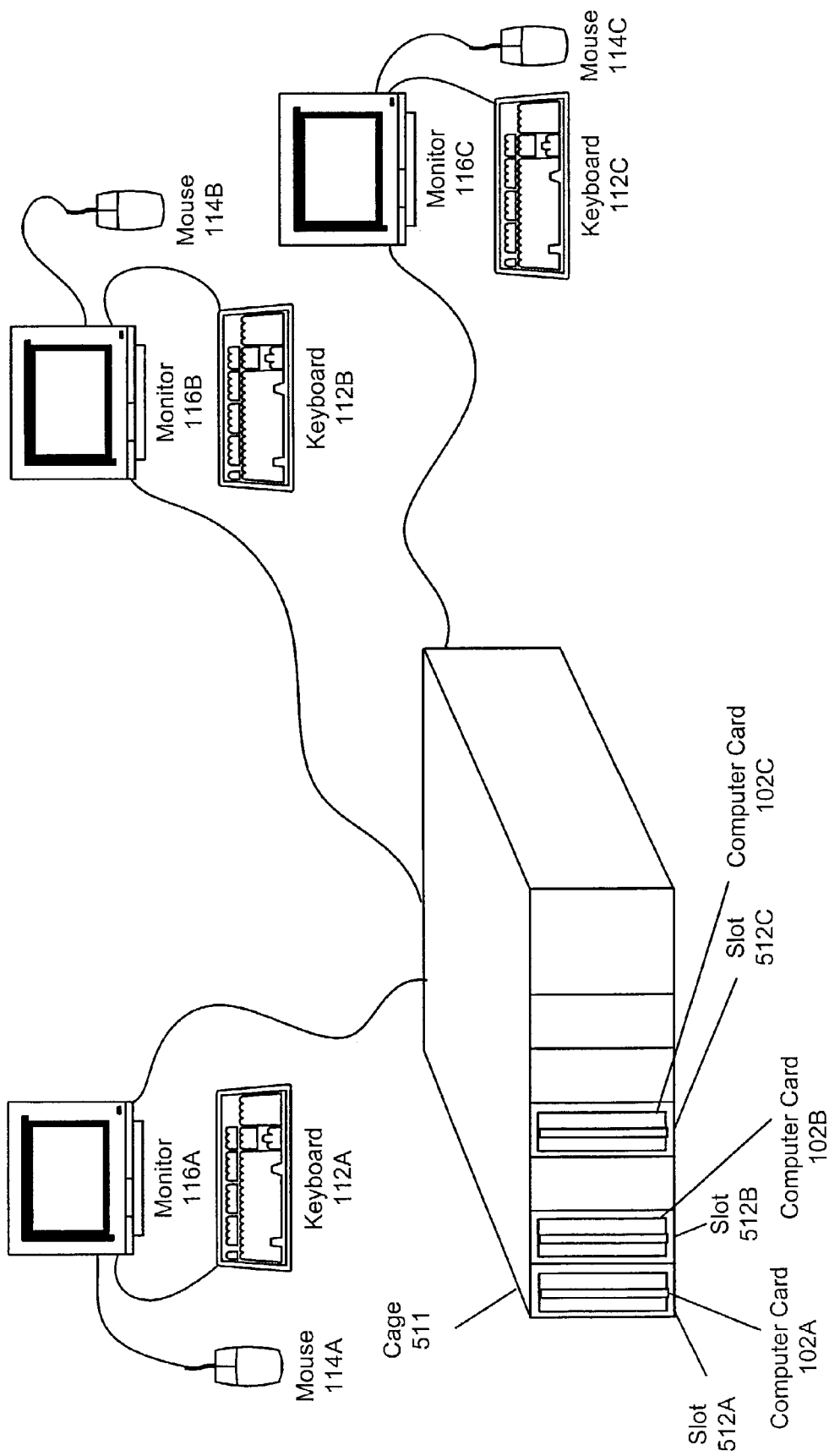
FIG. 3B illustrates the system of FIG. 3A, where each extender device is included in a corresponding monitor, according to one embodiment.

FIGS. 3A-3B—Co-Located Computing Systems with Remote Human Interfaces

FIGS. 3A and 3B illustrate embodiments of the invention where a plurality of computer cards 102A-102C are installed in respective slots of cage 511, and where each computer card is be coupled via a transmission medium to a respective human interface, i.e., one or more human interface devices. It should be noted that in the systems described herein, the plurality of computing systems 102 may be a subset of a greater plurality of computing systems included in the system, i.e., there may be other computing systems included in the system that are not shown.

As shown in FIG. 3A, computer card 102A may be inserted into cage slot 512A, and may thereby be coupled to keyboard 112A, mouse 114A, and monitor 116A, which include the human interface for that computer card. Computer cards 102B and 102C may be similarly inserted into respective slots 512B and 512C and coupled to respective human interfaces as shown. Thus, the computer cards 102A-102C may all be installed in the cage 511 at a central location, while the user interface for each computer card may be located remotely from the cage 511, such as at the respective work areas of the users of the computer cards. It should be noted that the human interface devices shown here are for illustration purposes only, and that the actual type and number of devices included in each human interface may vary.

As FIG. 3A also shows, in one embodiment, the one or more human interface devices which compose each human interface 130 may be coupled to a transmission medium through an extender device 121, such as a PCI or USB extender device. For example, the human interface associated with computer card 102A may be coupled to the transmission medium through the extender device 121A, as shown. In other words, the monitor 116A, the keyboard 112A, and the mouse 114A (and any other human interface device included in the human interface for computer card 102A) may plug in to the extender device 121A. Similarly, as FIG. 3A shows, the human interface devices corresponding to computer cards 102B and 102C may be coupled to their respective transmission mediums through respective extender devices 121B and 121C.

FIG. 3B illustrates a computer system similar to that described with reference to FIG. 3A, but where each extender device 121 is included in the monitor 116 of each respective human interface 130. Thus, as FIG. 3B shows, in one embodiment the monitor 116 of each human interface may provide ports for coupling the other human interface devices to the serial bus 110. As mentioned above, the inclusion of the extender device 121 in the monitor 116 is meant to be an illustrative embodiment and is not intended to limit the invention thus. In other words, any of the human interface devices may be adapted to include the extender device 121, through which the other human interface devices may couple to the serial bus 110.

Figure 4:
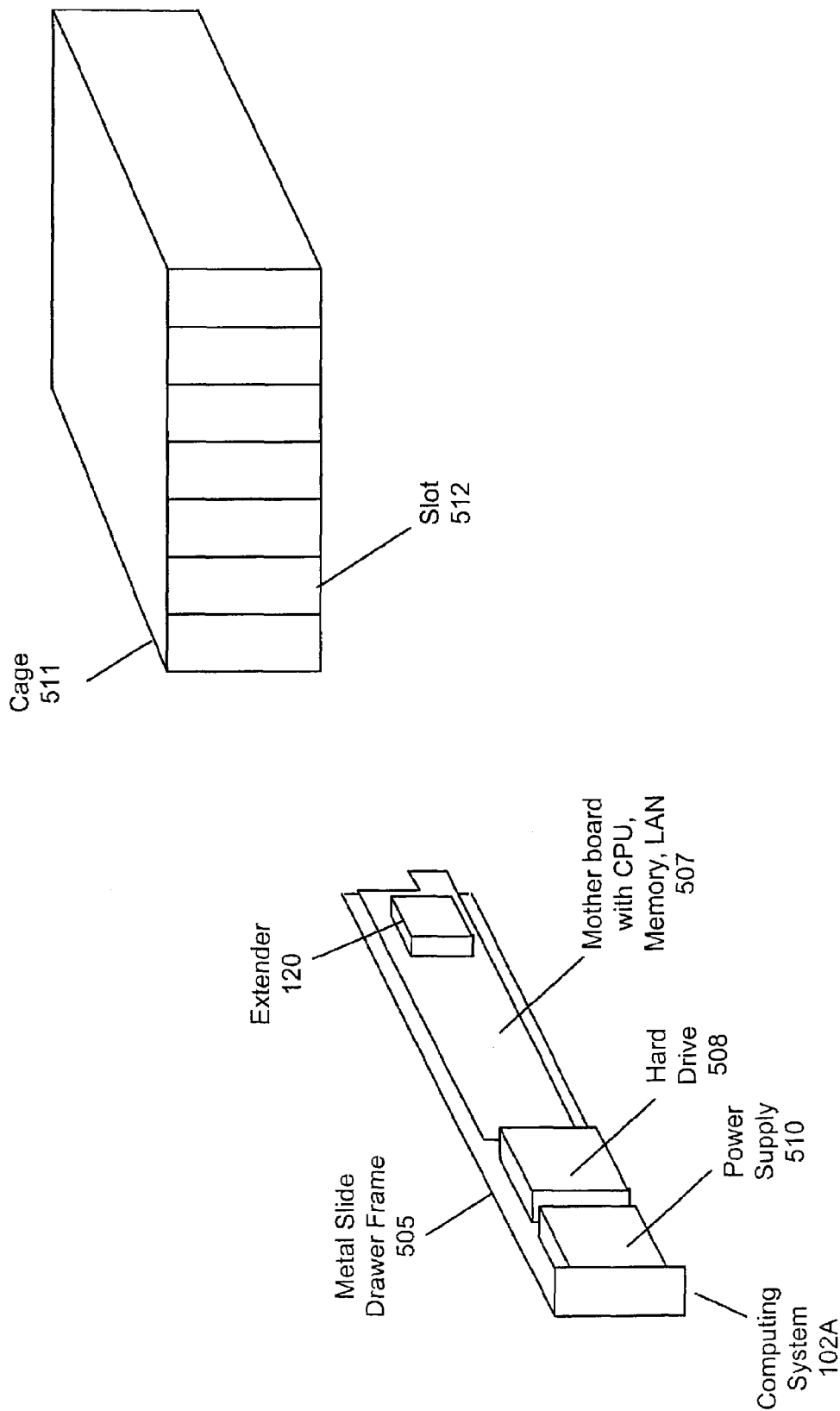
FIG. 4 illustrates a computer on a card and a cage for co-locating a plurality of such computers, according to one embodiment.

FIG. 4—A Computing System On A Card

FIG. 4 illustrates the computing system of FIGS. 3A and 3B, according to one embodiment. As FIG. 4 shows, the computing system 102 may include a motherboard 507 with CPU, memory, and networking logic, as well as a power supply 510, and possibly a hard drive 508. Thus, the computing system 102 may comprise a "computer on a card", also referred to as a "computer card" or "blade". As shown, the computing system 102 may further include an extender 120 which may operate to extend the operational distance for a human interface located remotely from the computing system 102.

In one embodiment the computing system 102 may include a cabinet, referred to as a cage 511, having a plurality of slots 512. The computer card 102 may be operable to be inserted into a slot 512 of the cage 511, thereby making contact with a cage connector which may couple to the transmission medium 110. Thus, the computer card may include a complete PC on a single slide drawer frame which may be only 3 rack units high (5.25 inches), and thus may occupy a much smaller space than standard PC units. The cage 511 may be operable to receive a plurality of such computer cards via the plurality of slots 512, thus providing a means for co-locating a plurality of computing systems, each having a remote human interface, as described above. The cage may include a backplane or communication medium connecting each of the cage connectors, thereby enabling networking of the computer cards, such as in an Ethernet network. Further details of the computer card may be found in U.S. patent application Ser. No. 09/728,667 titled "Computer on a Card with a Remote Human Interface", and U.S. patent application Ser. No. 09/728,669 titled "A System of Co-Located Computers in a Framework Including Removable Function Modules for Adding Modular Functionality" which are both incorporated by reference above.

FIG. 5A—Computer System with Remote Human Interface

Figure 5:
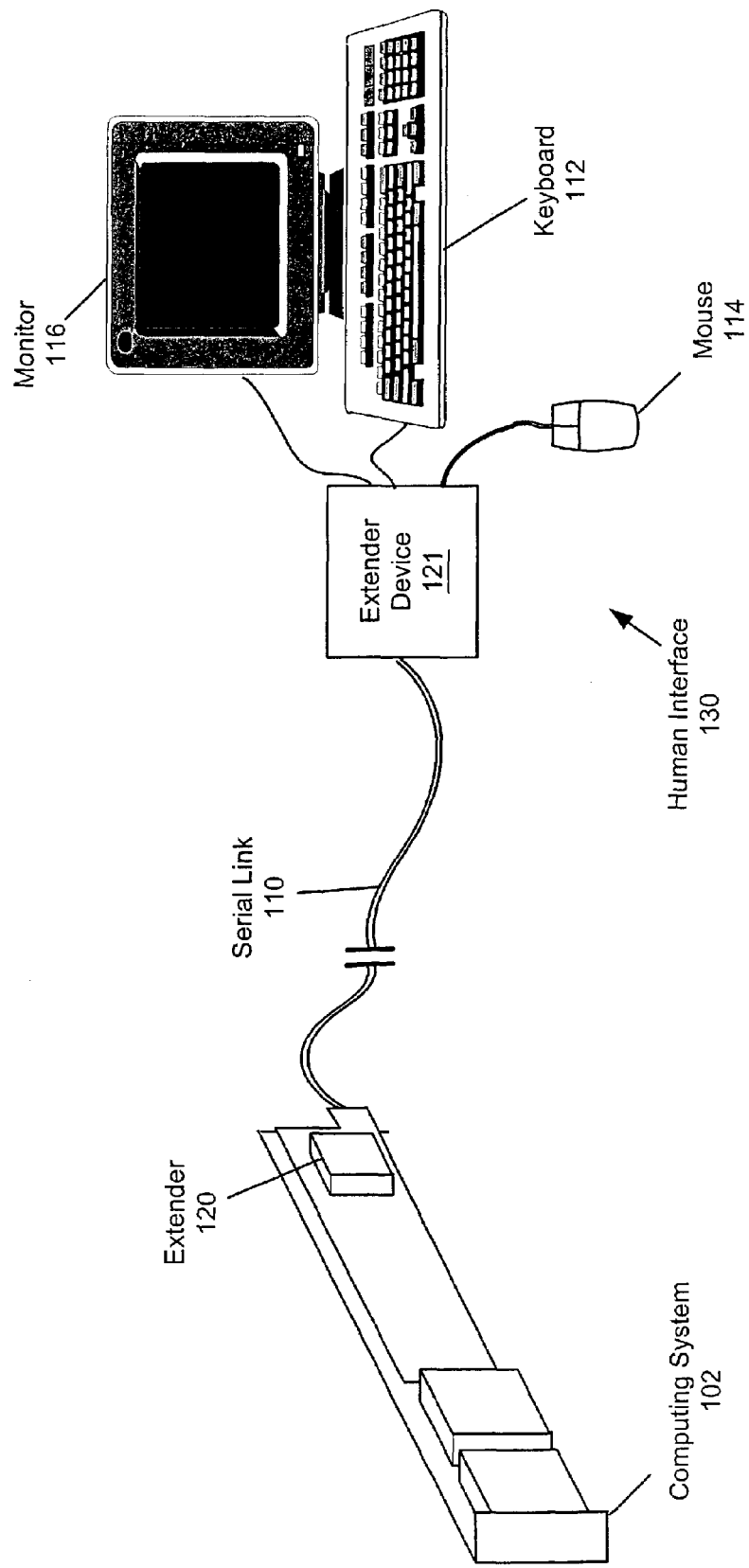
FIG. 5 illustrates a computer system using first and second extenders to communicate between a computing system on a card and a remote human interface, according to one embodiment.

FIG. 5 illustrates a computer system with a remote human interface, according to one embodiment. This embodiment is exemplary, and various other embodiments of the invention may be employed.

As FIG. 5 shows, the computer system may include a computing system 102 located at a first location, which is coupled to one or more human interface devices (collectively referred to as a human interface 130) located at a second location through a transmission medium 110, e.g., serial bus or link 110. The second location is remotely located relative to the first location. As used herein, the terms "first" and "second" are each used to refer to a location of a device at either the computing system location or at the human interface location. Thus a "first" device may be either at the computing system side or the human interface side, and similarly a "second" device may be either at the computing system side or the human interface side.

As FIG. 5 indicates, the computing system 102 may be a "computer on a card" or "blade", i.e., the computing system 102 may be included on a circuit card which may include standard computing system components such as a CPU, memory, and power supply. In one embodiment, the computing system 102 may further include an extender 120, which may couple to the serial bus 110 and which may operate in conjunction with an extender device 121 at the remote location (the location of the remote human interface 130) to extend the functional distance between the computing system 102 and the human interface 130. It is noted that the extender 120 may be a USB extender (e.g., using a USBX protocol), a PCI extender, or an extender for any other type of bus. Note that as used herein, the term "USBX" refers to an extension protocol which allows USB based signals (i.e., based on any past, present, or future USB standards) to be transmitted distances greater than generally allowed by the (past, present, or future) USB protocol. For further information on bus extension technologies, please see U.S. patent application Ser. No. 09/619,989 titled "System And Method For Providing A Remote Universal Serial Bus", U.S. patent application Ser. No. 09/892,324 titled "Computer System Having a Remotely Located Human Interface Using Computer I/O Bus Extension", and U.S. patent application Ser. No. 09/892,331 titled "System Comprising Multiple Co-Located Computer Systems Each Having a Remotely Located Human Interface Using Computer I/O Bus Extension", which were incorporated by reference above.

In one embodiment, the one or more human interface devices may be coupled to the transmission medium 110 through the extender device 121, also located remotely from the computing system 102, which may be operable to extend the functional distance between the computing system 102 and the human interface. In one embodiment, the extender device 121 may include an extender 120, e.g., an encoder/decoder and I/O device hub, described in more detail below. In one embodiment, the human interface 130, i.e., the one or more human interface devices, may be located more than 10 feet (or 20 feet) from the computing system 102. Thus, in various embodiments, the human interface may be located at a distance from the computing system 102 which is greater than typically allowed in prior art "non-extended" computer systems.

Thus, as used herein, the term "remotely located" is intended to refer to separation distances greater than those possible using current conventionally designed cables such as those provided when purchasing a PC. Accordingly, the term "remotely located", as used herein, generally refers to separation distances between 10 and 1,000 feet. However, as it is possible to utilize the disclosed techniques to separate the computing system 102 and the human interface 130 by distances greater than 1,000 feet, it should be clearly understood that the aforementioned upper limit of 1,000 feet is given by way of example and should not be construed as a limitation on the scope of the present invention. The term "remotely located" may also refer to a range greater than 15 feet, greater than 20 feet, etc.

The one or more human interface devices may include any of a monitor 116 a keyboard 112, a mouse 114, or any other human interface device. Other examples of human interface devices contemplated may include audio speakers (or headphones), a microphone, a printer, a scanner, a telephone, a removable storage medium, a biometric sensor, a barcode reader, a VR (Virtual Reality) interface device, and a PDA (Personal Digital Assistant) IR (Infra-Red) device, among others. As mentioned above, the computing system 102 may be coupled to the one or more human interface devices by a transmission medium 110. In a preferred embodiment the transmission medium may be a serial link or bus 110. Various embodiments of the serial bus may include a 4-wire transmission cable, e.g., cat5 cable, optical fiber, a wireless serial transmission medium, a switched fabric bus, e.g., an Infiniband bus, an IEEE 1394 or IEEE 1394.2 bus, or any other serial transmission medium. In another embodiment, the transmission medium 110 may be a parallel bus.

Figure 6:
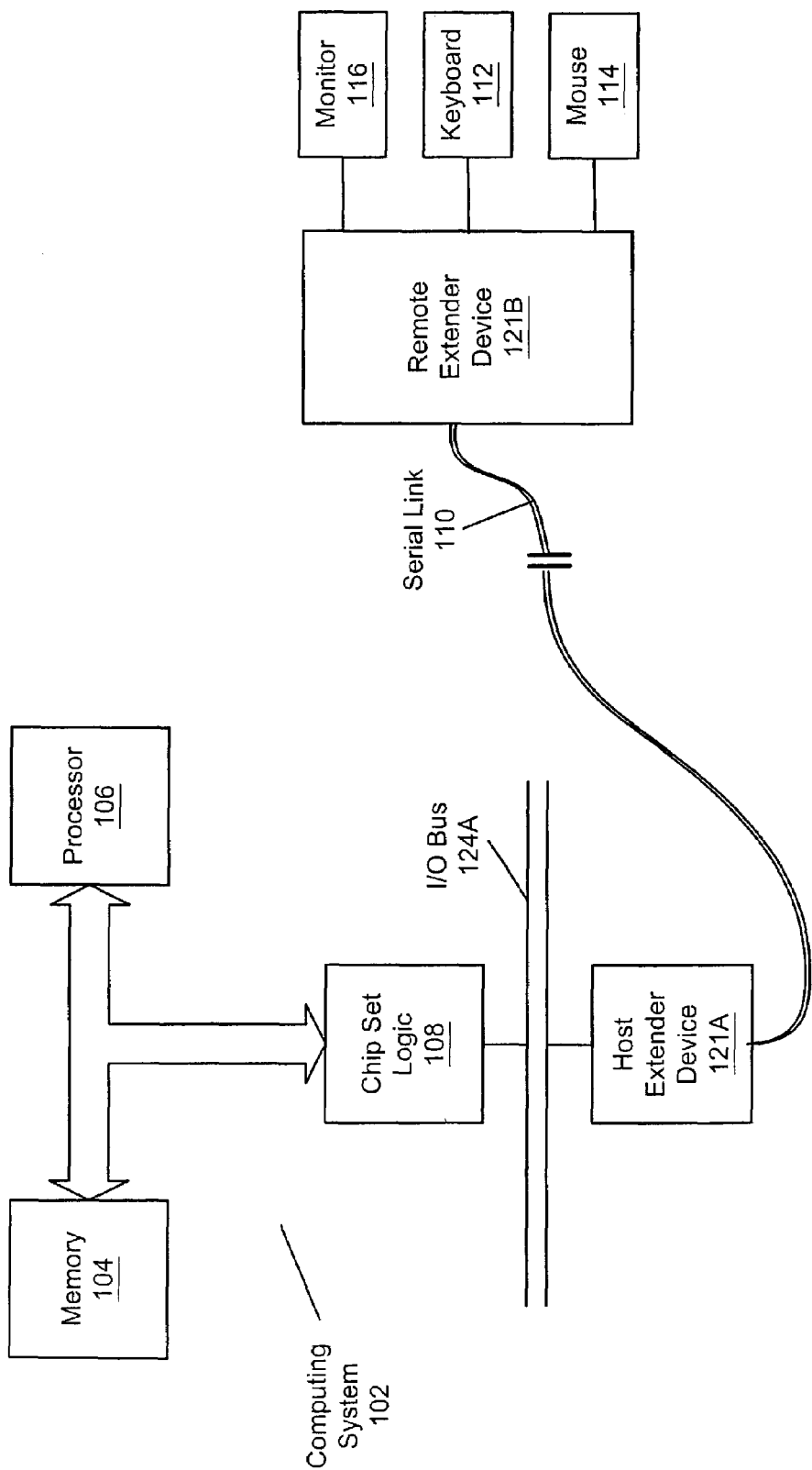
FIGS. 6 and 7 are block diagrams of the computer system of FIG. 5, according to various embodiments.
Figure 7:
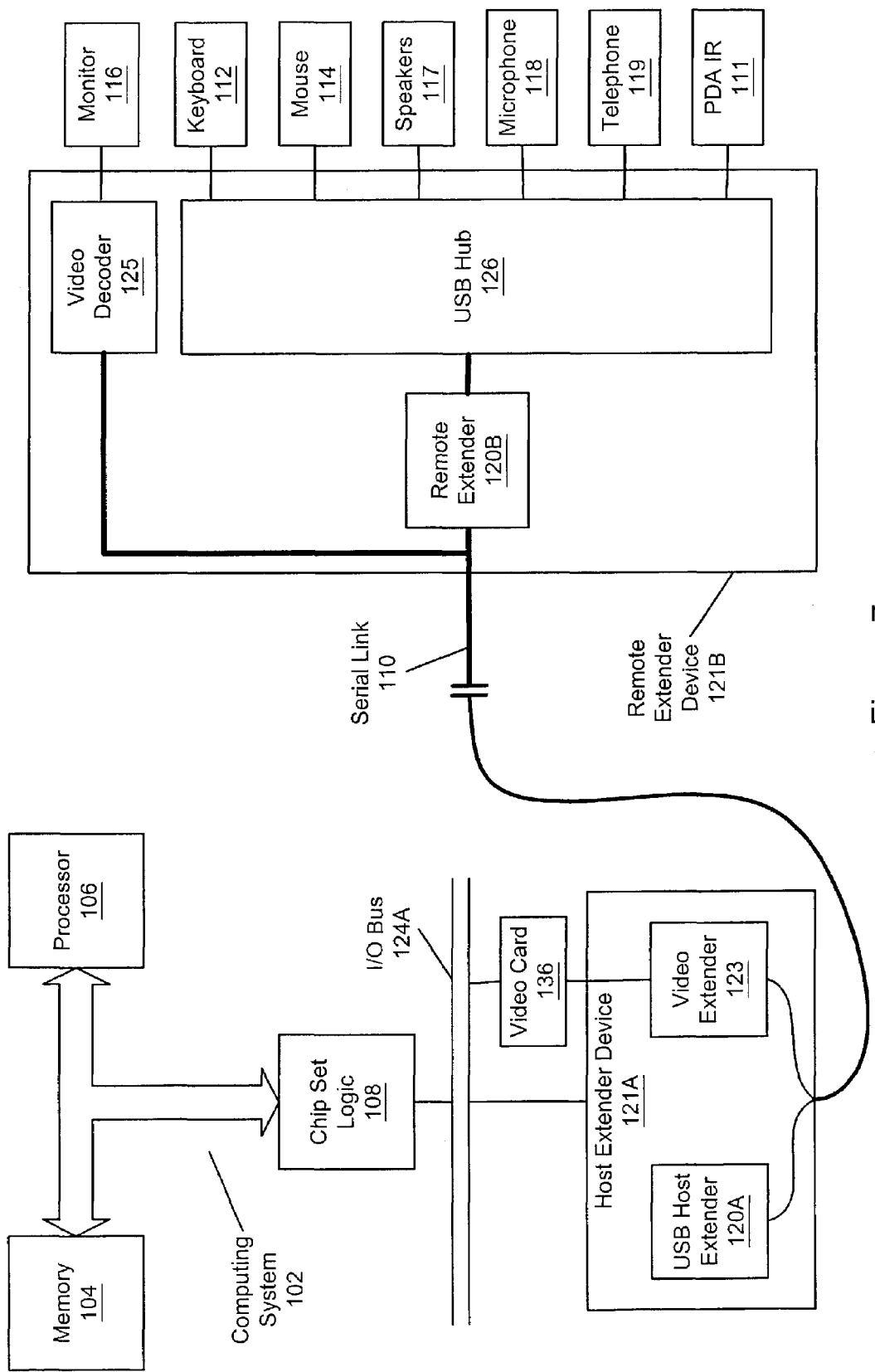

FIGS. 6-7—Block Diagrams of a Computing System with Remote Human Interface

FIGS. 6 and 7 are block diagrams of two embodiments of the computer system described above with reference to FIG. 5. As FIGS. 6 and 7 show, the computing system 102, at a first location, may be coupled through a transmission medium, such as serial bus 110, to one or more human interface devices of a remote human interface 130, such as keyboard 112, mouse 114, and monitor 116, located at a second location. It should be noted that these embodiments are meant to be illustrative and are not intended to limit the particular embodiments of the invention.

In one embodiment, the computing system 102 may include a CPU or processor 106, a memory medium 104 coupled to the CPU 106, and an I/O bus 124 (e.g., a PCI bus or other local bus) coupled to the CPU 106, for example, through chip set logic 108. As FIGS. 6 and 7 show, in one embodiment, the computing system 102 may also include an extender device 121A, e.g., a host extender device 121A, coupled to the I/O bus 124, as indicated. The host extender device 121A may operate to receive I/O and video signals from the computer 102 and convert the signals into a form suitable for transmission over the serial link 110 to the remote human interface 130, as described in more detail below. In an embodiment in which the computing system 102 is a computer card 102A (i.e., a circuit card), as described above with reference to FIGS. 3A-5, the extender device 121A may be included on the circuit card or on a module coupled to the circuit card.

As FIGS. 6 and 7 also show, in one embodiment, the computer system may also include an extender device 121B, e.g., a remote extender device 121B, coupled to the one or more human interface devices, where the extender device 121B may be remotely located relative to the first location, i.e., remotely located relative to the computing system 102. The remote extender device 121B may operate to receive encoded signals from the host extender device 121A and decode or convert the signals to video signals and I/O device signals for provision to the monitor 116 and one or more I/O devices, respectively. Similarly, the remote extender 121B may operate to receive I/O signals from the I/O devices and convert the I/O signals into a form suitable for transmission over the serial link 110 to the computer 102, e.g., to the host extender device 121A. The host extender device 121A may then operate to convert the received encoded signals back to I/O signals and transmit the I/O signals to the computer 102, e.g., via the local I/O bus 124. Further details of the host and remote extender devices 121 are provided below. It should be noted that the extender devices 121A and 121B may be any of a variety of extender devices, e.g., may be implemented in accordance with any of the methods described in the U.S. Patents and U.S. Patent Applications incorporated by reference above.

In a preferred embodiment, the host extender device 121A may include a USBX controller 121A, and the remote extender device 121B may include a USB remote root hub 121B, both of which are operable to convert between USB signals and a USB extension protocol, e.g., USBX, where the USBX protocol allows the transmission of USB signals over distances substantially greater than generally allowed by the USB protocol, as described in U.S. patent application Ser. No. 09/619,989 titled "System And Method For Providing A Remote Universal Serial Bus", incorporated by reference above. It should be noted, however, that other buses and protocols may also be used to communicate the I/O and video signals between the host computer 102 and the remote human interface. In one embodiment, the remote extender device 121B may include a C/Port, as provided by ClearCube Technologies, Inc., which operates to encode/decode HI signals for the various HI devices of the remote human interface 130, as described in one or more of the U.S. Patents and Patent Applications incorporated by reference above.

As shown in FIG. 7, in one embodiment, the host extender device 121A may include extension technology for converting and transmitting I/O signals and video signals to the human interface devices at the remote location. For example, in one embodiment, the extender device 121A may include a USB host extender 120A which may be operable to receive I/O signals from the computer 102, e.g., USB signals, and convert the signals into a form suitable for transmission over the serial link 110, e.g., USBX signals. Similarly, in one embodiment, the extender device 121A may also include a video extender 123 which may be operable to receive video signals from the computer and convert the video signals into a form suitable for transmission to the human interface over the serial link 110, e.g., USBX video signals, as shown. In one embodiment, the video extender 123 may couple to a video card 136 which may in turn couple to the I/O bus 124 of the computer 102. In an alternative embodiment, the video card 136 may be included in the extender device 121A.

Thus, in one embodiment, the extender device 121A, e.g., the USB host extender 120A and/or the video extender 123, may transform signals, e.g., USB signals, received from the computer 102 into a special extension protocol, such as, for example, the USBX protocol, and the video extender 123 may receive video signals from the video card 136, and may convert the signals into a form suitable for transmission over the serial link 110, to the remote human interface 130, such as, for example, into USBX video signals.

Similarly, the extender device 121A, e.g., the USB host extender 120A, may operate to receive signals (e.g., USBX signals) from the remote HI 130, e.g., the remote extender device 121B, over the serial link 110, and convert the signals for provision to the computer 102, e.g., may convert the USBX signals to USB signals, which may then be transmitted to the computer 102.

Thus, in one embodiment, the host extender device 121A may include a host extender 120A and a video extender 123 for converting or encoding and/or decoding HI signals for communication with the remote HI.

As FIG. 7 also shows, in one embodiment, the remote extender device 121B, i.e., the extender device 121B at the remote human interface, may include a video decoder 125, coupled to the serial link 110 and to the computer monitor 116. The video decoder 125 may be operable to receive the encoded video signals over the serial link 110, e.g., USBX video signals, and convert the video signals into a form suitable for display by the video monitor 116, e.g., into RGB signals. In the embodiment shown, the remote extender device 121B may also include a remote extender 120B, e.g., an HI encoder/decoder 120B, and I/O device interface circuitry such as a USB hub 126, coupled to the serial link 110 and to one or more I/O devices, e.g., USB devices such as, for example, keyboard 112 and mouse 114, as well as any other kind of I/O device or peripheral desired, including, for example, audio speakers, 117 IP telephones 119, microphones 118, PDA IR elements 111, headphones, printers, bar-code readers, and so on. In a preferred embodiment, the human interface devices are USB devices. It is noted that the one or more human interface devices may be coupled to the human interface circuitry 126 in a number of different ways, including standard interface cables, USB, wireless media, e.g., as specified by the 802.11 protocol, optical fiber, or any other suitable communication medium. The remote extender 120B may operate to receive I/O signals, e.g., USBX signals, from the host extender device 121A, convert the signals into signals suitable for propagation to the I/O devices, e.g., into USB signals, and send the converted signals to the USB hub 126, as shown. The USB hub 126 may then propagate the signals to the respective I/O devices.

Thus, in one embodiment, each computer card may include an I/O bus 124 and a host extender device 121A, and each corresponding human interface 130 may include a remote extender device 121B which includes circuitry for receiving video and I/O signals over the serial link 110, converting the signals into an appropriate format, and propagating the converted signals to respective human interface devices, where the first extender device 121A and the second extender device 121B may be coupled via the transmission medium 110, e.g., the serial bus.

In one embodiment, the remote extender 120B may also operate to receive I/O signals from one or more of the I/O devices, and encode the I/O signals into a form suitable for transmission over the serial link 110 to the host computer 102, e.g., USBX signals. For example, in one embodiment, the USB hub 120B may be operable to receive USB signals from various of the I/O devices, e.g., mouse 114 and keyboard 112, and convert the USB signals into USBX signals for propagation over the serial bus 110 to the USB host extender 120A included in the extender device 121A of the host computer system 102, which, as described above, may operate to convert the USBX signals back to USB I/O signals and send the I/O signals to the computer 102.

In one embodiment, the extender device 121B may be included in the display device or monitor 116. The other human interface devices may then be coupled to the serial bus 110 through the monitor 116, i.e., through the extender device 121B included in the monitor. Note that in this embodiment, the monitor 116 may include the extender device 121B, which itself may include remote extender 120B, USB hub 126, and video decoder 125. The one or more human interface devices may be coupled to the monitor in a number of different ways, including standard interface cables, wireless media, e.g., as specified by the 802.11 protocol, optical fiber, or any other suitable communication medium. It is also contemplated that in other embodiments, the extender device 121B may be included in any of the human interface devices, which may then function as a human interface hub for other human interface devices.

It should be noted that in the preferred embodiment, the one or more human interface devices operate as if they were located in the first location and directly connected by human interface cables to the computing system. In other words, the extension of the human interface may be transparent to the user.

In another embodiment, the extender device 121B may not include special interface circuitry, e.g., the video decoder 125 and the I/O device interface circuitry (the USB hub) 120B shown in FIG. 6B. In this embodiment (not shown), the serial link 110 may couple through an extender 120, e.g., a split bridge, to a local bus included in the extender device 121B, e.g., a PCI bus, which may then couple to the various I/O devices.

Figure 8A:
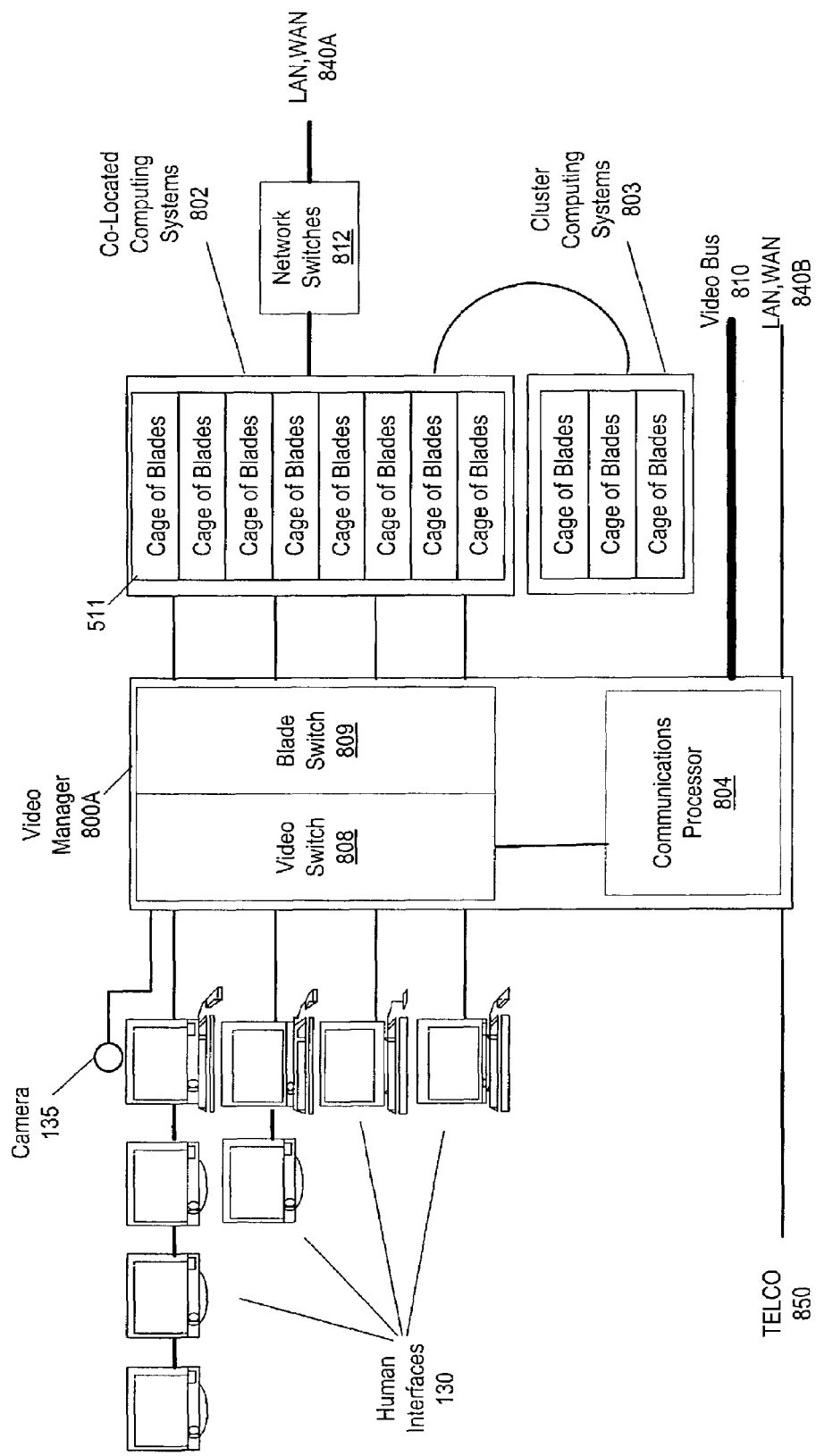
FIG. 8A illustrates one embodiment of a system of co-located computers with communication distribution to a plurality of user interfaces.

FIG. 8A—A Communications Distribution System

FIG. 8A is a high level diagram of a communications distribution system, according to one embodiment. As used herein, the term "communications" refers to any type of communication signals transmitted between users of the system, especially video/audio signals transmitted between human interfaces 130 in the system, such as, for example, video conferencing signals generated by cameras and/or microphones at users' work areas, and/or telephone communications. In other words, communication signals may include any signals that provide verbal/audial and/or visual connectivity between two or more individuals.

As FIG. 8A shows, in one embodiment, the communications distribution system may include a co-located computer system 802, e.g., a plurality of computing systems, e.g., blade computers 102, that may be coupled to a plurality of human interfaces 130 through a video manager 800A. In the embodiment shown, the computers (blades) 102 are included in a plurality of cages 511. For example, in one embodiment, the cages 511 may be rack-mounted in one or more component racks, as is well known in the art. As noted above, in the systems described herein, the plurality of computing systems 102 may be a subset of a greater plurality of computing systems included in the system, i.e., there may be other computing systems included in the system that are not shown.

As FIG. 8A also shows, in one embodiment, the co-located computer system 802 may be coupled to a second co-located computer system 803 that includes a cluster computer system 803. The cluster computer system 803 may similarly include a plurality of cages 511 containing respective pluralities of blade computers 102. Alternatively, the cluster computer system 803 may include the blade computers 102 in a single cage 511, or in yet another embodiment, without a cage 511. The cluster computer system 803 may provide additional computation resources for the content and communications distribution system 800. For example, the cluster computer system 803 may provide burst capabilities, where surges in computation loads of the co-located computer system 802 that exceed the capacity of the co-located computer system 802 may be off-loaded to the cluster computer system 803. As another example, when a blade computer 102 in the co-located computer system 802 fails, the cluster computer system 803 may provide temporary blade functionality until the failed blade computer is replaced. As yet another example, the cluster computer system 803 may provide various server functions for users, or other sub-systems, of the content and communications distribution system 800. For more detailed information regarding co-located computer systems, please see U.S. Pat. No. 6,012,101 titled "Computer Network Having Commonly Located Computing Systems", filed May 4, 1998, which was incorporated by reference above.

The co-located computer system 802 may also couple to network switches 812 which may provide access by the co-located computer system 802 to networks, e.g., LAN, WAN, the Internet, etc 840A, to facilitate content or communication file transfers and swapping, e.g., email, FTP, messaging, chat, etc.

As described above with reference to FIGS. 3-7D, each human interface 130 may be at a remote location from the co-located computer systems 802, and may include any of various human interface devices, such as, for example, any of one or more monitors 116, a keyboard 112, a mouse 114, or any other human interface device. Other examples of human interface devices contemplated may include a joystick, trackball, audio speakers (or headphones), a microphone, a printer, a scanner, a telephone, a removable storage medium, a biometric sensor, a barcode reader, a VR (Virtual Reality) interface device, and a PDA (Personal Digital Assistant) IR (Infra-Red) device, among others. As FIG. 8A also shows, in a preferred embodiment, one or more of the human interfaces may include a camera 135 which may be used for video conferencing, telepresence applications, videophones, etc.

In one embodiment, one or more of the human interfaces may include multiple monitors, as shown. In other words, images transmitted to the human interface 130 for display may be distributed across a plurality of computer monitors 116. For example, in one embodiment, one of the plurality of monitors may be used specifically for teleconferencing, where images of other users who are participating in the video conference are displayed on the designated monitor. As another example, an image (or image stream) for each participant may be shown on a respective monitor, e.g., adjacent to other visual information associated with that participant. Of course, these are merely examples, and are not intended to limit the use of multiple monitors to any particular configuration or approach.

As shown, in one embodiment, the video manager 800A may include a blade switch 809, a video switch 808, and a communications processor 804. The video switch 808 may couple to the communications processor 806, described in more detail below. The communication processor 806 may couple to a video bus 810, and may also couple to one or more communication networks or transmission media, e.g., a TELCO network (telephone company switched circuit network) 850 and/or LAN, WAN, Internet 840B etc.

The video bus 810 may provide for high quality video streaming, e.g., raw analog RGB signals, for example, between the system and, say, other communications systems located in the same building or in other buildings on the same campus, e.g., within the enterprise.

The LAN,WAN 840B may provide for communications via a packet protocol 807, such as, for example Ethernet. The LAN,WAN 840B may be used for IP based communications, e.g., IP based streaming video (quality of service), operating in an isochronous mode, where information (packets) is transmitted as fast as possible, e.g., without regard for error-checking, collisions, etc. The LAN,WAN 840B may be particularly useful for communication between the system and distant locations, e.g., different countries. In one embodiment, the communications distribution system 800 may use packet-based networks, e.g., Ethernet, for signaling purposes only. In other words, separate video networking, e.g., the video bus 810, may be provided to facilitate high data transfer rates for streaming video and audio.

The TELCO network 850 may be used for non-packed based communications, e.g., standard telephone voice-only communications, as well as (relatively) lower quality telephone based video signals, e.g., where a video frame is transmitted once every several seconds, such as by a video cell-phone. This kind of video communication may be used in the event that IP-based video service is not available. As is well known, the TELCO network 850 may also provide means for telephone packed-based long distance communications, e.g., standard digital telephone communications, such as ISDN or SS7.

Figure 8B:
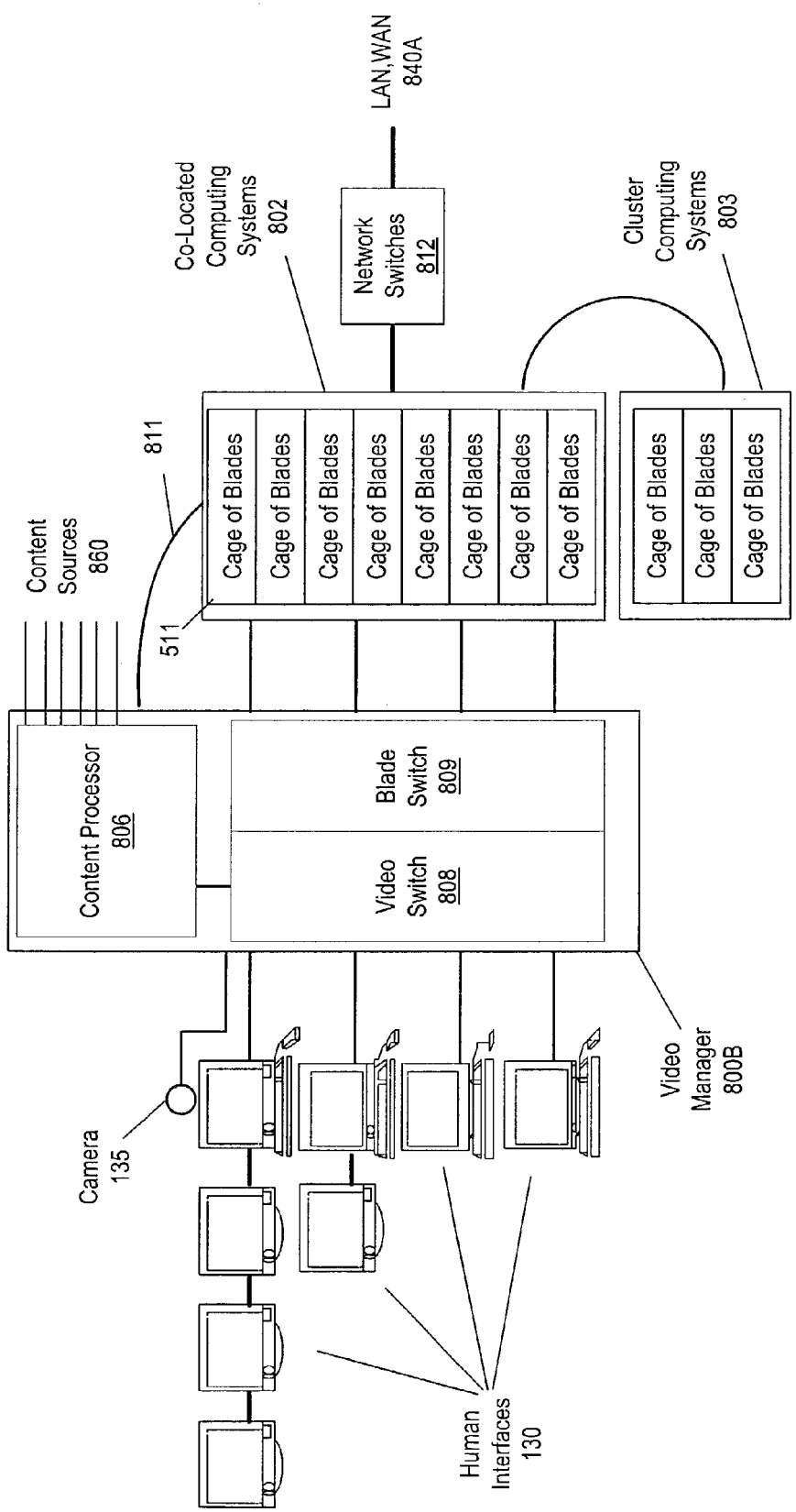
FIG. 8B illustrates one embodiment of a system of co-located computers with content distribution to a plurality of user interfaces.

FIG. 8B—A Content Distribution System

FIG. 8B is a high level diagram of a content distribution system, according to one embodiment. As used herein, the term "content" refers to any type of media content, especially image content (still and/or moving), e.g., video content, including, for example, television content from regular television broadcasts, cable, and satellite sources, analog video signals (possibly including accompanying audio signals), such as NTSC, PAL, SECAM, RGB, Y/C (e.g., S-Video), YUV, etc., and digital video (and possibly audio)

sources and formats, such as DVD, VTR, computer-generated signals, MPEG (2, 3, 4, etc.), \CCIR 601, D1, D2, D4, and 4:2:2, among others. In other words, essentially any video source and format may be acceptable as a content source. Various aspects of the content distribution system are substantially the same as in the communication distribution system described above with reference to FIG. 8A, thus, descriptions of components already described above may be abbreviated.

As FIG. 8B shows, similar to the system of FIG. 8A, the content distribution system may include co-located computer system 802, e.g., multiple blade computers 102, coupled to the plurality of human interfaces 130 through video manager 800B. As described above, the video manager 800B may include blade switch 809 which provides switching functionality for the blade computers 102, and video switch 808. Also similar to the system of FIG. 8A, in one embodiment, the co-located computer system 802 may be coupled to cluster computer system 803, as described above. The co-located computer system 802 may also couple to network switches 812 which may provide access by the co-located computer system 802 to networks, e.g., LAN, WAN, the Internet, etc., as shown, and described above with reference to FIG. 8B.

As shown, in one embodiment, the video switch 808 may couple to a content processor 806, described in more detail below. The content processor 806 may receive input from a plurality of content sources 860, such as television tuners, satellite tuners, cable tuners, digital video sources, etc., as mentioned above. In one embodiment, in addition to coupling to the co-located computer system 802 via the video and blade switches (808 and 809), the content processor 806 may also couple directly to the co-located computer system 802 via a transmission medium, e.g., a cable 811. This cable 811 may be used as a command line to allow users or blade computers to control the content processor 806, e.g., to choose content for display at the various human interfaces 130.

In one embodiment, the content distribution system may also include the communication distribution system described above with reference to FIG. 8A. In other words, the content distribution system may operate in conjunction with (or integrated with) the communications distribution system described above, where media content from a variety of sources may be presented by human interfaces in tandem with communication signals (e.g., audio and/or video) from other users of the system (and/or external systems). Such a system is described below with reference to FIG. 8C. Further details of content distribution are provided below with reference to FIGS. 9-24.

Figure 8C:
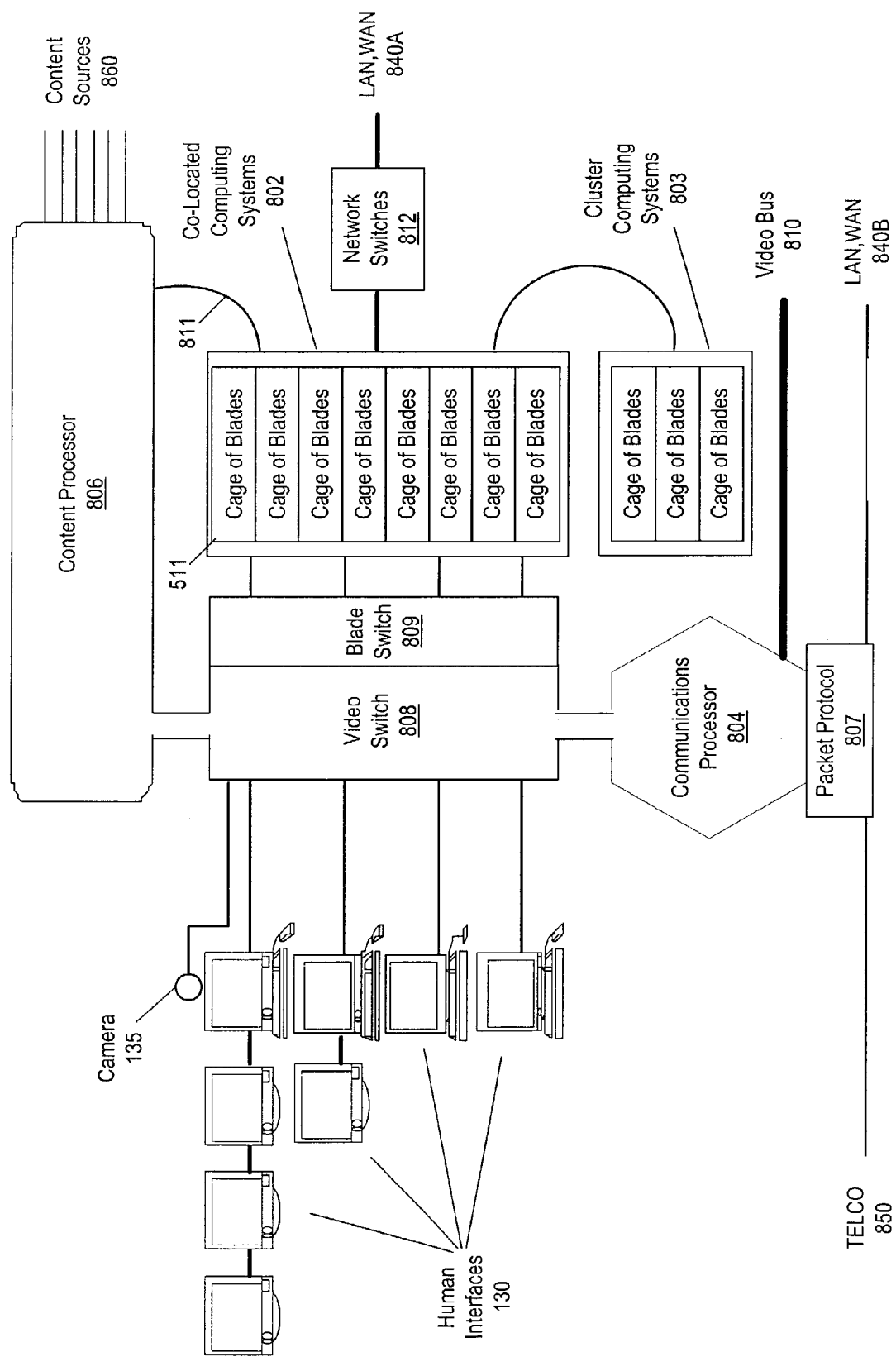
FIG. 8C illustrates one embodiment of a system of co-located computers with both communication and content distribution to a plurality of user interfaces.

FIG. 8C—A Content and Communications Distribution System

FIG. 8C is a high level diagram of a content and communications distribution system, according to one embodiment. The content and communications distribution system may combine the functionality of the communication distribution system of FIG. 8A with the functionality of the content distribution system of FIG. 8B, integrating the two systems (and sharing major components) to provide The content and communication processors and their operations are described in more detail below.

As FIG. 8C shows, in one embodiment, the content and communications distribution system 800 may include co-located computer system 802, which preferably includes a plurality of blade computers 102, coupled to human interfaces 130 through blade switch 809 and video switch 808. In the embodiment shown, the computers (blades) 102 are included in a plurality of rack-mounted cages 511, although other embodiments are also contemplated. In one embodiment, the blade switch 809 and the video switch 808 may be included in a backpack or function module that couples to the blade cages 511, as described in detail in U.S. patent application Ser. No. 09/728,669 titled "A System of Co-Located Computers in a Framework Including Removable Function Modules for Adding Modular Functionality" which was incorporated by reference above. It is noted that the video switch 808 preferably includes a plurality of blade video switches. In other words, in one embodiment, the video switch 808 may include respective video switches for each of the plurality of blades and/or human interfaces.

As described above, in one embodiment, the co-located computer system 802 may be coupled to a second co-located computer system 803, e.g., a cluster computer system 803, for burst processing and/or replacement blade services, as desired. The co-located computer system 802 may also couple to network switches 812 which may provide access by the co-located computer system 802 to networks, e.g., LAN, WAN, the Internet, etc., as described above.

As mentioned above, each human interface 130 may be at a remote location from the co-located computer systems 802, and may include any of various human interface devices, including any of one or more monitors 116, a keyboard 112, a mouse 114, joystick, trackball, audio speakers (or headphones), a microphone, a printer, a scanner, a telephone, a removable storage medium, a biometric sensor, a barcode reader, a VR (Virtual Reality) interface device, and a PDA (Personal Digital Assistant) IR (Infra-Red) device, among others. As FIG. 8C also shows, in a preferred embodiment, one or more of the human interfaces may include a camera 135 which may be used for video conferencing, telepresence applications, videophones, etc.

As shown, in one embodiment, the video switch 808 may couple to both the communications processor 804 and the content processor 806, both of which are described in more detail above with reference to FIGS. 8A and 8B, respectively. As mentioned above, the content processor 806 may receive input from a plurality of content sources 860, such as television tuners, satellite tuners, cable tuners, digital video sources, etc., and may insert the video signals corresponding to the content into images transmitted to respective monitors. For example, a streaming news broadcast may be inserted into the screen image of a monitor (in a human interface) as a Picture-in-Picture (PIP) image, allowing the user of the human interface to view (and possibly hear) relevant media content while working.

As also mentioned above, the communication processor 806 may similarly insert communications images and/or sounds (and/or text) into signals transmitted to the human interface 130, including telephone signals, text messages, video images, such as from a camera 135, or any other type of communications signal. In one exemplary use of the system, a plurality of users may each send and receive camera images (and accompanying audio) of each other in a video conferencing session. These respective video images may be inserted into each of the other participant's screen images, allowing the participants to view (and optionally hear) one another via their respective human interfaces. Additionally, media content, such as television broadcasts, may also be inserted into the screen images, allowing each participant to view related video content during the video conference.

In another exemplary application of this embodiment of the present invention, a brokerage house may provide each analyst with a human interface, as described above. Each analyst may participate in a video conference session with other analysts, where the analyst may view and/or communicate with the other participants via the communication processor. Simultaneously, each analyst may also view one or more real-time video streams, such as, for example, business news broadcasts (e.g., from CNN, Headline News, MSNBC, etc.), streaming stock quotes, e.g., from the Internet or a dedicated subscription service, an so forth, provided by the content processor. In addition to these information sources, each analyst may also (simultaneously) use one or more software programs running on one or more of the networked blade computers 102 to perform related analyses. Thus, each analyst may have access to a wide variety of information sources and channels whereby he or she may more effectively make decisions, perform research, and/or communicate with others in an integrated fashion.

In a slightly different approach, a user may utilize the multiple information sources and channels to multi-task. In other words, the various content and communication sources accessed by the user may not be related to one another, but instead may relate to two or more tasks, issues, or applications. For example, a manager may maintain a plurality of information streams from respective divisions or departments of an enterprise to keep abreast of many ongoing operations simultaneously.

In yet another application of the system of FIG. 8C, the various user interfaces may be configured hierarchically to reflect the different levels and positions in an enterprise. For example, in a manufacturing operation, one or more floor managers may receive information streams from the manufacturing process itself, e.g., via monitors, and/or from supervisors or operators on the plant floor. Each floor manager may also be in communication with his or her immediate superior, e.g., a department manager.

Similarly, each department manager may receive communications and/or content from one or more floor managers, and may also participate in a video conference session (or other type of session) with the other department managers. Additionally, each department manager may be in communication with his or her superior, e.g., a division manager. Thus, each layer of management may send and receive information from the layer above and the layer below (and other layers as needed). In this manner, information flow in the enterprise may be configured, integrated, and managed as desired to facilitate efficient communications and decision-making. More specifically, hierarchical use of the described systems and methods may provide powerful means for seamlessly and organically integrating information at many levels and resolutions in the enterprise. For example, at each respective level, information may be assessed, analyzed, and integrated to generate new information which may then be transmitted to the other levels, e.g., the level directly above the respective level. Conversely, strategic and tactical management information, e.g., directives and/or goals, may propagate downward through the levels, where at level the received directives may be translated into more specific or lower level directives which may then be transmitted to subordinate levels.

Thus, various embodiments of the systems described herein may provide an infrastructure for pervasive integrated information flow in an enterprise, resulting in improved operations and decision-making.

Figure 9:
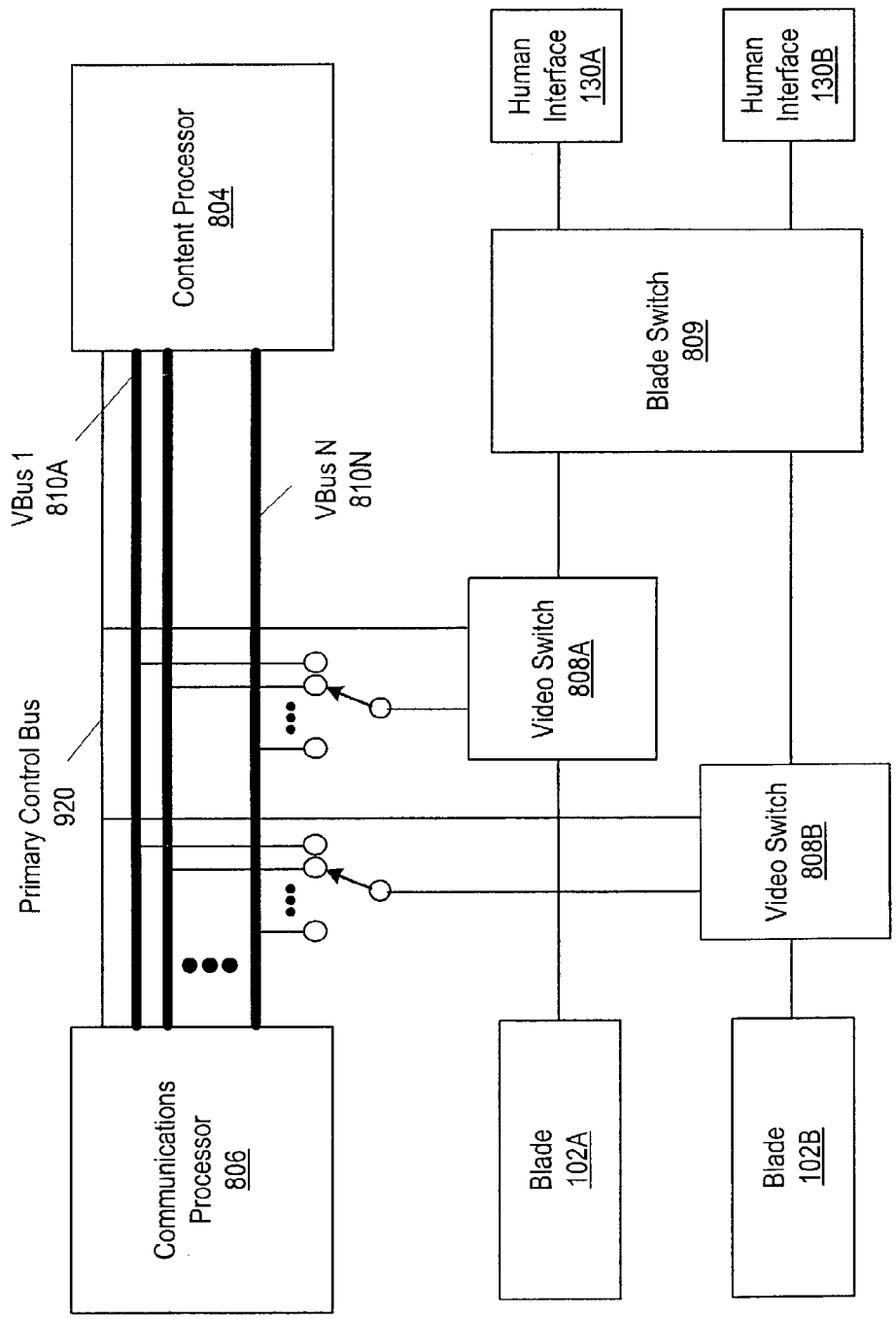
FIG. 9 is a block diagram of one embodiment of the system of FIG. 8C.

FIG. 9—Block Diagram of a Content and Communications Distribution System

FIG. 9 is a block diagram of one embodiment of a content and communications distribution system. More specifically FIG. 9 provides a high-level illustration of the system as it relates to operations regarding single blade computers 102A and 102B and respective human interfaces 130A and 130B. Although the system diagram of FIG. 9 corresponds to the system described above with reference to FIG. 8C, it should be noted that respective portions of the diagram and description also apply to the systems of FIGS. 8A and 8B.

As FIG. 9 shows, in this embodiment, the distribution system may include three primary components, namely, the communications processor 804, the content processor 806, and the video switch 808, used by both processors. These components may be networked together through an analog multi-channel video bus (VBus) system 810. The communications processor 804 and the content processor 806 may coupled to each blade computer 102 and the corresponding human interface 130 through the video switch 808 as shown. It is noted that this VBus system 810 may stream video (and possibly audio) content based on production video technology rather than packet-based computer technology, due to the substantially higher bandwidths provided by the former. In other words, as mentioned above, delivery of content and communications imagery to the user's display (e.g., monitor(s)) may be provided by a PIP insertion process (which may be analog PIP insertion, digital PIP insertion, or both), as opposed to relying on the blade computer's video system to generate the images, the computer's packet-based networking system (e.g., Ethernet) to transfer the images, and the computer's CPU to process the images. This division of functionality may substantially increase the effective bandwidth of the system.

As FIG. 9 also shows, the video switch 808 may couple to each human interface 130 through blade switch 809 which may couple to devices in each HI 130 via a transmission medium such as Category 5 cable or optical fiber, among others. In one embodiment, the blade switch 809 may couple to the human interface devices (e.g., monitor, mouse, keyboard, etc.) through an extender device 121B as described above, allowing remote placement of the human interface 130. For more details regarding extension of functional distances for remote human interfaces, please see U.S. Pat. No. 5,764,924 titled "Method And Apparatus For Extending A Local PCI Bus To A Remote I/O Backplane", whose inventor is Soon Chul Hong, which is hereby incorporated by reference, and U.S. patent application Ser. No. 09/619,989 titled "System And Method For Providing A Remote Universal Serial Bus", whose inventors are Dan Barrett, Mike Barron, and Andrew Heller, which was incorporated by reference above.

As mentioned above, in one embodiment, the video switch 808 may include a plurality of blade video switches corresponding to the plurality of blade computers 102. Each blade video switch may operate on a "per blade computer" basis, providing connectivity to one or more of the video buses 810, as shown. For example, in one embodiment, each cage 511 may include 8 blades, and may couple to or include (e.g., in the form of a backpack or function module) a video switch 808 comprising 8 blade video switches, one per blade 102 in the cage 511. Similarly, in one embodiment, each cage 511 may couple to or include (perhaps in the same function module) an 8×8 blade switch 809 which may be operable to provide for switching between any of the 8 blades in the cage 511.

In one embodiment, the video buses (VBuses) 810 may include a video network for the co-located computer systems 802, where each VBus may include a three-wire bus common to one or more of the blade video switches. Each VBus may be operable to carry Y/C video signals and bi-directional command signals, where the Y/C video signals (also referred to as S-Video) include luminance (Y) and chrominance (C). In other words, the three wires may be used to transmit the Y, C, and command signals, respectively. Additionally, in one embodiment, the command line (wire) may also be used to transmit audio signals associated with the video images. For example, the command signals may be transmitted on a 100 KHz carrier, while the audio signals may be transmitted on a base band. The audio signal may thus automatically accompany the corresponding video signal.

Each VBus may be selectable by a blade video switch corresponding to the blade computer 102, and may then provide video and audio (and/or other) signals to that blade computer 102. Image signals on the selected VBus (e.g., on the command line of the VBus) may be accompanied by instructions specifying the size and location of the image to be rendered on the user's screen. For example, the instructions may include a Start X, Start Y, Offset X, and Offset Y indicating the placement of the image on the monitor screen of the user's human interface. As FIG. 9 shows, the system may also include a common communication line, referred to as a primary control bus 920, common to all of the blade video switches, which may be used to transmit the VBus assignments for each video switch 808. Thus, the master control bus 920 may transmit signals to the blade video switch indicating which VBus to connect to, while specific information regarding the image size and location may be provided by the command line of the specified VBus.

Figure 10:
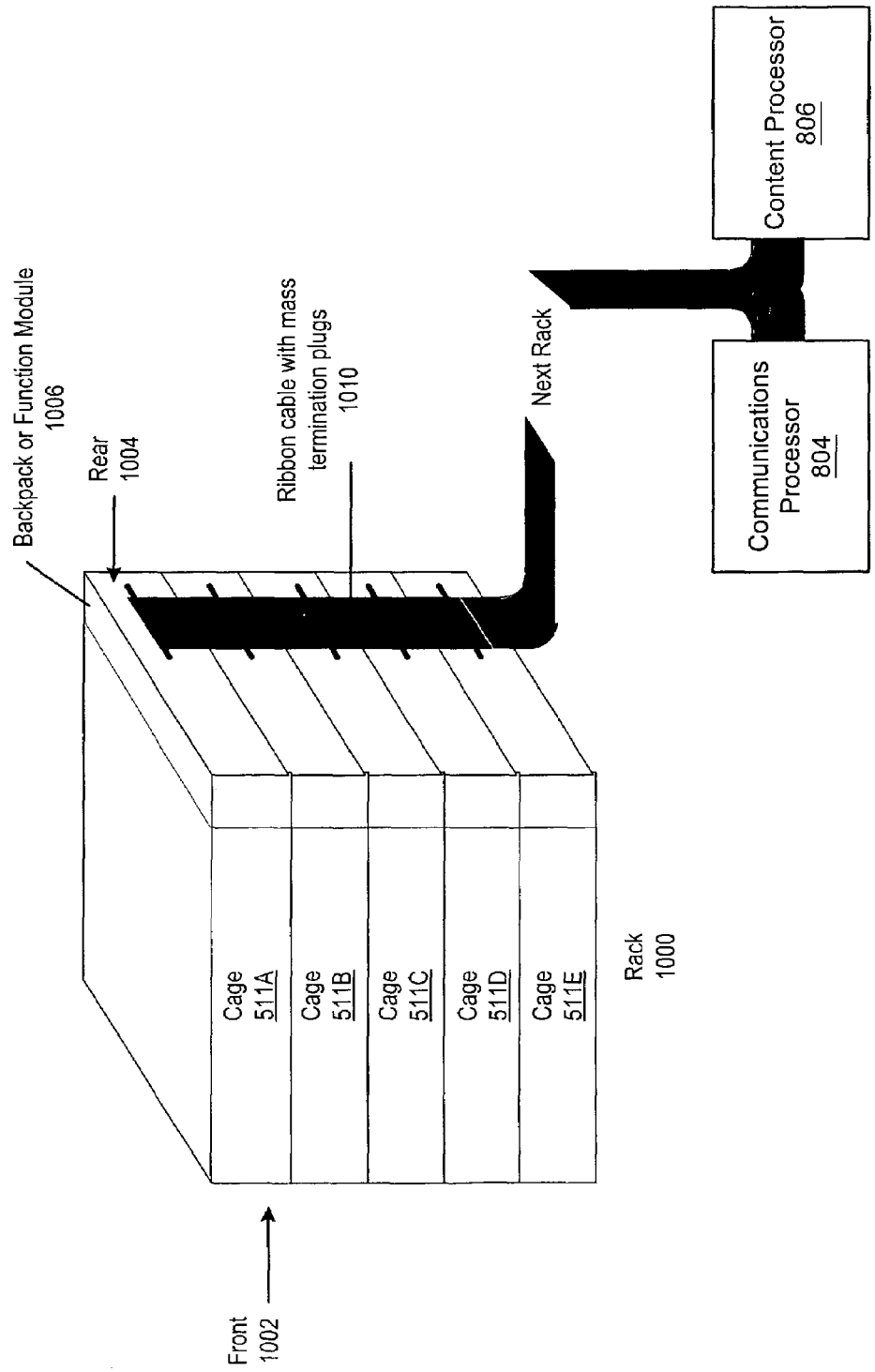
FIG. 10 illustrates one embodiment of signal cabling for the video buses of the co-located computers in the system of FIGS. 8A-8C.

FIG. 10—Signal Cabling for the Co-located Computer System

FIG. 10 illustrates one embodiment of signal cabling for the co-located computer system 802. In the embodiment shown, the co-located computer system 802 includes a plurality of cages, e.g., installed in one or more racks 1000, where each cage may include a plurality of blade computers 102. As FIG. 10 shows, communications and content signals may be transmitted to and from each of these blade computers 102 via a ribbon cable 1010 with mass termination plugs, where each mass termination plug couples to a respective cage. The ribbon cable 1010 may thus include the video bus (VBuses) 810 of FIG. 9, providing for communication between the co-located computer system 802 and the communications and content processors 804 and 806, as shown.

As FIG. 10 also shows, the ribbon cable 1010 may also couple to cages 511 in additional racks, thereby providing signal connectivity to the blade computers 102 installed therein. For example, referring back to FIGS. 8A-8C, the ribbon cable may couple to the cages/blades of the co-located computer system 802, and may also couple to the cluster computer system 803, e.g., to the cages/blades of the cluster computer system 803. As indicated by FIG. 10, in the embodiment shown, the ribbon cable may include multiple signal paths and ID mass terminations running down the back or side of the rack 1000, attaching to each of the cages 511. Each cage 511 may then provide connectivity to the individual blade computers 102 in the cage 511. It should be noted that the signal cabling shown is intended to be exemplary, and is not intended to limit the particular signal cabling for the co-located computer system 802 to any particular embodiment.

Figure 11:
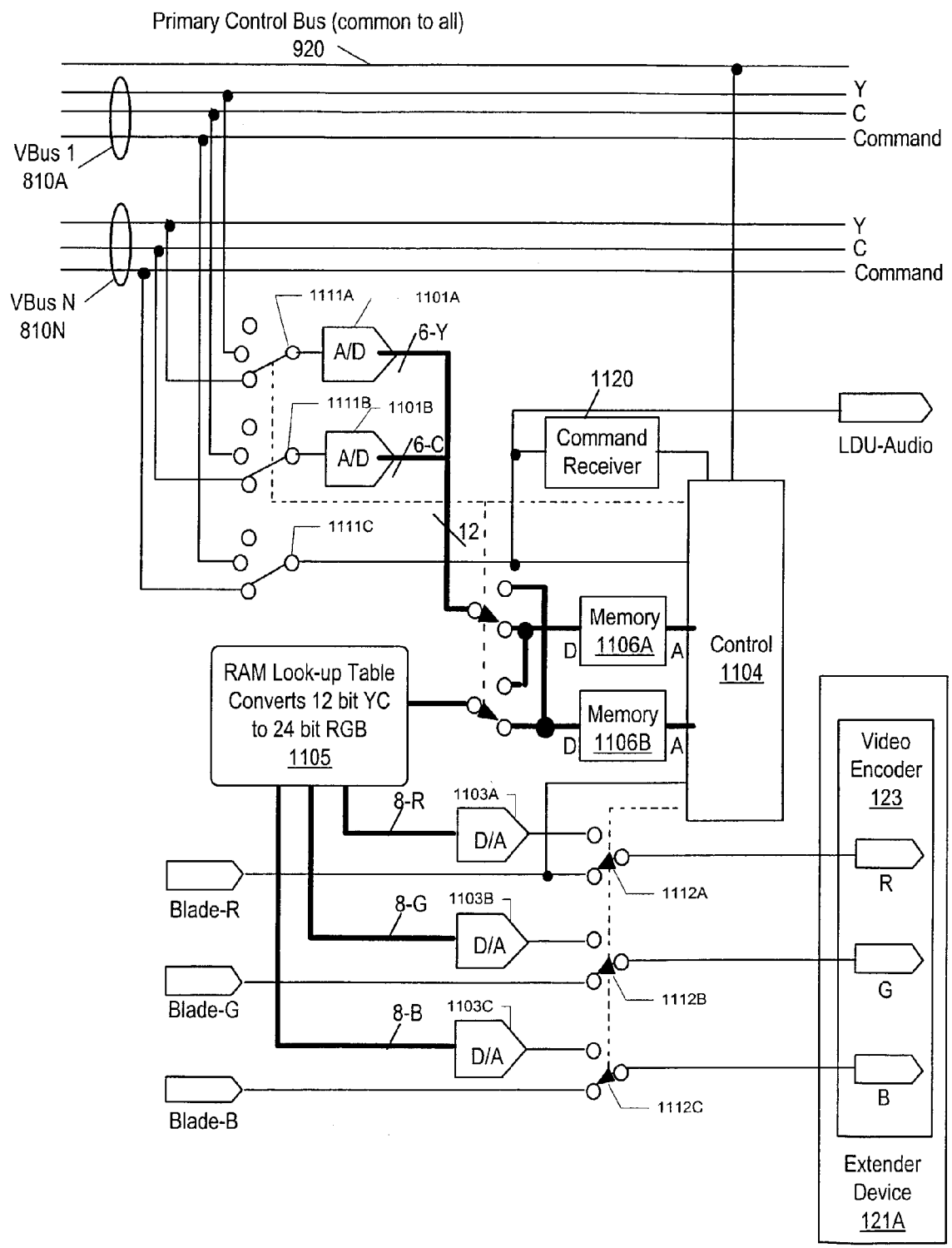
FIG. 11 is a detailed diagram of a video switch for the system of FIGS. 8A-8C, according to one embodiment.

FIG. 11—Video Switch

FIG. 11 is a block diagram illustrating one embodiment of the video switch 808. As described above, the video switch 808 may provide switching functionality between a respective blade computer 102 and each of the plurality of VBuses 810. In other words, for each blade computer 102, the video switch 808 may select a VBus 810 as a video source of content and/or communication signals for that blade computer 102. Additionally, control functions provided by the video switch 808 may include capturing and storing one or more video images in memory, e.g., received from the selected VBus 810; changing the format, protocol, size, and/or resolution of the received video images as needed for display on a monitor of the target human interface; and insert the stored image or sequence of images as PIP events into the monitor's signal stream.

As FIG. 11 shows, a control module 1104 may couple to the master control bus 920, and may be operable to receive VBus selection signals from the master control bus 920 indicating from which VBus 810 to receive video content or communications. Note that although only two (three-line) VBuses, 810A and 810N, are shown, the system generally will include more than two VBuses. Each of the three lines of a respective VBus 810 may couple to a respective VBus line switch 1111. For example, in the embodiment shown, the Y line of each VBus 810 couples to VBus line switch 1111A, the C line of each VBus 810 couples to VBus line switch 1111B, and the command line of each VBus couples to VBus line switch 1111C. As FIG. 11 indicates, the control module 1104 may couple to each of the VBus line switches 1111, and may be operable to provide VBus selection signals to the VBus line switches 1111 indicating the selected VBus 810.

Once the VBus 810 has been selected, signals may be transmitted from the communications processor 804 and/or the content processor 806 over the selected VBus 810. The VBus line switches may pass the received video signals (e.g., the Y and C signals) through respective A/D converters 1101A and 1101B, as shown, thereby converting the analog video signals into digital signals. In the embodiment shown, the Y and C analog signals are converted into respective 6-bit signals and combined into a single 12-bit signal. In other words, the Y and C digital signals may be combined such that a 12-bit number represents each pixel in the video image. The received command signal on the selected VBus 810 may be passed on by VBus line switch 1111C to the control module 1104, as shown.

The 12-bit pixel values may be stored in memory 1106 for later playback. In one embodiment, storing the pixel values (e.g., the image) in memory may include sizing, scaling, and/or cropping the image based on the command signals received from the command line of the source VBus 810. These image processing functions may be performed simply by mapping the pixel values into relative locations in the memory 1106. In other words, the control module 1104 may perform the various image processing functions by placing received pixel data into relative memory locations such that the stored image is of the desired size, protocol, and/or resolution.

As FIG. 11 also shows, video signals from a blade computer 102 may be received in the form of RGB (Red/Green/Blue) signals, represented by Blade-R, Blade-G, and Blade-B in the bottom left of the Figure. These signals are targeted for display on the monitor(s) of the target human interface 130. At playback, the controller module 1104 may be operable to retrieve the stored 12-bit words representing the stored image pixels in Y/C format, and convert the 12-bit YC value (S-Video) to a 24-bit RGB value. In one embodiment, this conversion may be performed via a RAM look-up table 1105, where the 12-bit YC value is placed on the address bus of the RAM 1105, and the corresponding 24-bit (3×8) RGB value returned. In other words, the RAM table 1105 may be configured such that each Y/C value corresponds to an address in the RAM 1105, and when the Y/C value is fed to the RAM address bus as an address, the RAM 1105 returns the corresponding 24-bit RGB value.

As shown, the three 8-bit RGB signals may then be converted to analog via respective D/A converters 1103. The control module 1104 may then insert the RGB signals into the blade computer's RGB analog video stream via RGB line switches 1112 as specified by the command signals. In other words, the image insertion may be performed in accordance with screen position instructions included in the received command signals mentioned above, generating combined or modified analog RGB video signals which may then be transmitted to the video encoder 123 of the host extender device 121A, which in this embodiment, includes respective encoder components for the R, G, and B video signals, as shown. Further details of the video signal insertion are provided below with reference to FIG. 12.

In one embodiment, the video signals received over the selected VBus 810 may originate from either the communications processor 804 or the content processor 806, but not both, with the video source (either the communications processor 804 or the content processor 806) specified and selected, for example, by the control module. However, in other embodiments, video signals from both processors 804 and 806 may be multiplexed, e.g., by the video switch 808, such that both content and communications information may be streamed to the monitor screen at the same time. However, it should be noted that doing so may result in lower frame rates for the image streams. In one embodiment, multiple sets of VBus line switches 1111 (and corresponding A/D converters 1101) may be used to handle the increased video stream load. Multiplexing content and communication video streams may, for example, facilitate a user watching a news broadcast and teleconferencing about the broadcast simultaneously.

As noted above, the video switch 808 may service both the content and communications processors. When servicing the content processor 806, a sequence of video frames may be inserted into the screen image, as described above. However, when servicing the communications processor 804, where multiple images from respective cameras are streamed, e.g., in a video conferencing session with three or more participants, the streaming video may include a plurality of sub-frame images packed together as a single frame. The video switch 808 may deconstruct the communications frame into the constituent smaller images. Further details of this process are described below.

Figure 12:
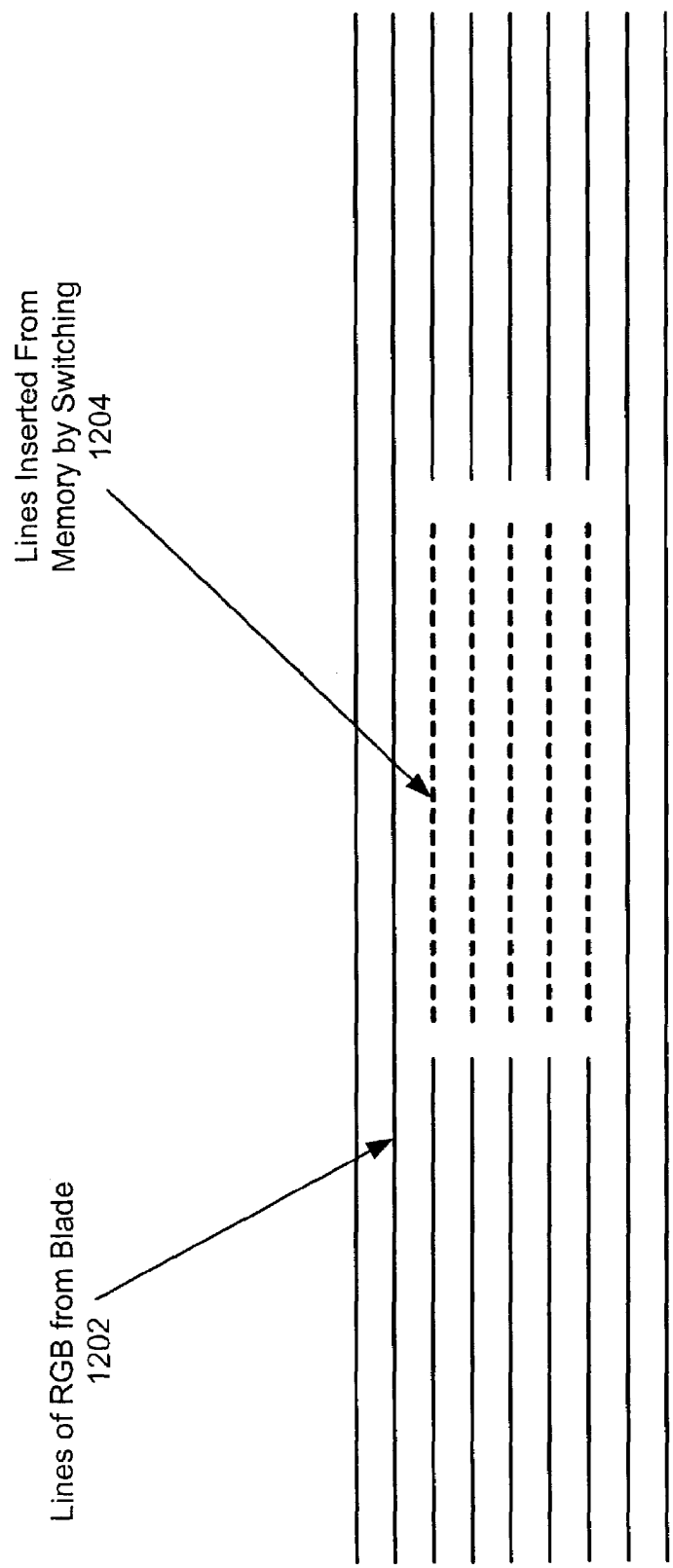
FIG. 12 illustrates picture-in-picture insertion, according to one embodiment.

FIG. 12—Image Scan-line Insertion

As described herein, the video manager may operate to selectively insert video data (analog or digital) from an external source into the video data (analog or digital) output from the computing system for display, e.g., using a picture-in-picture mechanism. The picture-in-picture mechanism may operate on digital video data, analog video signals, or both.

In one embodiment, a first computing system may be operable to generate first video data for display on a display device in a first human interface, where the first video data corresponds to a first image, and where the first video data is arranged in a scan line format. The video manager may be operable to receive second video data corresponding to a second image from a source, and insert the second video data into a location in the first video data.

In a first embodiment, the first video data and second video data comprise digital data. As one example, the video manager may operate to selectively access portions of the first video data and second video data from different portions of memory, e.g., on a scan line basis, and provide the combined digital data for display. The digital video data may be combined in various ways. One method for combining the digital video data is described in U.S. Pat. No. 6,067,098, incorporated by reference above. The combined digital data may be transmitted for display, or alternatively the combined digital data may be provided to D/A converters for conversion to analog video signals for display.

In a second embodiment, where the second video data comprises analog video signals, the second analog video signals are inserted "on the fly" into the first analog video signals corresponding to the first video data as the first analog video signals are output from the computing system. The combined first and second analog video signals (referred to as third analog video signals) are transmitted across the communication medium to the remote human interface. The display device of the first human interface may then operate to display a third image based on the third analog video signals.

The following provides greater detail regarding the second embodiment discussed above. However, it is noted that embodiments of the present invention may operate to combine digital or analog video signals to achieve the benefits described herein.

FIG. 12 illustrates image scan-line insertion, according to one embodiment. More specifically, FIG. 12 illustrates the insertion of RGB image lines 1204 from memory into RGB image lines 1202 from a blade computer 102 via switching, as described above with reference to FIG. 11. As FIG. 12 shows, in accordance with position instructions included with the original video signals (from the selected VBus 810), the RGB line switches 1112 (see FIG. 11) may time their respective switching such that the RGB lines (or portions of the lines) from the blade computer may be replaced at the correct position on the monitor screen with the RGB image lines 1204 from memory. As shown in FIG. 12, this image insertion may result in a Picture-In-Picture screen image.

Timing

In managing multiple video streams from content and communications sources, several timing issues may arise. For example, video streams from content sources are likely to be asynchronous with respect to one another, as well as to the video processing and display in the distribution system. Additionally, content video signals from content sources, such as television (TV) tuners, are generally transmitted in interleave raster scan format, while many computer monitors display images using a progressive raster scan. These issues are addressed below.

Figure 13:
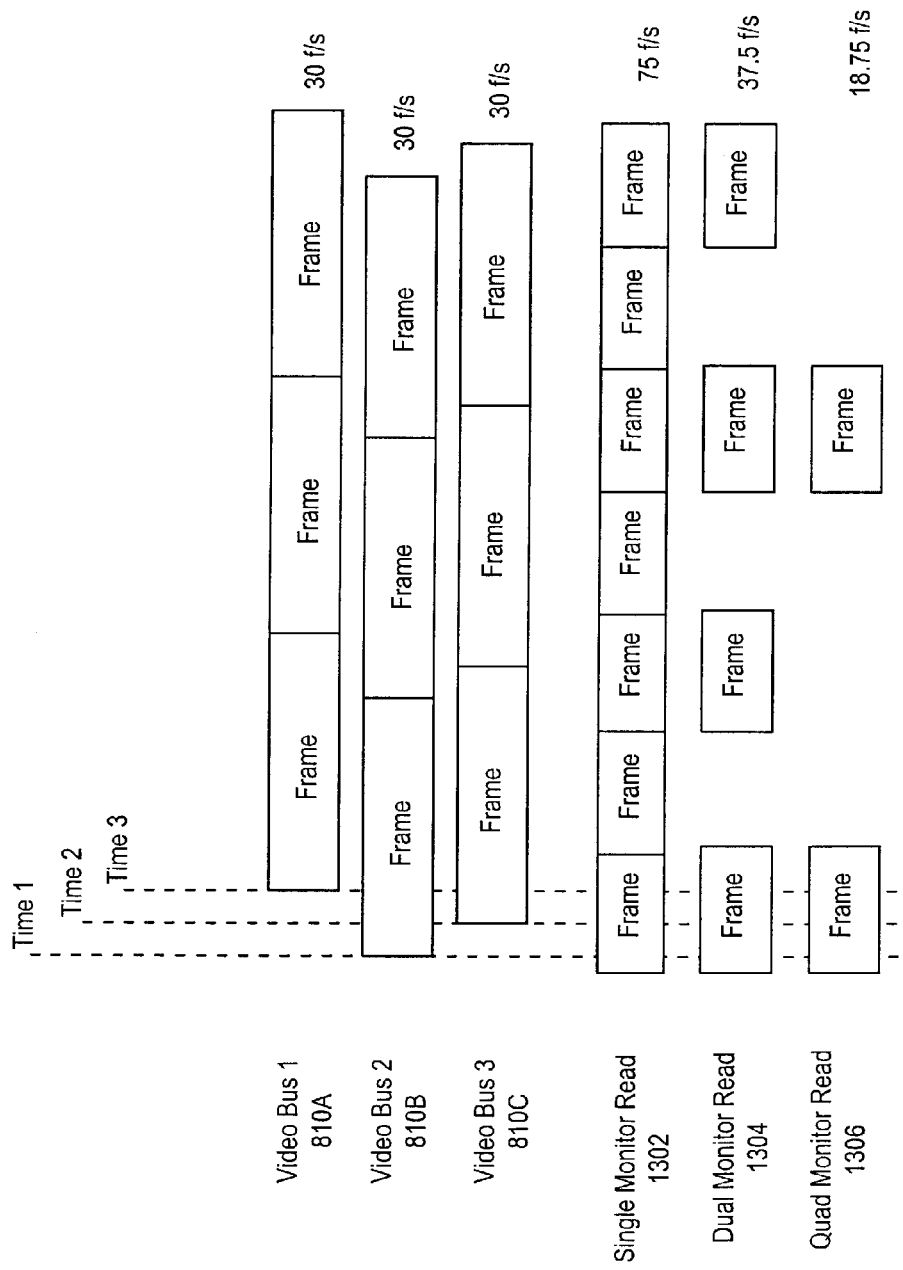
FIG. 13 illustrates timing relationships between a plurality of video bus signals, according to one embodiment.

FIG. 13—Frame Timing

FIG. 13 illustrates video frame timing issues related to the transmission and display of content and communications video streams. One frame timing issue relates to the difference between the frame rate of the video stream from the VBus 810, i.e., the delivery frame rate and the refresh rate of the monitor on which the video stream is displayed, i.e., the display frame rate. Another frame timing issue relates to the delivery and display of video streams from multiple VBuses 810. In the descriptions which follow, it is assumed that communications images are rendered on the user's monitor screen in a form similar to content images.

As FIG. 13 shows, parallel asynchronous video frame sequences may be transmitted at roughly 30 frames per second (fps) on respective VBuses 810A-810C. This asynchronicity is represented by the three start times of each frame sequence, Time 1, Time 2, and Time 3. Also shown are respective display frame sequences for a single monitor read 1302 at 75 fps, a dual monitor read 1304 at 37.5 fps, and a quad monitor read 1306 at 18.75 fps.

In the example illustrated in FIG. 13, the refresh rate of a single monitor is assumed to be 75 fps, as mentioned above. Thus, the frame read speed may be considered to be substantially constant. In other words, the time necessary to read a frame for presentation to a screen may be the same regardless of the number of monitors in the human interface 130. However, the frequency of reads for display on a given monitor may depend upon the number of monitors in the human interface 130. For example, images displayed on only one of four monitors may be read from memory at only ¼ the frequency of the single monitor feed, as illustrated by the quad monitor read 1306 in FIG. 13.

It should be noted that although the frame rates of the transmitted video frame sequences are shown as 30 fps signals, in general, these frames are not provided at exactly 30 fps, i.e., each video stream generally has a slightly different frame rate, typically within 0.001% of 30 fps. As a consequence, roughly every 5 minutes a frame in one stream may creep by a frame in another stream. It is also noted that in actual operation, the relative time differences between the different video streams may constantly vary.

In one embodiment, the differing frame rates may be handled by bank-switching the frame read and write processes. The frame write (input) A/D conversion and memory management process may operate independently of the frame read (output) D/A conversion and memory management process. Each process may notify the other as to when the bank shift can occur, thereby gating each process. In this approach, the user's monitor may at times display the same content image more than one time or miss a content frame. These effects may not be noticeable to the user due to the size of the displayed images, the presence of other content or communications images, etc.

Figure 14:
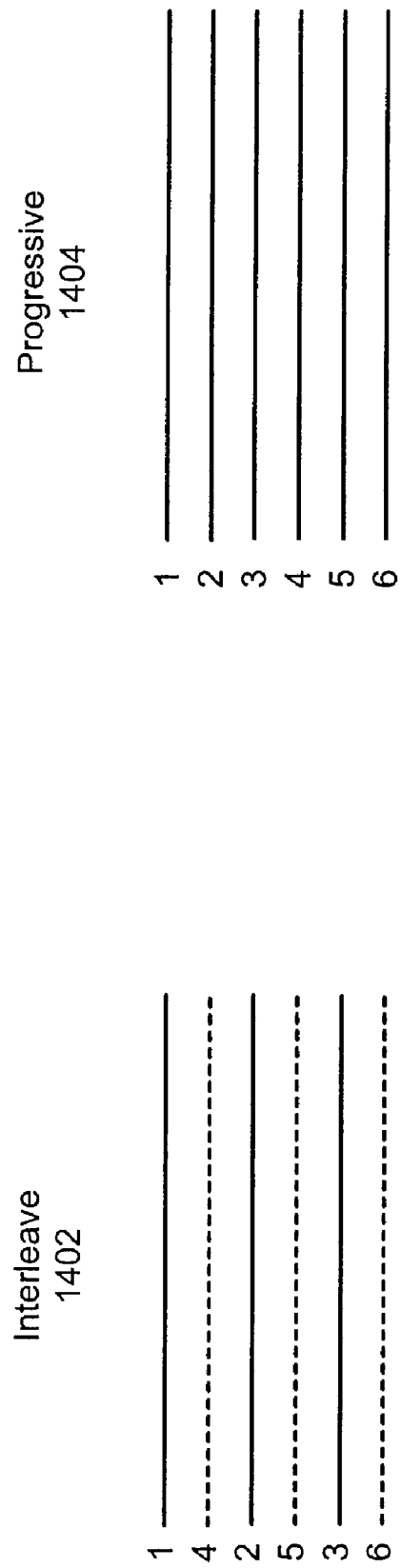
FIG. 14 illustrates interleaved and progressive scanned video frame formats, according to one embodiment.

FIG. 14—Interleave and Progressive Scan Lines

In general, TV and TV-like content images are transmitted and displayed in an interleaved manner. In contrast, most modern computer monitors display images in a progressive scan. FIG. 14 illustrates both of these scanning approaches in highly simplified 6 scan-line examples. The scan lines are numbered in the order in which they are drawn.

As FIG. 14 shows, in an interleaved scan 1402, every other line of a frame is drawn to the screen, e.g., the odd lines, until the end of the screen is reached, at which point the raster scan resets to the top of the screen and draws the remaining lines, e.g., the even lines. Thus, the second line viewed, i.e., the second screen line, is actually the fourth scan line. As FIG. 14 also shows, in a progressive scan 1404, the entire frame is drawn line by line from start to finish. Thus, comparing the two processes in parallel, where a single video stream is displayed by both methods, the image data drawn by the fourth scan line (the second line from the top) in the interleave case 1402 may be almost, but not exactly, the same as the image data drawn in the second scan line (the second line from the top) of the progressive process 1404. The reason the scan line data from the two corresponding screen lines may differ is that every other screen line of the interleaved image is drawn with a half-frame time delay compared to the corresponding screen lines of the progressive scan. If the source image data change during that time, then the screen lines corresponding to the "second pass" scan lines will reflect the new data, and so may differ from corresponding screen lines in the progressive scan. In other words, a progressive scan may be compared to a movie frame, in that the frame is revealed to the eye in a vertical progression, like a shutter moving in a movie projector, while the interleave scan may actually include two half-images with a slight respective temporal delay. Thus, the fact that the content video stream may be received in interleaved format, but displayed in progressive format could be problematic.

In one embodiment, this issue may be resolved by writing the interleaved image to memory such that the successive scan lines are stored or mapped as sequential lines to be read as a progressive scan. In other words, the interleaved image may be written to memory as if it were being written to screen, after which it may be read with a progressive scan and displayed with a progressive scan. Said another way, the interleaved image may be buffered in the format of a screen image, and subsequently read and displayed in a progressive fashion. FIG. 14 may illustrate this process by interpreting the interleave picture 1402 as a write to memory operation, and the progressive picture 1404 as a subsequent read from memory operation.

Figure 15:
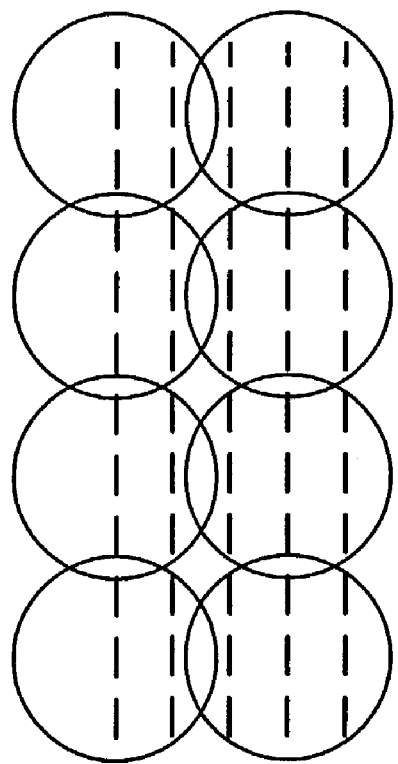
FIG. 15 illustrates single and averaged pixel de-resolution, according to one embodiment.
Figure 15:
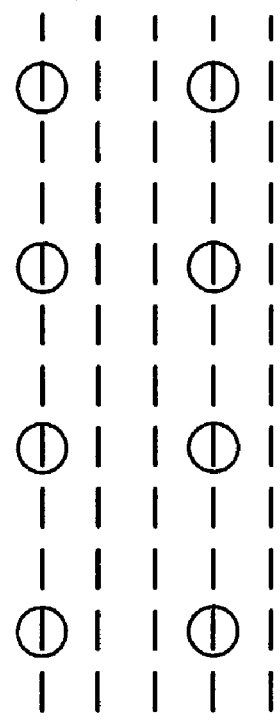

FIG. 15—Image Resolution Reduction

In many cases, images received from the VBuses 810 at one resolution may be displayed at a different, generally lower, resolution. This "de-res" may be performed in more than one way. For example, in one embodiment, the received pixel data of an image may be sampled for writes to memory, e.g., only storing every third pixel (for a ⅓ image resolution reduction). In other words, each sample pixel is assumed to represent that portion of the image in its vicinity. However, there may be substantial, i.e., noticeable, image degradation as a result. In another embodiment, e.g., where sufficient computation resources are available, each sampled pixel may be modified by averaging pixels in the neighborhood, e.g., by averaging the pixel value with those of pixels above, below, left, and right of the sample pixel. FIG. 15 illustrates both of these approaches.

As indicated by FIG. 15, in the example single pixel de-res process shown, every third pixel in a scan line is selected, e.g., for storage in memory and subsequent display on a monitor screen. Similarly, the pixels are sampled from every third image line. In the case of a corresponding averaged pixel de-res process, every third pixel (from every third image line) is selected and averaged with the pixels in a neighborhood of a specified size, in this case, a 3×3 pixel neighborhood. This technique, well-known in the art, may provide a reduced image of substantially higher quality than the single pixel de-res process, in that the modified or averaged pixel value does in fact represent the portion of the image in its vicinity.

FIGS. 16A-16E—Image Scaling

Monitors included in the human interfaces of the communications and/or content distribution system may have any of a variety of screen sizes, such as, for example, 1024×768, 1280×1024, and 1600×1200, among others. For each of these screen sizes there may be optimal sizes for the inserted communications and/or content images. In other words, there may be certain scaling factors which when applied to the images result in image sizes which may be particularly suitable for display on the user's screen(s).

FIGS. 16A-16E illustrate a number of example image insertion cases for a 1024×768 monitor screen. FIG. 16A illustrates a single full-sized VGA or TV screen image (640×480) inserted into the screen image, while FIGS. 16B-16E illustrate various arrangements of multiple inserted images on the screen, where the size of each inserted image is displayed along with the fraction of a full-sized VGA/TV screen image that the inserted image occupies, i.e., the relative size of the inserted image to a full-sized VGA/TV screen image. In one embodiment, the fraction associated with each image may also be interpreted as the effective scaling factor need to reduce a full VGA image to the correctly sized insertion image.

For example, FIG. 16B illustrates two inserted images of size 160×240, where each inserted image is ⅛ the size of a VGA screen. Thus, assuming that the original size of the insertion image was 640×480, an effective scaling factor of ⅛ has been applied to the image to achieve the proper reduction in inserted image size. The reason the scaling factor is termed "effective" is that depending upon the scaled insertion image aspect ratio (horizontal to vertical ratio or its inverse) the size reduction of the image may be achieved in different ways. For example, the insertion image of FIGS. 16B, 16C, and 16E are each in "portrait" orientation, i.e., are taller than they are wide, and thus, depending on the orientation of the original images, the image reduction may involve cropping as well as scaling the images. In contrast, the reduced images shown in FIG. 16D are each in "landscape" format with a reduction ratio of ¼, and so a simple scaling/re-sizing operation performed on the original images may suffice.

Figure 17:
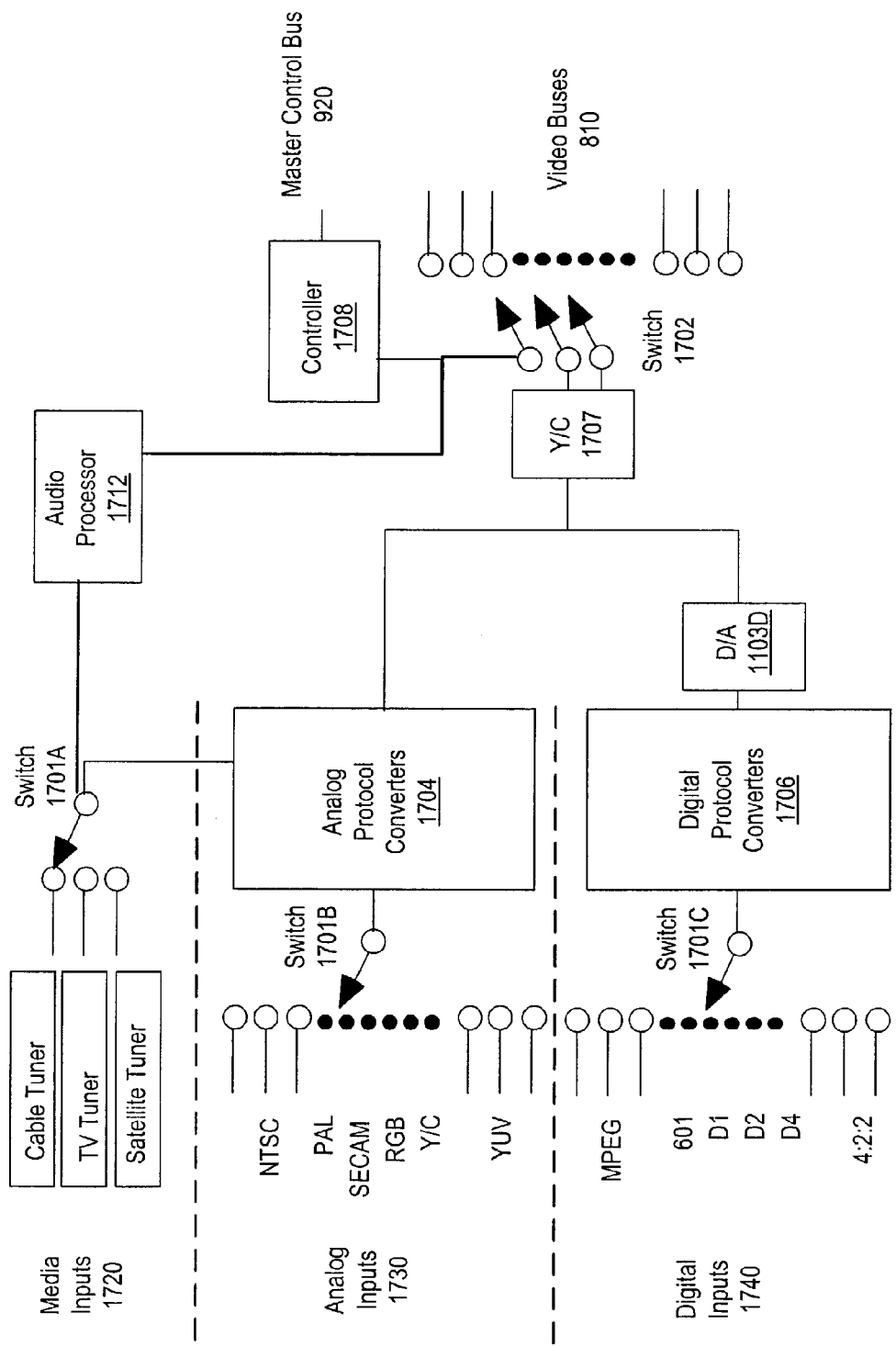
FIG. 17 is a diagram of a content processor, according to one embodiment.

FIG. 17—Content Processor

FIG. 17 is a block diagram of one embodiment of the content processor 806. In one embodiment, the functions of the content processor may include converting the various formats and protocols of content video stream signals to simple S-Video (Y/C) format, and to assign the resulting Y/C signal to a particular VBus 810.

As FIG. 17 shows, in this embodiment, one or more media inputs 1720 may be coupled via switch 1701A to analog protocol converters 1704 and audio processor 1712. The media inputs 1720 may include one or more media sources, such as, for example, modulated signal sources such as a regular broadcast TV tuner, a cable tuner, and/or a satellite tuner, among others. Audio signals associated with the video image signals may be sent separately (from the video image signals) to the audio processor 1712 as shown. The audio processor 1720 may process the audio signals, e.g., by converting to and/or from any of various industry standard audio protocols such as, for example, Dolby 5.1, Composite Stereo (FM Stereo), Midi Commands, DS (Digital Stereo) 1, 2, and 3 protocols for digital sound, among others, and may then transmit the audio signals to VBus switch 1702, where command signals received from controller 1708 may determine onto which VBus 810 the signals may be loaded or transmitted. As indicated by FIG. 17, the command signals from the controller 1708 may be sent to the switch 1702 in response to commands received by the controller 1708 from the master control bus 920.

Other content signals received by the content processor 806 may include both analog inputs 1730, including composite signals such as NTSC, PAL, SECAM, and component signals such as RGB, Y/C (e.g., S-Video), YUV, etc., as well as digital video (and possibly audio) sources and formats 1740, such as DVD, VTR, computer-generated signals, MPEG (2, 3, 4, etc.), \CCIR 601, D1, D2, D4, and 4:2:2, among others, as mentioned above with reference to FIG. 8B. As shown, these analog and digital sources may be switchable by respective content switches 1701B and 1701C, where the selected analog inputs may be routed to the analog protocol converters 1704, and the selected digital inputs may be routed to digital protocol converters 1706. The digital protocol converter 1706 may transmit the converted digital signal to a D/A converter 1103D, where the digital signals may be converted to analog signals. While support for such a wide variety of protocols and formats may seem difficult to achieve, it is noted that they are generally industry standards, and a wide variety of low-cost chip-level converters and processors are readily available from major chip manufacturers to perform these conversion tasks. The respective converters 1704 and 1706 may convert the received signals from their respective original formats/protocols to a simple Y/C format and transmit the converted signals to Y/C unit 1707 where the switch 1702 may then place the video signals onto a selected VBus 810, as shown.

Thus, as FIG. 17 shows, the switch 1702 may load the Y/C video signals and the corresponding audio signals onto the selected VBus 810 for delivery to the video switch 808, as described above. As also described above, each VBus 810 may include three lines—two for the Y/C video signals and a command line for command instructions and audio signals. Thus, in one embodiment, the command line may server two purposes. The command line may carry signaling information (the command signals) which may be modulated onto a 100 KHz carrier, and may also carry the audio signals associated with the video signals as a base-band signal. In one embodiment, the audio signal may be transmitted via current modulation rather than voltage modulation to facilitate aggregation of audio signals. This approach may be particularly useful in using the VBus 810 for audio in the communication mode, i.e., when the distribution system is used to distribute communication signals between users.

FIGS. 18-22—Communications Processor

FIGS. 18-22 illustrates various aspects of the communications processor 804 and its operations, according to one embodiment. As mentioned above, the communications processor 804 preferably operates in conjunction with the content processor 806 in a communications and content distribution system, although a stand-alone communications distribution system is also contemplated. The communications processor 804 may be considered part organizer and part scheduler, in that the communications processor 804 may organize sub-frames from various users for display on the monitors of the human interfaces, as well as schedule frame events and/or multi-user conference sessions.

As noted above, the distribution system Video Bus 810, also referred to as a collective video bus, preferably includes a plurality of video buses (VBuses), each including three lines or wires. In one embodiment, the collective video bus 810 may be 32 channels wide, i.e., may include 32 VBuses, and so may include roughly 100 lines (e.g., 96 lines, 32×3). As described above with reference to FIG. 10, in one embodiment, the collective video bus 810 may include a ribbon cable running the height of each rack, connecting each cage 511 in parallel, thereby providing full access for each cage 511 to each of the VBuses.

As also noted above, for bandwidth reasons, video streaming may be accomplished with analog video signals encoding each video stream as a sequence of image frames. In other words, packet-based video streaming would require substantially greater bandwidth. Also, using the packet-based data network (e.g., Ethernet 840B and 807) for video streaming would likely consume the data network's bandwidth, degrading both the (packet-based) video signals and packet-based data signals used by the communications processor.

Figure 18:
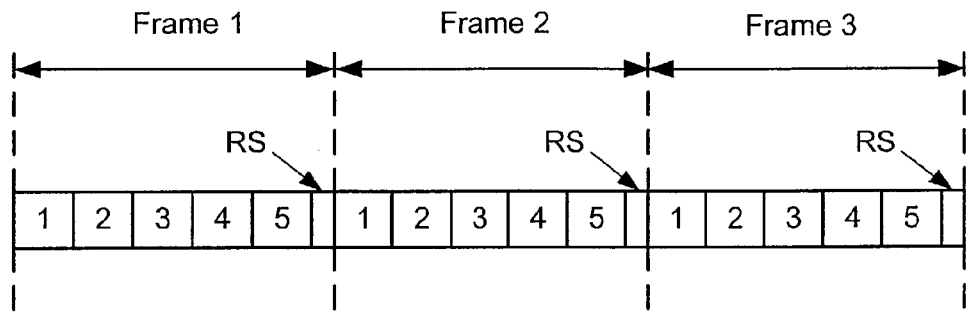
FIG. 18 illustrates communication video sub-frames, according to one embodiment.

FIG. 18—Communications Frames

In one embodiment, the communications processor 804 may handle video streaming in a similar manner as the content processor. However, in the communications system, each frame may include a number of independent smaller sub-frames. FIG. 18 illustrates one embodiment of a sequence of communications video frames, where each frame includes five sub-frames. It should be noted that the frames shown are meant to be exemplary only, and are not intended to limit the format or the number of sub-frames in a frame to any particular format or number.

In the example of FIG. 18, each of the five sub-frames is assumed to be an image of a user in a multi-user communication session or video conference. As FIG. 18 shows, in this embodiment, in addition to the five sub-frames, each of the frames also includes a small "dead time" interval, labeled "RS" for "Re-Sync" time, described below. When the session is initiated, or when a participant is dropped or added to the session, referred to as a communications event, the number of sub-frames in each frame may increase or decrease accordingly. In one embodiment, the sub-frames may occupy time slots in a time domain multiplexing scheme, similar to the approach used in regular telephone conference calls.

Thus, each user participating in the session may be allocated a sub-frame. Because the total number of pixels in the frame cannot exceed the number of pixels on the user's screen, the individual sub-frames must be smaller than the frame. Thus, in one embodiment, the number of pixels in each sub-frame may be specified at the beginning of the session. For example, this information may be passed to the respective camera 135 generating the sub-frame image such that the image generated by the camera 135 is sized by the camera 135, i.e., the image size may be set at the origin (the camera 135) as opposed to sending the full-sized camera image and de-resing the image when it is received. This approach may thus eliminate the need for constant re-sizing computations by the system, offloading this work onto the respective cameras 135.

In a communications session, when the time slot for a sub-frame for a specific user's image occurs, the video bus 810 may switch to a high-impedance (Hi-Z) mode, and the user's image (from the camera 135) may be added to the frame as a sub-frame. Thus, the frame may be generated "on-the-fly" during the communications session, as opposed to sending all of the participant images to a controller, combining them into the frame, then transmitting the finished frame.

Figure 19:
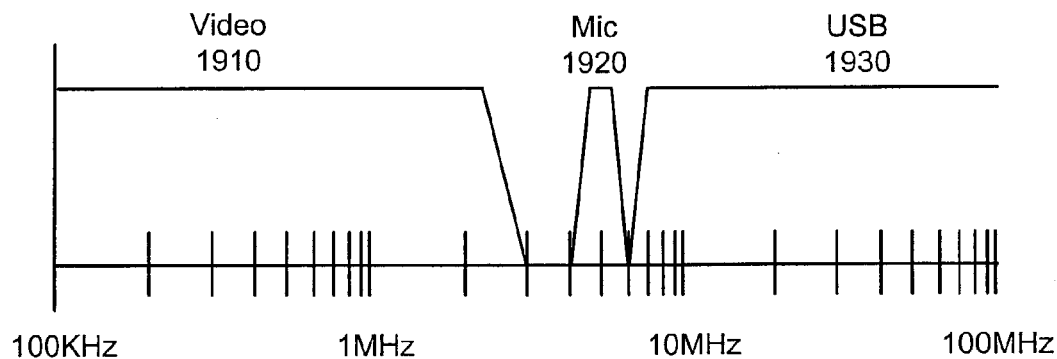
FIG. 19 illustrates signal spectrum allocation for extended USB signaling, according to one embodiment.
Figure 19:
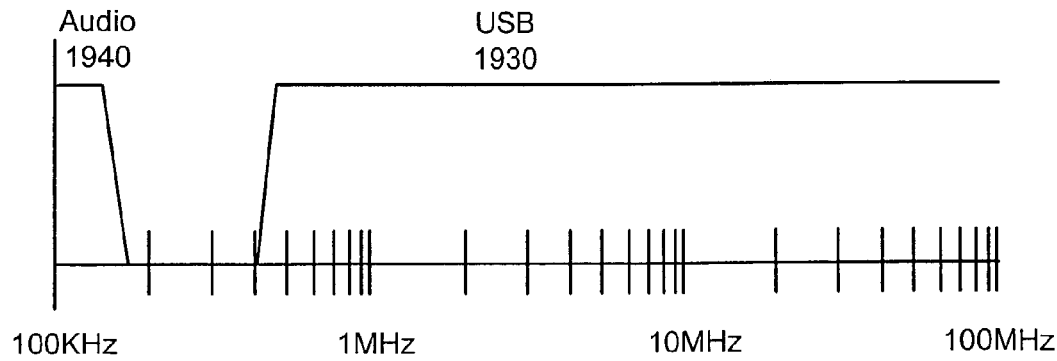
Figure 20:
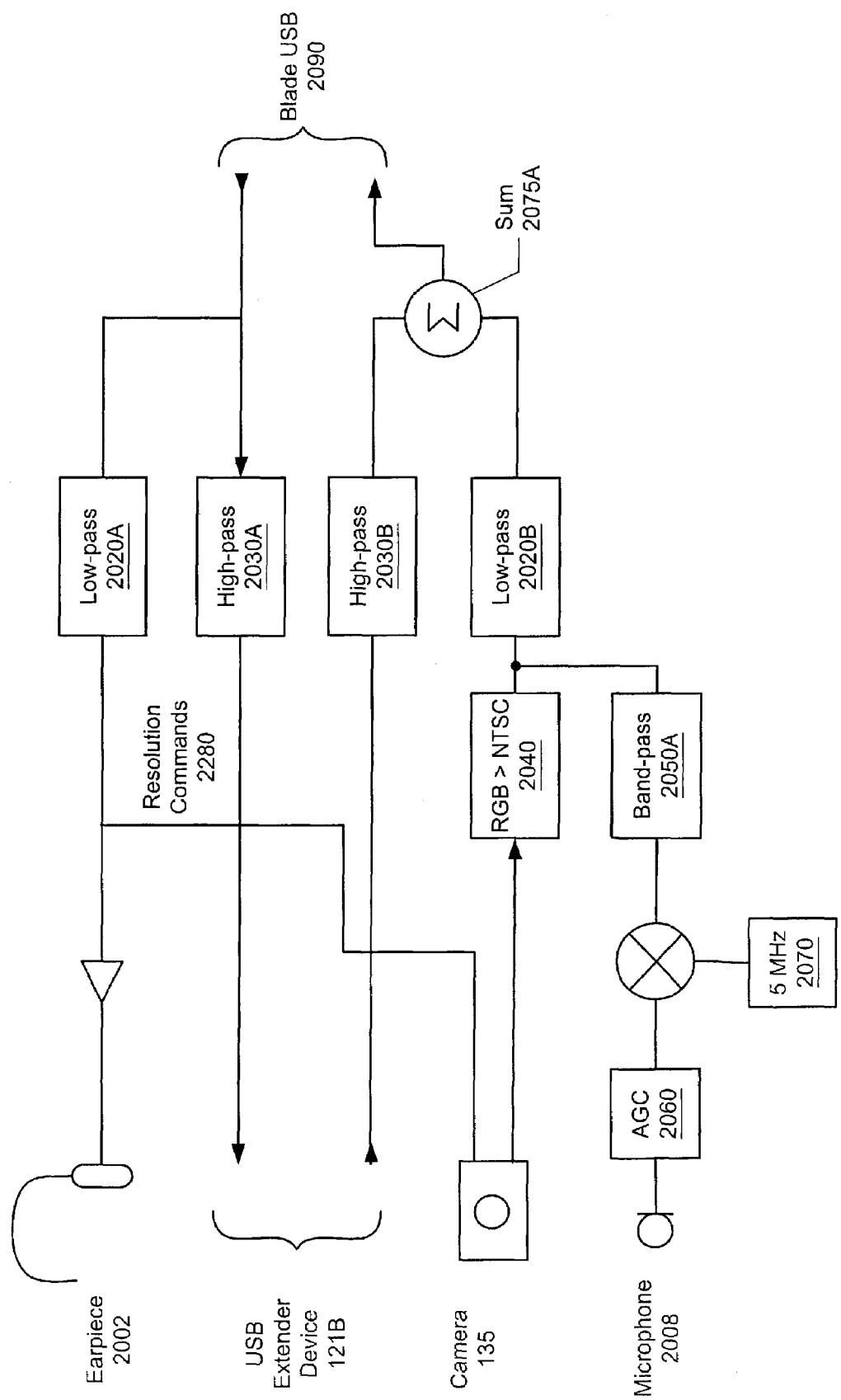
FIGS. 20 and 21 illustrate processing of multi-media signals, according to one embodiment.
Figure 21:
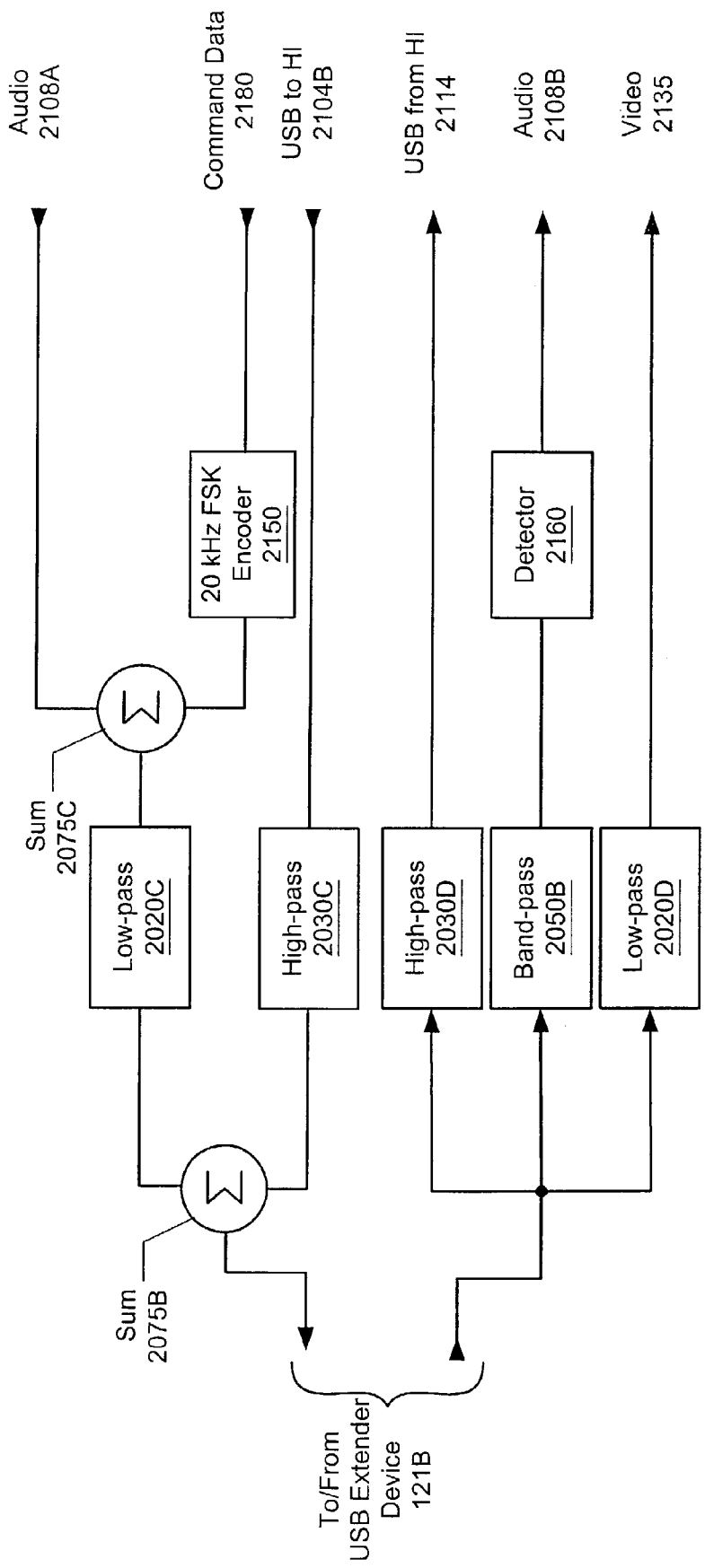

FIGS. 19-21—Transmitting User Interface Signals to and from the Blade Computer FIGS. 19-21 illustrate an approach whereby video and audio information may be transmitted, i.e., returned, from a user's desktop over the same cable used to deliver video and HID (Human Interface Device) signals to the user's desktop. This approach may eliminate the need for a second cable to accomplish the return signal task.

FIG. 19—Spectrum of User Interface Signals to and from the Blade Computer

FIG. 19 illustrates spectrum allocation for user interface signals, according to one embodiment. In one embodiment, a USB signal return line may be employed using distance extension technology (e.g., USBX) over Category 5, 6, or 7 Communications Cable to simultaneously carry the audio and video information back to the computer. In this approach, four pairs of wire may be used to carry signals in Balanced Mode. One pair may be used for each color (Red, Green, and Blue), and the final fourth pair may be used for bi-directional USB signaling. For further details regarding extended USB signaling, please see U.S. patent application Ser. No. 09/619,989 titled "System And Method For Providing A Remote Universal Serial Bus", which was incorporated by reference above.

As FIG. 19 shows, the spectrum for user interface signals transmitted to the blade computer 102 may be divided thus: video signals may be transmitted in the frequency range of approximately 100 KHz through approximately 2 MHz; microphone signals may be transmitted in the frequency range of approximately 4-6 MHz; and USB signals may be transmitted in frequencies from approximately 6 MHz upwards. Additionally, in one embodiment, control information may be embedded in the downstream audio signals to configure the camera at the desktop. Thus, in one embodiment, the USB signals from the remote extender device 121B, e.g., the blade encoder, may be partitioned into 1) audio data with embedded camera control instructions, and 2) USBX data for the USB system.

Conversely, the spectrum for user interface signals transmitted from the blade computer 102 may be divided thus: audio signals may be transmitted in the frequency range of approximately 100 KHz through approximately 170 KHz; and USB signals may be transmitted in frequencies from approximately 400 KHz upwards. This spectral allocation may be performed using a number of high-, low-, and band-pass filters, as illustrated in FIGS. 20 and 21, described below.

FIGS. 20-21—Processing of Multi-Media Human Interface Signals

FIGS. 20 and 21 are block diagrams of signal filtering systems used by the communications processor 804 to transmit human interface signals between the human interface 130 and the blade computer 102 according to the spectrum allocation schemes described above with reference to FIG. 19.

FIG. 20 is a block diagram of a filtering system on the human interface side of the distribution system. In the filtering system of FIG. 20, human interface signals may be received from the various human interface devices included in the human interface 130, such as, for example, camera 135, microphone 2008, etc. As mentioned above, in one embodiment, user interface signals transmitted to and from a given human interface 130 may be passed through an extender device 121B, e.g., an encoding/decoding device which in some embodiments may be referred to as a C/Port. For example, USB signals to and from a mouse, keyboard, etc., of the human interface 130 may be routed through the extender device 121B, as shown.

For example, in one embodiment, the remote extender device 121B, e.g., the C/Port, may receive RGB output from the camera 135, e.g., a digital camera-on-a-chip, and convert the RGB signals to an (analog) NTSC signal with a frequency less than 2.5 MHz. As FIG. 20 shows, the NTSC signal may then be added to a USB return line from the extender device 121B by summer 2075A (after passing through high-pass filter 2030B), and transmitted to the blade computer 102 as USB signals 2090, where the camera signals may then be isolated from the USB carrier and data by band pass limiting filtering. In one embodiment, the USB signals transmitted between the extender device 121B and the blade switch 809 associated with the human interface 130 may be extended USB (USBX) signals with the spectrum allocation described above. For further details regarding extended USB signaling, please see U.S. patent application Ser. No. 09/619,989 titled "System And Method For Providing A Remote Universal Serial Bus", which was incorporated by reference above.

As FIG. 20 also shows, in one embodiment, signals may be received from a microphone 2008, passed through an automatic gain control (AGC) 2060, multiplexed with a 5 MHz carrier frequency 2070, passed through a band-pass filter 2050A, and combined with the converted NTSC camera signals for transmission to the blade computer 102, as shown.

Thus, signals transmitted from the HI to the blade computer 102 may include the high frequency USBX signal, a low frequency camera data signal, and a mid-band audio modulated channel. As the audio may be the result of a microphone input the dynamic range needed may exceed the limits of the modulation scheme, and so the audio may be run though an AGC (Automatic Gain Control) to assure a proper signal level. The audio signal may be modulated on the carrier signal and mixed in with the base-band NTSC video signal. Energy above the video and audio range may be filtered out and the resulting combination signal sent upstream to the blade computer 102.

Thus, as FIG. 20 shows, human interface signals may be received from the human interface devices and passed through respective filters before being transmitted to the respective blade computer 102.

Conversely, human interface signals may also be sent from the blade computer 102 to various human interface devices, e.g., earpiece/headphone 2002 and other devices coupled to the remote extender device 121B, e.g., monitors, speakers, etc., as shown. For example, USB signals 2090 from the blade computer 102 may include audio signals targeted at the earpiece 2002, and command signals targeted to the camera 135 (e.g., specifying image size and/or resolution), as mentioned above, as well as USB human interface signals targeted to the HI via extender device 121B. The audio and command signals may be separated out via low-pass filter 2020A, while the USB signals may be passed through high-pass filter 2030A and transmitted to the extender device 121B for distribution to respective USB human interface devices. The command signals may be separated from the audio signals and transmitted to the camera 135, as shown.

The human interface signals from the blade USB 2090 targeted for the extender device 121B may be separated from the audio and command signals by the high-pass filter 2030A and transmitted to the extender device 121B as shown.

FIG. 21 is a block diagram of the filtering system on the blade computer side of the distribution system, according to one embodiment. More specifically, in one embodiment, the filtering system shown in FIG. 21 may be included in the host extender device 121A coupling the blade computer 102 to the communication processor 804.

As FIG. 21 shows, in this embodiment, user interface signals originating from the blade computer 102 targeted to the human interface 130 (e.g., the remote extender device 121B) may include audio signals 2108A, command data 2180, and USB interface device signals 2104A. In one embodiment, the command data 2180 may be processed by a frequency shift key (FSK) module 2150 (e.g., at 20 KHz), then merged or combined with the audio signals 2108A via summer 2075C. In one embodiment, the command data or signals 2180 may have a frequency higher than the human ear can detect (and possibly higher than the earpiece, headphones, or speakers, can effectively play), and the audio signals may be at frequencies lower than the command signals, such that the camera 135 may not respond to the audio signals, while responding to the command signals. In one embodiment, the camera 135 may include a detector which utilizes frequency shift keying for detecting commands, listening for a control tone (the command signal) and noting when it changes frequency, e.g., where shifting from 20 kHz to 19 kHz and back to 20 kHz represents one bit. Thus, the carrier for the FSK 2150 is preferably above the audio band.

The combined audio/command signals may then be filtered through low-pass filter 2020C, e.g., to remove any energy that would effect the USB signal, and transmitted to summer 2075B. USB human interface signals 2104B from the blade computer 102 targeted for the HI, e.g., the remote extender device 121B, i.e., USB to HI signals 2104B, may be filtered by high-pass filter 2030C, e.g., to remove any energy that might interfere with the audio signals, and transmitted to summer 2075B, where they may be combined with the audio/command signals and transmitted to the extender device 121B, e.g., the HI 130, as indicated by the USB to HI signal path 2104A. In one embodiment, the USB to HI signals 2104B may include a 6 MHz carrier with modulation.

In the embodiment shown, user interface signals originating from the human interface 130 (e.g., from the extender device 121B) targeted for the blade computer 102 may include USB from HI signals 2114, audio signals 2108B, and video signals 2135. Combined human interface signals may be received from the extender device 121B and split out into the audio signals 2108B, the video signals 2135, and the USB from HI signals 2114 by band-pass filter 2050B, low-pass filter 2020D, and high-pass filter 2030D, respectively. In one embodiment, the audio signal 2108 may also pass through a detector 2160, as shown. Thus, filters (2030D, 2050B, and 2020D) may disassemble the return signal from the remote extender device 121B at the HI 130, e.g., the C/Port, starting with the high frequency filter 2030D extracting the USBX data stream for transmittal to the blade computer 102. Band-pass filter 2050B may separate return audio data 2108 from the carrier (e.g., a 5 MHz carrier), which may be detected and fed to the audio system (of the blade computer 102). Finally, a low-pass filter may recover the base-band video 2135 which may be fed to a subsequent NTSC decoder and used as needed. Thus, the filtering system of FIG. 21 may "undo" the signal combining performed by the system of FIG. 20.

Various embodiments of the above described system may thus provide means for transporting streaming real-time video back from the user's desktop to the computer 102 without packetization. Additionally, a separate (non-USB) audio link may be established in both directions which uses packetization of the data. Finally, control information may be sent to the camera to control such features as resolution and pan/tilt positioning commands, among others.

Figure 22:
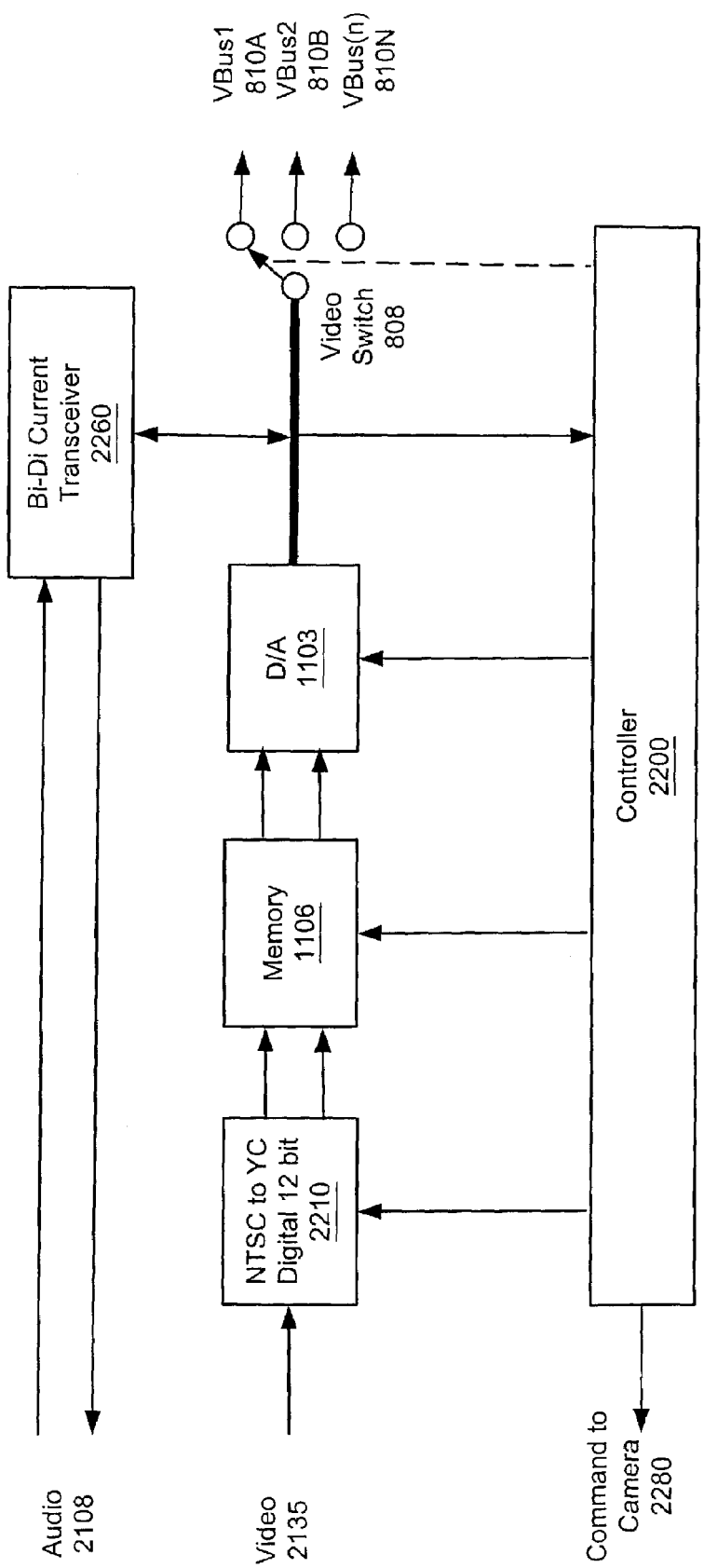
FIG. 22 is a block diagram illustrating video and audio signal delivery to a video bus, according to one embodiment.

FIG. 22—Communication Video and Audio Signal Delivery to a Video Bus

FIG. 22 is a block diagram illustrating the delivery of video and audio signals onto the video bus 810, according to one embodiment. As FIG. 22 shows, controller 2200 may be operable to send commands 2280 targeted to the camera 135, e.g., specifying camera image resolution, size, etc. The controller 2200 may also be operable to send control signals to the NTSC-to-Y/C converter 2210, memory 1106, D/A converter 1103, and video switch 808.

As FIG. 22 shows, in one embodiment, audio signals 2108 may be transmitted bi-directionally (Bi-Di) through current transceiver 2260, which may communicate these audio signals bi-directionally with a selected VBus 810 via the video switch 808. In other words, audio signals may be current modulated onto and current demodulated from the command line of the selected VBus 810 using a bi-directional current source.

As FIG. 22 also shows, incoming NTSC video signals 2135, e.g., a camera image of a video conference participant, may first be converted to Y/C format (e.g., 12-bit digital) by NTSC-to-Y/C converter 2210. The converted signals may then be stored in memory 1106, as shown. When read from memory 1106 (by controller 2200), the digital signals may be converted to analog by D/A converter 1103, as shown. Finally, the converted analog video signals (Y/C) may be placed on the selected VBus 810 as a sub-frame.

Figure 23:
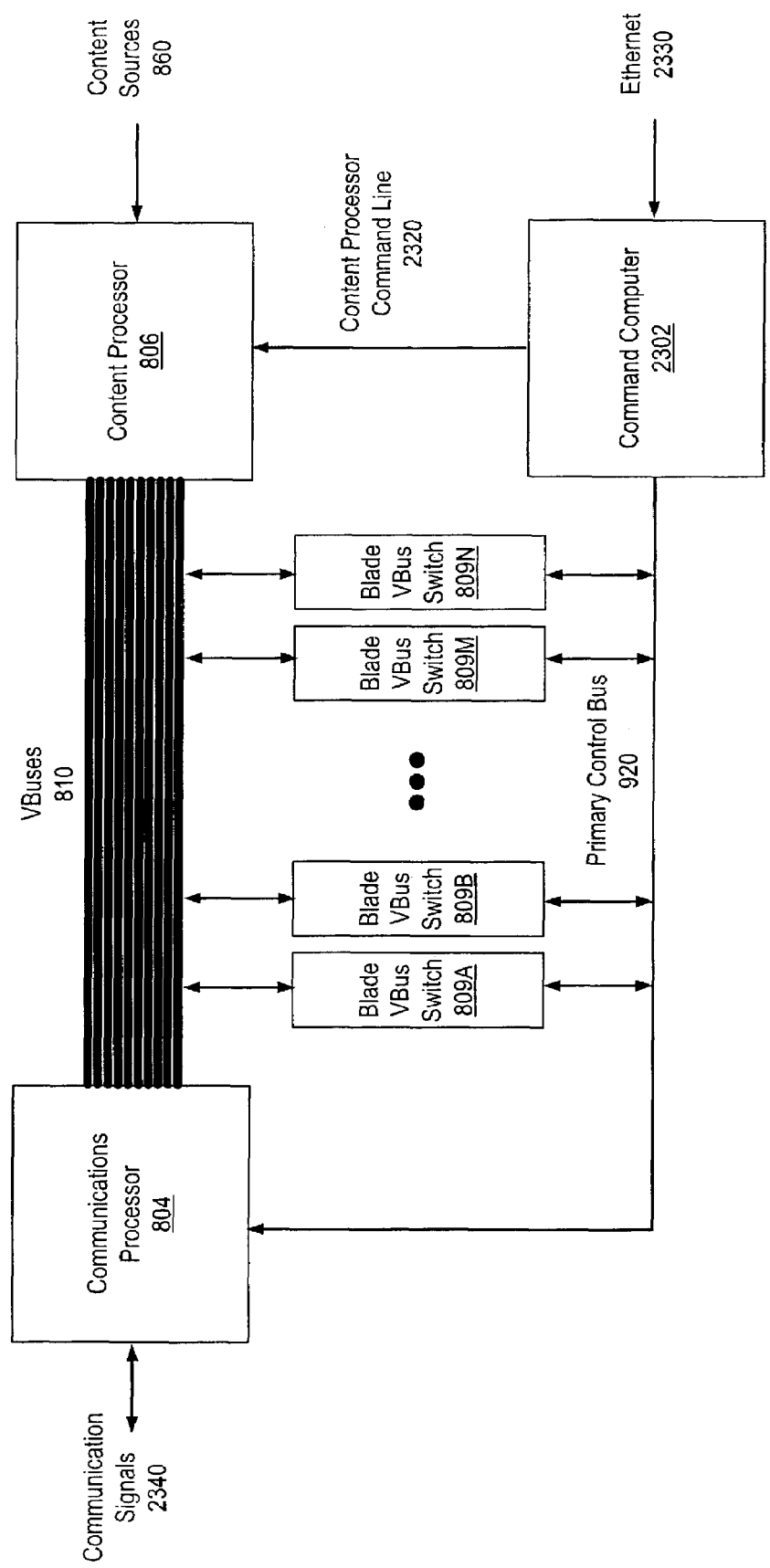
FIG. 23 illustrates content operations, according to one embodiment.

FIG. 23—System Control

FIG. 23 illustrates system control for the communications and content distribution system, according to one embodiment. As the system depends on many elements performing assigned tasks which may vary considerably, some type of overall control may be necessary. In one embodiment, the user of the system may control the system through a semi-autonomous user interface, i.e., where the user interface is operated at least partially independent from the central system. For example, the user interface may be implemented as a web page. Alternatively, the user interface may implemented as an executable (or interpretable) program that runs on one or more of the computing systems 102. The user may provide input to the interface indicating tasks to be performed, configurations to be set, and/or decisions to be made. The task, configuration, and/or decision may then be implemented in and by the system via a series of simple instructions which may program the elements appropriately.

In the embodiment shown, a command computer 2302 may couple to the content processor 806 via content processor command line 2320, and to the communications processor 804 via primary control bus 920, as shown. A plurality of blade VBus switches 809 may provide switching functionality for the VBuses 810 in response to commands received from the command computer 2302 over the primary control bus 920.

In the control system illustrated in FIG. 23, a main controller may be included in the content processor 806. In one embodiment, many of the features of the communications processor 804 may be distributed throughout the system, and thus the communications processor 804 may be considered a virtual device that is also included in the main controller. The communications distribution system may interface to the outside world via a hardware process included on the video buses 810.

As described above, the content processor 806 may receive video signals (i.e., content) from the various content sources 860, decode the content, and route the decoded content to one or more of the video buses 810. The communications interface may be operable to format VBuses 810 for analog and/or IP connection to other networks, e.g., IP, standard video protocols such as RGB, Y/C, etc., or other communication protocols and techniques as described in one or more of the U.S. patents and patent applications incorporated by reference above.

Content Operations

In one embodiment, the command computer 2302 may communicate control information to the content processor 806 specifying what content signals are to be carried on any specific VBus 810. In the embodiment shown, these control commands may be transmitted on the content processor command line 2320. Generally, a VBus 810 may be committed to either an image from the content sources 860, or to be a link for communications frames. In the case where the VBus 810 is used to carry content images, both the particular content source 860 and a source decoding scheme is preferably specified along with the actual VBus to be used for the content distribution. When the VBus 810 is used to distribute communications, the VBus 810 may simply be left alone, e.g., unloaded and signal free.

The primary control bus 920, shown in FIG. 23, may be used to notify the individual blade VBus switches 809 as to which VBus to switch to for content distribution. Additionally, the command computer 2302 may signal the individual blade VBus switches 809 over the command line of each VBus 810 as to the size and location of the images inserted on the user's screen, e.g., upper left and lower right corners of the image relative to the user's screen size, as described above. A blade VBus switch 809 may be operable to receive multiple instructions describing insertion for respective multiple images. In other words, in some embodiments, the blade VBus switch 809 may support multiple image insertions, where a plurality of images are displayed at the same time on the user's monitor screen.

Communications Operations

In one embodiment, when a communications session, e.g., a video conference session, is initiated or activated one or more of the following commands may be issued by the command computer 2302:

The content processor 806 may be instructed to clear a particular VBus 810 and specify it (the VBus) as a communications session VBus. The content processor 806 may then place an "RS" command and associated data onto the specified VBus, thereby providing a timing base for the insertion of video images (e.g., communications video signals). This RS command may be transmitted to the content processor 806 over the content processor command line 2320.

Each of the blade computers participating in the communications session may be instructed as to which VBus to switch to for the session. These instructions may be transmitted over the primary control bus 920.

Session control software, e.g., executing on the command computer 2302 or on the participating blade computers 102, may compute the size and location of each participant's image on each of the other participant's screens. This information, possibly along with sequencing, traffic rules, resolution commands for the camera, and/or rate comments for camera image scaling systems may be transferred to the respective blade computers 102 over the primary control bus 920.

The implementation of the above commands may thus result in activation of the communications session.

Figure 24:
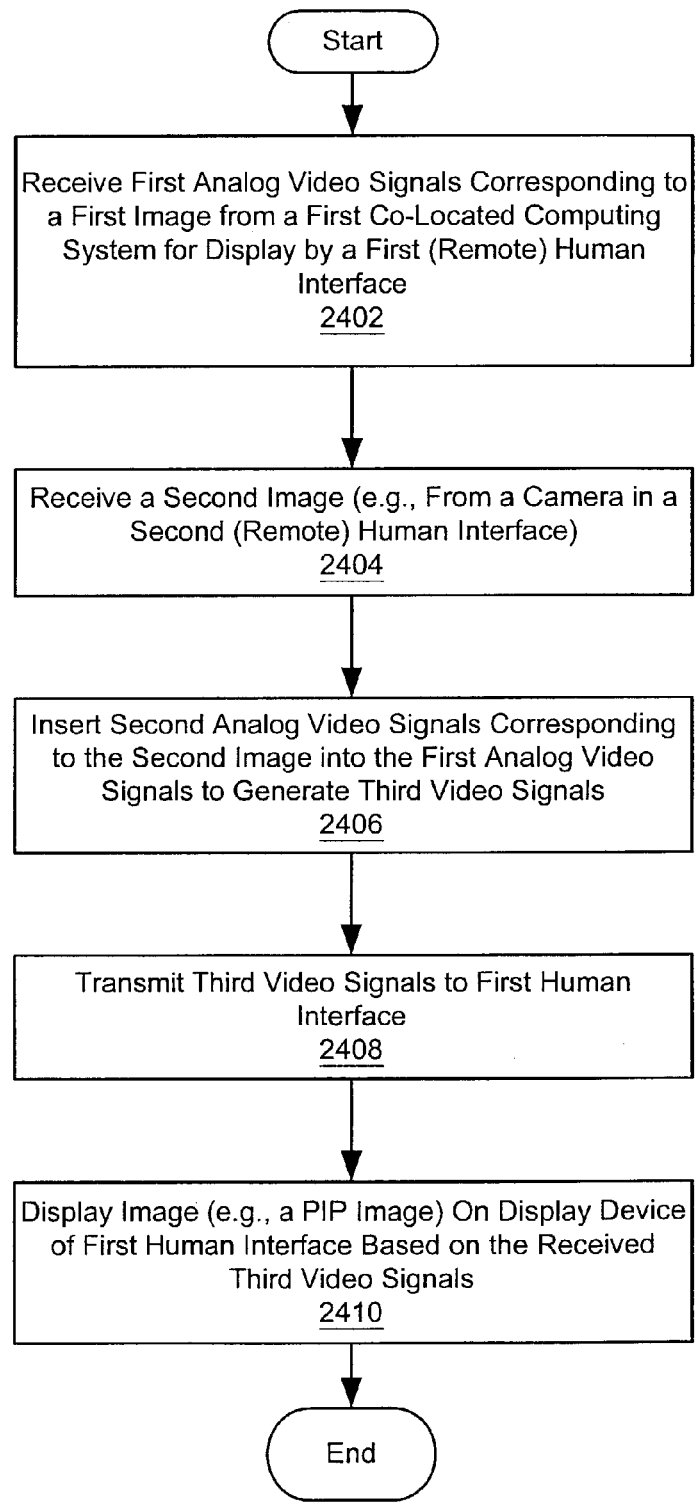
FIG. 24 is a flowchart of one embodiment of a method for insertion of video signals for display at a human interface, according to one embodiment.

FIG. 24—Method for Insertion of Video Content and Communications

FIG. 24 is a flowchart of one embodiment of a method for inserting video content and/or video communications into video signals for display in a human interface 130, e.g., a computer monitor 116 or other display device of the human interface 130, as may be performed, for example, by the system described above with reference to FIG. 11. It is noted that the embodiment of the method described below is meant to be exemplary only, and is not intended to limit the invention to any particular approach. For example, in various embodiments, two or more of the steps described may be performed concurrently or in a different order than shown, or may be omitted. Additional steps may also be performed. Additionally, as noted above, although in the embodiment described below, the video data comprises analog video signals, other embodiments are also contemplated where the video data comprises digital video data or a combination of both analog and digital video data.

As FIG. 24 shows, in 2402, first analog video signals corresponding to a first image may be received from a first computing system 102, e.g., a co-located computing system 102, where the first analog video signals are intended for display by a first (possibly remote) human interface 130A. For example, the video signals may include a typical desktop image for a computer system. As described in detail above, in one embodiment, the received video signals may originate from any of the plurality of co-located computers in a communications and/or content distribution system.

In 2404, a second image may be received. For example, as described above, the second image may be received from a camera in a second (possibly remote) human interface 130B, such as in a video conferencing or video telephony session, where a plurality of users may each send and receive camera images (and accompanying audio) of each other. In other embodiments, the second image may include video communications, e.g., or video content originating from a variety of sources, such as television tuners, satellite tuners, cable tuners, digital video sources, etc.

In 2406, second analog video signals corresponding to the second image may be inserted into the first analog video signals to generate third video signals. For example, in the video conferencing example given above, respective video images may be inserted into each of the other participant's screen images, allowing the participants to view (and optionally hear) one another via their respective human interfaces. Additionally, media content, such as television broadcasts, may also be inserted into the screen images, allowing each participant to view related video content during the video conference. As another example, a streaming news broadcast may be inserted into the screen image of a monitor 116 (in a human interface 130) as a Picture-in-Picture (PIP) image, allowing the user of the human interface 130 to view (and possibly hear) relevant media content while working.

In one embodiment, the second analog video signals may be generated from a modified version of the second image. For example, the second image may be scaled, e.g., reduced in size and/or resolution, or otherwise processed for display on the human interface display device 116, as indicated above. Thus, the third video signals may include at least a portion of the original (first) image plus at least a portion of the second image, e.g., in a PIP format.

In 2408, the third video signals may be transmitted to the first human interface 130A, e.g., over a serial bus 110. As described in detail above, transmitting the third video signals may involve the use of signal transmission extender technologies, such as, for example, encoding the signals into the USBX protocol prior to transmission.

Finally, in 2410, an image may be displayed on the display device 116 of the first human interface 130A, based on the received third video signals. For example, a PIP image based on the first and second video images may be displayed on the monitor 116 of the first human interface. It should be noted that although the method was described in terms of inserting a second image into a first image, the described technique may be used to insert a plurality of video images from a variety of sources into the first image. Thus, video images from multiple sources, including the user's computer system 102, may be combined in real-time to provide video content and/or video communications to a user of the system.

Figure 25:
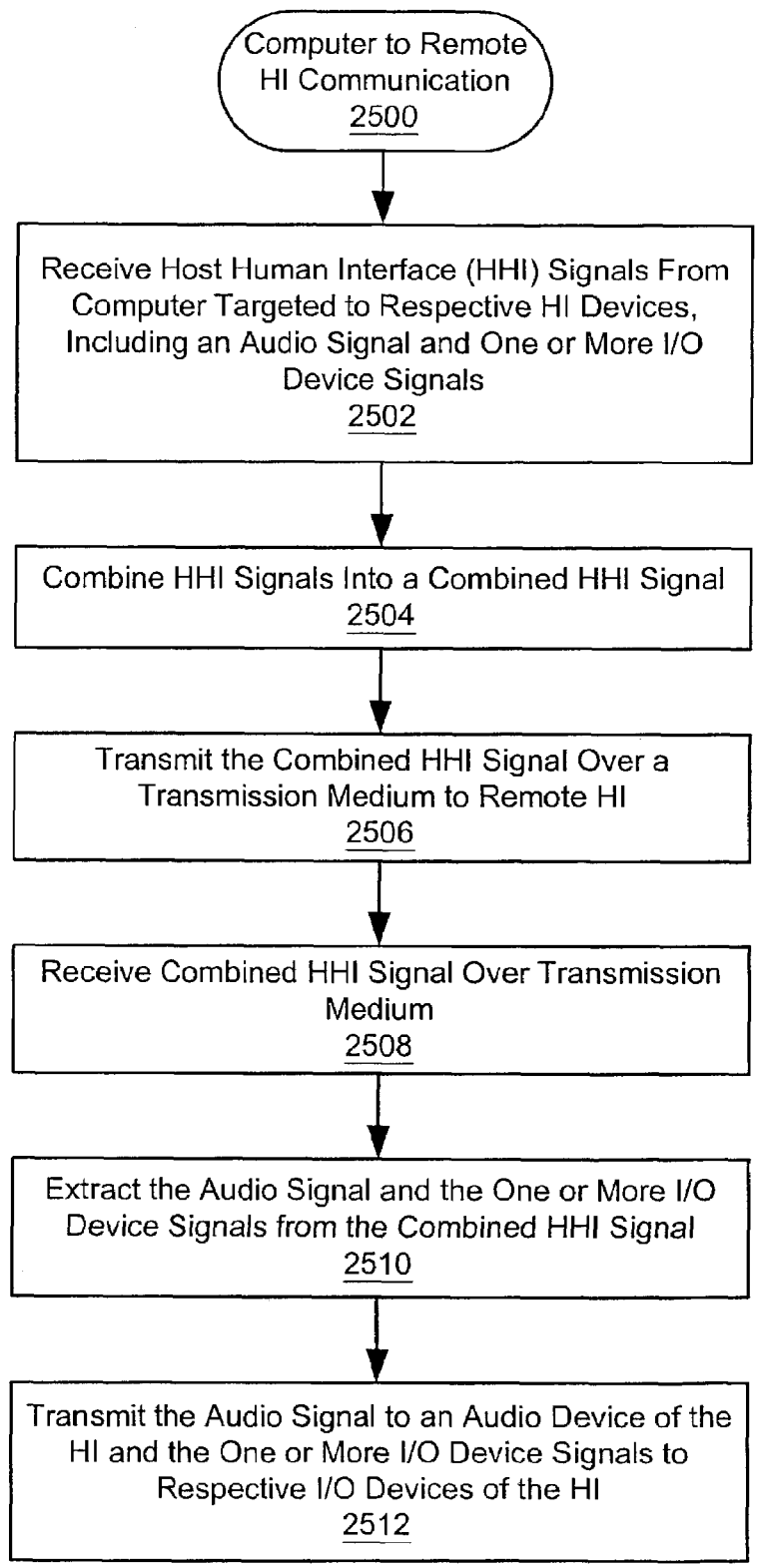
FIGS. 25 and 26 flowchart embodiments of methods for communicating human interface signals between a computer and a remote human interface.
Figure 26:
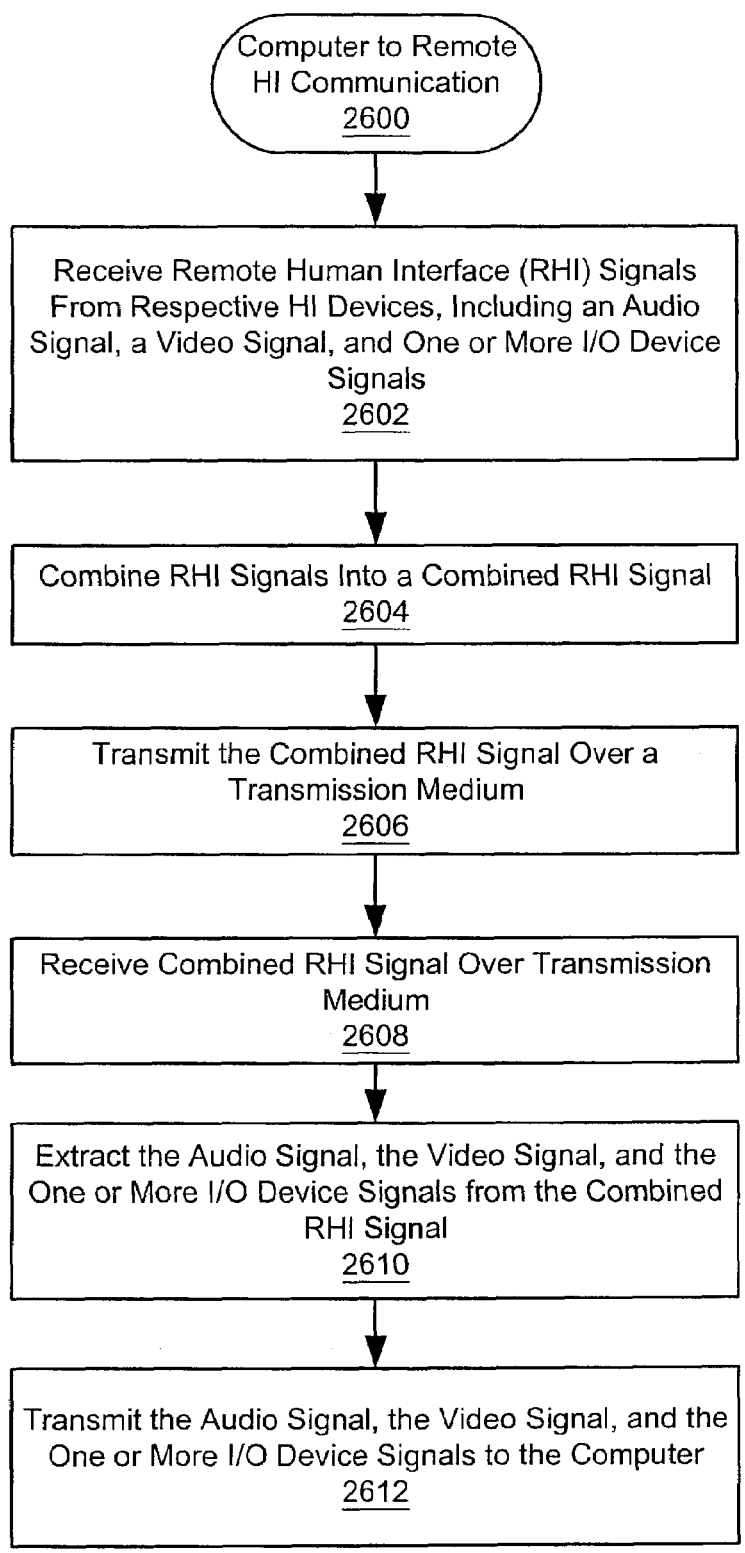

FIGS. 25 and 26—Methods for Communication Between a Computer and a Remote Human Interface FIGS. 25 and 26 flowcharts embodiments of methods for communications between a computer 102 and a remote human interface (RHI) 130. More specifically, the methods of FIGS. 25 and 26 illustrate an approach whereby human interface signals, e.g., audio, video, and/or I/O device signals (e.g., USB signals), may be transmitted in both directions over a single transmission medium, e.g., serial link 110, according to one embodiment. In a preferred embodiment, the methods utilize the system illustrated in FIGS. 19-21, described above. It is noted that the methods presented in FIGS. 25 and 26 may be used in conjunction with one another to facilitate the two-way communication between the computer 102 and the remote HI 130. It is further noted that embodiments of the methods of FIGS. 25 and 26 may be used to implement various embodiments of the content and/or communications distribution systems described above.

FIG. 25—Method for Transmitting HI signals from the Computer to the Remote HI

FIG. 25 flowcharts one embodiment of a method for communications between a computer 102 and a remote human interface 130. More specifically, the method of FIG. 25 illustrates an approach whereby audio and I/O device signals (e.g., USB signals), may be transmitted from the computer 102 to the remote human interface 130, e.g., to a plurality of HI devices included in the HI 130. In a preferred embodiment, the method utilizes the system illustrated in FIGS. 19-21, described above. It should be noted that in various embodiments, some of the steps described may be performed concurrently, or in a different order than shown, or may be omitted. Additional steps may also be performed.

As FIG. 25 shows, in 2502, a plurality of host human interface (HHI) signals may be received from a computer 102, where each of the plurality of HHI signals is targeted to a corresponding HI device included in the remote human interface 130. Note that as used herein, the term "host human interface signals" refers to signals originating from the host computer and/or devices included in the host computer 102, which are to be sent to the remote human interface 130.

In a preferred embodiment, the plurality of HHI signals include an audio signal 2108A and one or more I/O device signals 2104B. For example, the audio signal 2108A may be targeted to speakers, headphone, or earpiece of the HI 130. Similarly, the one or more I/O device signals 2104B may be targeted to a respective one or more I/O devices of the HI 130. In one embodiment, the I/O devices may include a computer keyboard, a mouse or other pointing device, a PDA IR device, or any other I/O device as desired. In one embodiment, the one or more remote I/O device signals may be extended USB (USBX) signals, and the one or more I/O devices included in the HI may include one or more USB devices, although other protocols and other types of I/O devices are also contemplated. As described above, in a preferred embodiment, the HI 130 may also include a video camera 135 which may operate to generate a video stream, e.g., of user images, and which may be configured by a command signal from the computer 102. As also described above, in one embodiment, the HHI signals may be received by a host encoder/decoder, e.g., a host extender device 121A, which may include at least a portion of the systems described with reference to FIGS. 20 and 21.

Once the HHI signals are received in 2502, then in 2504, the plurality of HHI signals may be combined into a combined HHI signal. In other words, the audio 2108A and I/O device signals 2104B may be combined into a combined signal for transmission over a single transmission medium, e.g., serial link 110, to the HI 130. For example, referring back to FIGS. 19-21, the method may utilize various filters, frequency shifters, etc., to populate respective portions of the available spectrum of the transmission medium 110 with the various HI signals.

In one embodiment, command signals for the video camera 135 may also be included in the combined HHI signal. For example, as described above with reference to FIG. 21, in an embodiment where the plurality of HHI signals include a command signal for the video camera 135 included in the HI, combining the plurality of HHI signals into a combined HHI signal may include combining the audio signal and the command signal into a combined audio/command signal, e.g., via summer 2075C, and then combining the combined audio/command signal and the one or more I/O device signals into the combined HHI signal, e.g., via summer 2075B. In one embodiment, a frequency shift key (FSK) encoder module 2150 may process the command signal prior to combining the audio signal and the command signal into the combined audio/command signal, e.g., to encode the command signal in a frequency range which is inaudible to the human ear. In the embodiment shown in FIG. 21, the 20 kHz FSK 2150 may operate to shift the command signal frequency to the 20 kHz range, where, for example, a carrier signal of 20 kHz shifts to 19 kHz and back to 20 kHz to indicate a bit (e.g., a "1"). In other words, the command signal 2180 may be switched between 20 kHz and 19 kHz to encode a sequence of ones and zeros which may operate to configure the video camera 135 of the HI 130. It is noted that a corresponding FSK decoder, e.g., coupled to or included in the camera 135, may operate on the remote HI end to decode the command signal back to digital commands (ones and zeros) for the camera 135.

As indicated in FIG. 21, in one embodiment, a low-pass filter 2020C may be applied to the combined audio/command signal prior to combining the combined audio/command signal and the one or more I/O device signals into the combined HHI signal, e.g., to remove any signal energy (e.g., frequencies) that might interfere with the I/O device signals, e.g., USBX signals.

Similarly, in one embodiment, a high-pass filter 2030C may be applied to the one or more I/O device signals prior to combining the combined audio/command signal and the one or more I/O device signals into the combined HHI signal, e.g., to remove any signal energy (e.g., frequencies) that might interfere with the audio/command signal.

Once the HHI signals have been combined into a combined HHI signal, then in 2506, the combined HHI signal may be transmitted over a transmission medium, e.g., to the remote HI 130, e.g., to a remote extender device 121B, as described above. It should be noted that in a preferred embodiment, prior to applying the high-pass filter, the one or more I/O device signals 2104B may be encoded using distance extension technology, e.g., may be encoded into USBX signals for transmission over distances longer than typically allowable by standard transmission protocols, such as USB. For further information regarding extension technologies, please see U.S. patent application Ser. No. 09/619,989 titled "System And Method For Providing A Remote Universal Serial Bus", which was incorporated by reference above.

The combined HHI signal may then be received over the transmission medium, as indicated in 2508, e.g., by the system described above with reference to FIG. 20. For example, in one embodiment, a remote encoder/decoder included in the remote HI 130 may include the system of FIG. 20, and may receive the combined HHI signal, as described above.

In 2510, the audio signal and the one or more I/O device signals may be extracted from the combined HHI signal. In one embodiment, extracting the audio signal and the one or more I/O device signals from the combined HHI signal may include applying a low-pass filter 2020A to the combined HHI signal to generate the audio signal, as illustrated in FIG. 20. Similarly, as also shown in FIG. 20, in one embodiment, a high-pass filter 2030A may be applied to the combined HHI signal to generate the one or more I/O device signals.

In an embodiment where a command signal is included with the audio signal, e.g., where the combined HHI signal includes a combined audio/command signal, the low-pass filter may be applied to the combined HHI signal to generate the combined audio/command signal including the audio signal and the command signal targeted to the video camera of the human interface.

Finally, as indicated in 2512, the audio signal may be transmitted to an audio device included in the HI, e.g., to an earpiece 2002, as shown in FIG. 20, or to any other type of audio device, such as speakers, headphone, and so forth. In an embodiment where the combined HHI signal includes a combined audio/command signal, the command signal may be transmitted to the video camera of the human interface, where the command signal operates to configure the video camera, e.g., the command signal may operate to set a resolution level of the video camera. As mentioned above, in one embodiment, an FSK decoder may be coupled to or included in the camera 135, and may decode the command signal back to digital commands (ones and zeros) for the camera 135.

In a preferred embodiment, due to their respective frequencies, the audio signal may not have to be separated from the command signal before their respective propagations to the audio device and the video camera. In other words, if the command signal has a frequency range which is above (or below) the audible frequency range for humans, then the combined audio/command signal may be sent to the audio device as is, and the inaudible command signal may simply be ignored. Similarly, as long as the frequency range of the audio signal does not interfere with the command signal, the combined audio/command signal may be sent to the video camera 135, where the command signal portion may be used to configure or control the camera, and the audio signal may be ignored. Of course, if desired, in one embodiment, the audio signal and the command signal may each be extracted from the combined audio/command signal, e.g., by low-, band-, or high-pass filters, and the respective signals sent to their respective devices. In other words, the audio signal may be separated from the command signal prior to transmitting the signals to the audio device and the video camera, respectively.

Similarly, the one or more I/O device signals may be transmitted to respective one or more I/O devices included in the HI 130, e.g., a USB keyboard, USB mouse, etc., as was described in detail above. In an embodiment where the one or more I/O device signals were encoded using an extension technology, e.g., where the I/O device signals were encoded into USBX signals, the USBX I/O device signals may be decoded prior to transmittal to the respective I/O devices. For example, the USBX I/O device signals may be decoded to standard USB signals, then transmitted to respective USB devices.

Thus, various embodiments of the method described above may operate to communicate human interface signals from the computer to the remote human interface. Additionally, I/O device signals may be encoded/decoded to and from a special extension protocol (e.g., USBX) that allows the signals to be communicated over substantially longer distances than typically allowed by I/O device signal transmission protocols, e.g., USB.

One embodiment of a method for transmitting HI signals in the other directions, e.g., from the remote HI 130 to the computer, is described below with reference to FIG. 26. As mentioned above, in a preferred embodiment, the method of FIG. 25 may operate in conjunction with that of FIG. 26 to facilitate two-way HI signal communications between the computer 102 and the remote HI 130 over a single transmission medium, e.g., over a single cable 110.

FIG. 26—Method for Transmitting HI signals from the Remote HI to the Computer FIG. 26 flowcharts one embodiment of a method for communicating human interface signals from the remote human interface 130 to the computer 102. More specifically, the method of FIG. 25 illustrates an approach whereby audio, video, and I/O device signals (e.g., USB signals), from a plurality of HI devices may be transmitted from the remote human interface 130 to the computer 102. In a preferred embodiment, the method utilizes the system illustrated in FIGS. 19-21, described above. It should be noted that in various embodiments, some of the steps described may be performed concurrently, or in a different order than shown, or may be omitted. Additional steps may also be performed.

As FIG. 26 shows, in 2602, a plurality of remote human interface (RHI) signals may be received from a respective plurality of human interface devices include in the remote human interface 130. In one embodiment, the plurality of human interface devices included in the remote human interface 130 include a microphone or other audio signal generator, a video camera 135, and one or more remote I/O devices, e.g., keyboard, mouse, telephone, etc. Thus, the plurality of RHI signals may include an audio signal from the microphone of the remote HI, a video signal from the video camera 135 in the remote HI, and one or more remote I/O device signals from the one or more I/O devices in the remote HI. As noted above, any other HI devices or peripherals are also contemplated as falling within the scope of the present systems and methods.

As noted above, in one embodiment, the one or more remote I/O device signals may be extended USB (USBX) signals, and the one or more I/O devices included in the HI may include one or more USB devices, although other protocols and other types of I/O devices are also contemplated. As described above, in a preferred embodiment, the HI 130 may also include video camera 135 which may operate to generate a video stream, e.g., of user images. As also described above, in one embodiment, the RHI signals may be received by a remote encoder/decoder, e.g., a remote extender device 121B, which may include at least a portion of the systems described with reference to FIGS. 20 and 21.

In 2604, the plurality of RHI signals may be combined into a combined RHI signal. In other words, the audio, video, and I/O device signals may be combined into a combined RHI signal for transmission over a single transmission medium (serial link 110) to the computer 102. For example, referring back to FIGS. 19-21, the method may utilize various filters, frequency shifters, etc., to populate respective portions of the available spectrum of the transmission medium 110 with the various HI signals.

For example, as FIG. 20 shows, in one embodiment, combining the plurality of RHI signals into a combined RHI signal may include combining the audio signal and the video signal into a combined audio/video signal, and combining the combined audio/video signal and the one or more I/O device signals into the combined RHI signal. As FIG. 20 also shows, in one embodiment, a low-pass filter 2020B may be applied to the combined audio/video signal prior to combining the combined audio/video signal and the one or more I/O device signals into the combined RHI signal. Similarly, a high-pass filter 2030B may be applied to the one or more remote I/O device signals prior to combining the combined audio/video signal and the one or more remote I/O device signals into the combined HI signal. These filters may be applied to the respective signals to remove energy (frequencies) that may interfere with the other signals, as was mentioned above.

In some embodiments, the audio signal from the microphone 2008 may not provide a reliable signal level, and thus, prior to combining the audio signal and the video signal into the combined audio/video signal, an automatic gain control may be applied to the audio signal, as shown in FIG. 20. Referring back to FIG. 19, in a preferred embodiment, the audio signal 1920 from the microphone may be transmitted in a different frequency range than that of the original audio signal produced by the microphone, thus, in one embodiment, the automatic gain controlled audio signal may be modulated onto a carrier signal, e.g., a 5 MHz, for example, by MUX 2070, thereby effectively shifting the frequency of the audio signal into the desired frequency range. The modulated audio signal may then be passed through a band-pass filter 2050A, as shown. Thus, in this embodiment, combining the audio signal and the video signal into the combined audio/video signal includes combining the modulated audio signal and the video signal into the combined audio/video signal.

In one embodiment, the video signal received from the video camera 135 may include an RGB signal, as is well known in the art. However, it may be desirable to transmit the video signal in a different format, such as NTSC, for example. Thus, in one embodiment, prior to combining the audio signal and the video signal into the combined audio/video signal, the video signal may be converted to an NTSC video signal, e.g., by the RGB-to-NTSC converter 2040 shown in FIG. 20. It is noted that other video protocols (besides NTSC) are also contemplated.

The combined RHI signal may then be transmitted over the transmission medium 110, e.g., to the host extender device (encoder/decoder) 121A, as indicated in 2606. Note that in a preferred embodiment, the transmission medium is the serial link 110 used in the method of FIG. 25 to transmit HHI signals from the computer 102 to the remote HI 130. In other words, the serial link 110 may be used to communicate both ways between the computer 102 and the remote HI 130.

In 2608, the combined RHI signal may be received over the transmission medium, e.g., by the system of FIG. 21 or its equivalent. For example, in one embodiment, the system of FIG. 21 may be included in or coupled to the host extender device 121A, which was described in detail above. The audio signal, the video signal, and the one or more I/O device signals from the one or more I/O devices may then be extracted from the combined RHI signal, as indicated in 2610.

For example, referring again to FIG. 21, in one embodiment, extracting the audio signal, the video signal, and the one or more remote I/O device signals from the combined RHI signal may include applying a high-pass filter 2030D to the combined RHI signal to generate the one or more remote I/O device signals. Similarly, a low-pass filter 2020C may be applied to the combined HI signal to generate the video signal 2135. Furthermore, in an embodiment where the generated video signal includes an NTSC video signal, the generated video signal may be sent to an NTSC decoder which may decode the NTSC video signal, e.g., back to an RGB video signal. In one embodiment, a band-pass filter 2050B may be applied to the combined HI signal to generate the audio signal 2108B. In a further embodiment, the generated audio signal may be sent through a detector 2160 to extract audio data. In other words, the detector 2160 may operate to determine whether audio signals or data are included in the filtered signal, and to extract the determined audio data for provision to the computer 102. In various embodiments, the detector, or a separate audio processor, may operate to perform any of various conversions or processing on the audio signal or data in accordance with desired audio formats.

Finally, in 2612, the extracted audio signal, the extracted video signal, and the extracted one or more I/O device signals may be transmitted to the computer 102. In an embodiment where the extracted video signal was decoded from NTSC, the decoded video signal may be sent to the computer. Similarly, in an embodiment where the audio data was extracted from the audio signal, e.g., by the detector 2160, the extracted audio data may be sent to the computer.

As noted above, in one embodiment, the (remote) I/O device signals may be formatted in accordance with an extension protocol, and thus, once the I/O device signals have been extracted from the combined signal, the extracted I/O device signals may be passed through a decoder, e.g., a remote extender 120B, to convert the signals back to a standard I/O device transmission protocol. For example, in a preferred embodiment, the one or more remote I/O device signals may be extended USB (USBX) signals, and the one or more I/O devices included in the remote HI may include one or more USB devices. In this embodiment, the USBX I/O device signals may be sent to a USBX decoder, e.g., the remote extender 120B, which may convert the USBX signals to USB signals which may then be transmitted to the computer 102.

Thus, various embodiments of the method described above may operate to communicate human interface signals from the remote human interface 130 to the computer 102. Additionally, I/O device signals may be encoded/decoded to and from a special extension protocol (e.g., USBX) that allows the signals to be communicated over substantially longer distances than typically allowed by I/O device signal transmission protocols, e.g., USB.

As mentioned above, in a preferred embodiment, the method of FIG. 26 may operate in conjunction with that of FIG. 25 to facilitate two-way HI signal communications between the computer 102 and the remote HI 130 over a single transmission medium, e.g., over serial cable 110.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A system comprising a plurality of computing systems, the system comprising:
    a plurality of computing systems, wherein the plurality of computing systems are located at a common location;
    a plurality of human interfaces, wherein each of the human interfaces is located remotely from the common location, wherein each of the human interfaces includes a display device for displaying images, and wherein a first computing system is operable to generate a first image to be displayed on a first display device in a respective first human interface;
    a plurality of communication mediums coupling each of the plurality of computing systems to at least one of the plurality of human interfaces; and
    a video manager coupled to each of the plurality of computing systems, wherein the video manager is operable to selectively insert a second image into the first image generated by the first computing system for display on the first display device.

2. The system of claim 1, wherein the first display device is operable to display the first image including the second image.

3. The system of claim 2, wherein, in being operable to display the first image including the second image, the first display device is operable to display a PIP (Picture-In-Picture) image including at least a portion of the first image and at least a portion of the second image.

4. The system of claim 1, wherein the second image is received from a content source.

5. The system of claim 4, wherein the second image is received from an external image source over a network.

6. The system of claim 4, wherein the first image comprises first analog video signals, and wherein the second image received from the content source comprises second analog video signals in a scan line format.

7. The system of claim 6 wherein the video manager is operable to:
    store the second image in the memory medium;
    receive the first analog video signals from the first computing system;

retrieve the stored second image from the memory medium in digital form;
convert the second image from digital form to the second analog video signals; and
insert the second analog video signals into the first analog video signals on a scan line basis, thereby generating the third video signals.

8. The system of claim 6 wherein each of at least a subset of the plurality of human interfaces includes an audio device, wherein the video manager is further operable to:
receive audio signals corresponding to the first analog video signals; and
transmit the audio signals with the third analog video signals to the first human interface for presentation to a user of the first human interface.

9. The system of claim 4, wherein the video manager is further operable to:
modify format, protocol, size, and/or resolution of the second image for display on the display device of the first human interface.

10. The system of claim 1, wherein the second image is received from a communication source.

11. The system of claim 10, wherein each of the human interfaces includes a camera for acquiring an image.

12. The system of claim 11, wherein the second image is received from a camera comprised in a second human interface of the plurality of human interfaces.

13. The system of claim 11, wherein the second image comprises a video-conferencing image of a user of another one of the computing systems.

14. The system of claim 11, wherein the video manager is operable to selectively insert a plurality of second images into the first image generated by the first computing system for display on the first display device.

15. The system of claim 14, wherein the plurality of second images comprise video-conferencing images of users of other ones of the computing systems.

16. The system of claim 10, wherein the second image is received from an external camera over a network.

17. The system of claim 1,
wherein the first computing system is operable to generate a sequence of first images to be displayed on the first display device in the respective first human interface;
wherein the video manager is operable to selectively insert a sequence of second images into the sequence of first images generated by the first computing system for display on the first display device, wherein each second image of the sequence of second images is inserted into a respective one of the sequence of first images.

18. The system of claim 1,
wherein the video manager comprises a frame buffer; and
wherein the video manager is further operable to:
store the received second image in the frame buffer, wherein the frame buffer corresponds to a display screen of the display device of the first human interface; and
retrieve the second image from the frame buffer for insertion into the first image.

19. The system of claim 1, wherein the video manager is further operable to:
modify format, protocol, size, and/or resolution of the second image for display on the display device of the first human interface.

20. The system of claim 1, wherein each of the plurality of computing systems comprises a computer-on-a-card.

21. The system of claim 1, wherein each of the plurality of computing systems comprises a computer blade.

22. The system of claim 21, wherein the plurality of computing systems are comprised in one or more rack-mount structures.

23. The system of claim 1, where at least one of the plurality of human interfaces comprises a plurality of display devices.

24. The system of claim 23, wherein each of the plurality of display devices comprises a computer monitor.

25. The system of claim 1, wherein the video manager is operable to selectively insert the second image into the first image without using any CPU cycles of the computing systems.

26. The system of claim 1, wherein the second image is received from a content source.

27. A video manager, comprising:
a video switch comprising:
a memory medium; and
a processor coupled to the memory medium; and
a content processor coupled to the video switch through one or more video buses;
wherein the video switch is operable to couple to a plurality of co-located computing systems, and to further couple to a plurality of human interfaces, wherein each of the human interfaces is located remotely from the co-located computing systems, wherein each of the human interfaces includes a display device for displaying images;
wherein the video switch is further operable to:
receive a first image generated by a first computing system to be displayed on a first display device in a respective first human interface, wherein the first image comprises first analog video signals in a scan line format;
receive a second image from the content processor, wherein the second image comprises second analog video signals in the scan line format; and
selectively insert the second image into the first image generated by the first computing system for display on the first display device by inserting the second analog video signals into the first analog video signals.

28. The video manager of claim 27, wherein the video manager is further operable to:
select a first video bus from the one or more video buses;
receive the second image from the content processor over the first video bus; and
store the second image in the memory medium;
wherein, in selectively inserting a second image into the first image generated by the first computing system for display on the first display device, the video manager is operable to retrieve the second image from the memory medium and insert the second image into the first image.

29. A video manager, comprising:
a video switch comprising:
a memory medium; and
a processor coupled to the memory medium; and
a communications processor coupled to the video switch through one or more video buses;
wherein the video switch is operable to couple to a plurality of co-located computing systems, and to further couple to a plurality of human interfaces, wherein each of the human interfaces is located remotely from the co-located computing systems, wherein each of the human interfaces includes a display device for displaying images, and wherein each of the human interfaces includes a camera for acquiring an image;

wherein the communications processor is operable to receive a first image from a camera comprised in a respective first human interface;

wherein the video switch is further operable to:
receive a second image generated by a first computing system to be displayed on a first display device in a respective second human interface;
receive the first image from the communications processor; and
selectively insert the first image into the second image generated by the first computing system for display on the first display device.

30. The video manager of claim 29, wherein the video manager is further operable to:
select a first video bus from the one or more video buses;
receive the first image from the communications processor over the first video bus; and
store the first image in the memory medium;
wherein, in selectively inserting a first image into the second image generated by the first computing system for display on the first display device, the video manager is operable to retrieve the first image from the memory medium and insert the first image into the second image.

31. A videoconferencing system, comprising:
a plurality of computing systems, wherein the plurality of computing systems are located at a common location;
a plurality of human interfaces, wherein each of the human interfaces is located remotely from the common location, wherein each of the human interfaces includes a display device for displaying images and a camera for acquiring an image, and wherein each computing system is operable to generate a respective first image to be displayed on a display device in a respective human interface;
a plurality of communication mediums coupling each of the plurality of computing systems to at least one of the plurality of human interfaces; and
a video manager coupled to each of the plurality of computing systems, wherein, for each human interface, the video manager is operable to:
receive the respective first image from a respective one of the plurality of computer systems;
receive one or more respective second images from a respective one or more cameras of a respective one or more human interfaces of the plurality of human interfaces;
selectively insert the respective second images into the first image, thereby generating a third image comprising at least a portion of the respective first image and at least a portion of each of the respective second images; and
transmit the third image to the human interface for display on the display device.

32. The system of claim 31,
wherein the video manager is further coupled to one or more external cameras over a network, wherein each of the one or more external cameras is operable to acquire a respective fourth image; and
wherein the video manager is further operable to:
receive one or more respective fourth images respectively from the one or more external cameras;
selectively insert the one or more respective fourth images into the first image, thereby generating the third image comprising at least a portion of the respective first image and at least a portion of each of the respective second images, and at least a portion of each of the respective fourth images; and
transmit the third image to the human interface for display on the display device.

* * * * *